(12) United States Patent
Gibson et al.

(10) Patent No.: US 9,833,839 B2
(45) Date of Patent: *Dec. 5, 2017

(54) FABRICATING AN INTERFACE LAYER FOR REMOVABLE SUPPORT

(71) Applicant: Desktop Metal, Inc., Burlington, MA (US)

(72) Inventors: Michael Andrew Gibson, Boston, MA (US); Jonah Samuel Myerberg, Lexington, MA (US); Ricardo Fulop, Lexington, MA (US); Matthew David Verminski, North Andover, MA (US); Richard Remo Fontana, Cape Elizabeth, ME (US); Christopher Allan Schuh, Wayland, MA (US); Yet-Ming Chiang, Weston, MA (US); Anastasios John Hart, Waban, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,170

(22) Filed: Mar. 24, 2017

(65) Prior Publication Data
US 2017/0297097 A1    Oct. 19, 2017

Related U.S. Application Data

(60) Provisional application No. 62/322,760, filed on Apr. 14, 2016, provisional application No. 62/432,298,
(Continued)

(51) Int. Cl.
*B22F 3/00* (2006.01)
*B28B 1/00* (2006.01)
(Continued)

(52) U.S. Cl.
CPC ............ *B22F 3/008* (2013.01); *B22F 3/1021* (2013.01); *B28B 1/001* (2013.01);
(Continued)

(58) Field of Classification Search
CPC ... B33Y 10/00; B22F 2003/1058; B22F 3/008
(Continued)

(56) References Cited

U.S. PATENT DOCUMENTS

| 5,182,056 A | 1/1993 | Spence et al. |
| 5,204,055 A | 4/1993 | Sachs et al. |

(Continued)

FOREIGN PATENT DOCUMENTS

| CN | 101422963 | 5/2009 |
| CN | 105408091 | 3/2016 |

(Continued)

OTHER PUBLICATIONS

USPTO, "U.S. Appl. No. 15/469,213, Non-Final Office Action dated Jul. 10, 2017", 8 pages.
(Continued)

*Primary Examiner* — Weiping Zhu
(74) *Attorney, Agent, or Firm* — Strategic Patents, P.C.

(57) ABSTRACT

Support structures are used in certain additive fabrication processes to permit fabrication of a greater range of object geometries. For additive fabrication processes with materials that are subsequently sintered into a final part, an interface layer is fabricated between the object and support in order to inhibit bonding between adjacent surfaces of the support structure and the object during sintering.

30 Claims, 15 Drawing Sheets

Related U.S. Application Data filed on Dec. 9, 2016, provisional application No. 62/473,372, filed on Mar. 18, 2017.

(51) Int. Cl.

| | | |
|---|---|---|
| *B29C 67/00* | (2017.01) | |
| *B33Y 10/00* | (2015.01) | |
| *B33Y 50/02* | (2015.01) | |
| *B33Y 70/00* | (2015.01) | |
| *B22F 3/10* | (2006.01) | |
| *B29K 105/16* | (2006.01) | |
| *B29K 505/00* | (2006.01) | |
| *B29K 507/04* | (2006.01) | |

(52) U.S. Cl.
CPC ...... *B29C 67/0081* (2013.01); *B29C 67/0088* (2013.01); *B29C 67/0092* (2013.01); *B33Y 10/00* (2014.12); *B33Y 50/02* (2014.12); *B33Y 70/00* (2014.12); *B29K 2105/16* (2013.01); *B29K 2505/00* (2013.01); *B29K 2507/04* (2013.01)

(58) Field of Classification Search
USPC .......................................................... 419/7
See application file for complete search history.

(56) References Cited

U.S. PATENT DOCUMENTS

| | | |
|---|---|---|
| 5,242,098 A | 9/1993 | Hardwick et al. |
| 5,496,682 A | 3/1996 | Mirle et al. |
| 5,738,817 A | 4/1998 | Danforth et al. |
| 5,752,155 A | 5/1998 | Gates et al. |
| 5,900,207 A | 5/1999 | Priedeman, Jr. et al. |
| 6,117,612 A | 9/2000 | Halloran et al. |
| 6,183,689 B1 | 2/2001 | Roy et al. |
| 6,512,216 B2 | 1/2003 | Gedevanishvili et al. |
| 6,582,651 B1 | 6/2003 | Cochran, Jr. et al. |
| 6,596,224 B1 | 7/2003 | Sachs et al. |
| 6,799,959 B1 | 10/2004 | Tochimoto et al. |
| 6,805,835 B2 | 10/2004 | Roy et al. |
| 6,974,656 B2 | 12/2005 | Hinczewski |
| 7,795,349 B2 | 9/2010 | DiCologero et al. |
| 8,591,801 B2 | 11/2013 | Tsutsui et al. |
| 9,120,270 B2 | 9/2015 | Zhou et al. |
| 9,327,448 B2 | 5/2016 | Shah et al. |
| 2001/0050448 A1 | 12/2001 | Kubo et al. |
| 2002/0171177 A1 | 11/2002 | Kritchman et al. |
| 2003/0180636 A1 | 9/2003 | Kanga et al. |
| 2003/0185698 A1 | 10/2003 | Wang et al. |
| 2003/0205573 A1 | 11/2003 | Okumura et al. |
| 2004/0239009 A1 | 12/2004 | Collins et al. |
| 2005/0249627 A1 | 11/2005 | Wang et al. |
| 2009/0148813 A1 | 6/2009 | Sun et al. |
| 2010/0028645 A1 | 2/2010 | Maguire et al. |
| 2010/0193998 A1 | 8/2010 | Crump et al. |
| 2010/0294571 A1 | 11/2010 | Belnap et al. |
| 2011/0176952 A1 | 7/2011 | Kruzhanov et al. |
| 2014/0251481 A1 | 9/2014 | Kroll et al. |
| 2014/0300017 A1 | 10/2014 | Wighton et al. |
| 2015/0035209 A1 | 2/2015 | Shah et al. |
| 2015/0080495 A1 | 3/2015 | Heikkila |
| 2015/0125334 A1 | 5/2015 | Uetani et al. |
| 2015/0145168 A1 | 5/2015 | Rodgers et al. |
| 2015/0202825 A1 | 7/2015 | Cordingley |
| 2015/0239179 A1 | 8/2015 | Okamoto et al. |
| 2015/0266092 A1 | 9/2015 | Andersson et al. |
| 2015/0273582 A1 | 10/2015 | Swanson et al. |
| 2016/0332373 A1 | 11/2016 | Kuhn et al. |
| 2017/0021452 A1 | 1/2017 | Tanaka et al. |
| 2017/0129173 A1 | 5/2017 | Hays et al. |
| 2017/0173692 A1* | 6/2017 | Myerberg ............... B22F 3/115 |
| 2017/0173697 A1* | 6/2017 | Myerberg ................. B22F 3/24 |
| 2017/0182560 A1* | 6/2017 | Myerberg ................. B22F 3/24 |
| 2017/0252973 A1 | 9/2017 | Clark et al. |

FOREIGN PATENT DOCUMENTS

| | | |
|---|---|---|
| EP | 3117982 | 1/2017 |
| JP | 2015131479 | 7/2015 |
| WO | WO-2014174090 | 10/2014 |
| WO | WO-2015007966 | 1/2015 |
| WO | WO-2015100086 | 7/2015 |
| WO | WO-2016198291 | 12/2016 |

OTHER PUBLICATIONS

Haselhuhn, A. et al., "In situ formation of substrate release mechanisms for gas metal arc weld metal 3-d printing", 2015, pp. 50-59.
Hidy, G., "Chapter 1 Introduction", aerosols, an industrial and environmental science, 1984, 1-16 pages.
Garcia, Javier H., "Development of Binder Systems Based on CAB for Power Injection Moulding (PIM) and Micro Power Injection Moulding (u-PIM) of Zircon and Invar Powers", Jan. 27, 2013, 34 Pages.
USPTO, "U.S. Appl. No. 15/469,213, Non-Final Office Action dated Aug. 11, 2017", 10 pages.
USPTO, "U.S. Appl. No. 15/469,371, Notice of Allowance dated Jul. 19, 2017", 13 pages.
USPTO, "U.S. Appl. No. 15/469,444, Non-Final Office Action dated Aug. 21, 2017", 13 pages.
USPTO, "U.S. Appl. No. 15/469,425 Non-Final Office Action dated Jul. 27, 2017", 19 pages.
USPTO, "U.S. Appl. No. 15/469,432 Non-Final Office Action dated Aug. 25, 2017", 24 pages.
ISA, "PCT Application No. PCT/US17/24067 International Search Report and Written Opinion dated Aug. 25, 2017", 23 pages.
Griffith, Michelle L. et al., "Freeform Fabrication of Ceramics via Stereolithography", J.Am. Ceram. Soc., 79 [10] 2601-608, Mar. 1996, 8 pages.
Kukla, Christian et al., "Effect of Particle Size on the Properties of Highly-Filled Polymers for Fused Filament Fabrication", Jul. 2016, 5 pages.
Shah, Ramille N. et al., "3D-Printing of Energy Devices Using Particle-Based Inks", Northwestern University, Querrey Institute for BioNanotechnology Institute for Sustainability and Energy at Northwestern Aug. 2014, 5 Pages.
Park, Mansoo et al., "Accelerated sintering in phase-separating nanostructured alloys", Nature Communications | 6:6858 | DOI: 10.1038/ncomms7858 |www.nature.com/naturecommunications Apr. 22, 2015, 6 pages.
Riecker, S. et al., "Fused Deposition Modeling—Opportunities for Cheap Metal AM", World PM2016—AM—Deposition Technologies, 2016, 6 Pages.
Burkhardt, Carlo et al., "Fused Filament Fabrication (FFF) of 316L Green Parts for the MIM process", World PM2016—AM—Deposition Technologies 2016, 7 Pages.
Kukla, Christian et al., "Properties for PIM Feedstocks Used in Fused Filament Fabrication", World PM2016—AM—Deposition Technologies, 2016, 5 Pages.
Jakus, Adam E. et al., "Metallic Architectures from 3D-Printed Powder-Based Liquid Inks", Adv. Funct. Mater, DOI: 10.1002/adfm.201503921 2015, pp. 6985-6995.
Hartkop, David, "MiniMetalMaker—3D print with metal clay", https://www.indiegogo.com/projects/minimetalmaker-3d-print-with-metal-clay#/ 2015, 3 pages.
Deckers, J. et al., "Additive Manufacturing of Ceramics: A Review", Journal of Cermaic Science and Technology; vol. 5, No. 4, 2014, pp. 245-260.
Krassenstein, Brian, "Mini Metal Maker, Affordable Metal Clay 3D Printer, Relaunches on Indiegogo to Fund Mass Production", https://3dprint.com/48292/mini-metal-maker-3d-print/ NPL-11 2013, 6 Pages.
Agrawal, Dinesh, "Microwave Sintering of Ceramics, Composites, Metals, and Transparent Materials", Journal of Materials Education vol. 19(4.5 & 6), 1997, 9 Pages.

(56) References Cited

OTHER PUBLICATIONS

Taylor, Shannon L. et al., "Iron and Nickel Cellular Structures by Sintering of 3D-Printed Oxide or Metallic Particle Inks", Advanced Engineering Materials, DOI: 10.1002/adem.201600365, Sep. 16, 2016, 8 pages.
USPTO, "U.S. Appl. No. 15/469,371, Non-Final Office Action dated Jun. 7, 2017", 14 pages.
USPTO, "U.S. Appl. No. 15/469,391, Non-Final Office Action dated Jun. 21, 2017", 8 pages.
USPTO, "U.S. Appl. No. 15/469,403, Non-Final Office Action dated May 25, 2017", 13 pages.
USPTO, "U.S. Appl. No. 15/469,292, Non-Final Office Action dated Sep. 1, 2017", 36 pages.

* cited by examiner

FABRICATING AN INTERFACE LAYER FOR REMOVABLE SUPPORT

RELATED APPLICATIONS

This application claims the benefit of U.S. Prov. Pat. App. No. 62/322,760 filed on Apr. 14, 2016, U.S. Prov. Pat. App. No. 62/432,298 filed on Dec. 9, 2016, and U.S. Prov. Pat. App. No. 62/473,372 filed on Mar. 18, 2017. The entire content of each of these applications is hereby incorporated by reference.

This application is also related to the following patent applications: Inter'l Pat. App. No. PCT/US17/24067 filed on Mar. 24, 2017; Inter'l Pat. App. No. PCT/US17/20817 filed on Mar. 3, 2017; U.S. patent application Ser. No. 15/059,256 filed on Mar. 2, 2016; patent application Ser. No. 15/245,702 filed on Aug. 24, 2016; and U.S. patent application Ser. No. 15/382,535 filed on Dec. 16, 2016. This application is also related to the following U.S. provisional patent applications: U.S. Prov. Pat. App. No. 62/303,310 filed on Mar. 3, 2016, U.S. Prov. Pat. App. No. 62/303,341 filed on Mar. 3, 2016, U.S. Prov. Pat. App. No. 62/434,014 filed on Dec. 14, 2016, U.S. Prov. Pat. App. No. 62/421,716 filed on Nov. 14, 2016, and U.S. Prov. Pat. App. No. 62/461,726 filed on Feb. 21, 2017. Each of the foregoing applications is hereby incorporated by reference in its entirety.

FIELD

The systems and methods described herein relate to additive manufacturing, and more specifically to techniques for fabricating support structures, breakaway layers, and the like suitable for use with sinterable build materials.

BACKGROUND

Support structures are commonly used in additive manufacturing to expand the features available in fabricated object, e.g., by providing underlying structural support for overhangs or lengthy bridges of otherwise unsupported material. However, when additively manufacturing with materials that require additional processing such as debinding and sintering to form a final part, conventional support strategies and techniques may fail on multiple fronts, such as where support structures deform or shrink in patterns that do not match the supported object or where support structures sinter together with the supported object to form a single, inseparable structure. There remains a need for support techniques, materials, and strategies suitable for use with additively manufactured, sinterable objects.

SUMMARY

Support structures are used in certain additive fabrication processes to permit fabrication of a greater range of object geometries. For additive fabrication processes with materials that are subsequently sintered into a final part, an interface layer is fabricated between the object and support in order to inhibit bonding between adjacent surfaces of the support structure and the object during sintering.

In one aspect, a method disclosed herein includes fabricating, from a first material, a support structure for an object; fabricating an interface layer adjacent to the support structure; and fabricating a surface of the object from a second material, the surface of the object adjacent to the interface layer and the second material including a powdered material for forming a final part and a binder system including one or more binders, wherein the one or more binders retain a net shape of the object during processing of the object into the final part, wherein processing of the object into the final part includes debinding the net shape to remove at least a portion of the one or more binders and sintering the net shape to join and densify the powdered material, wherein the interface layer resists bonding of the support structure to the object during sintering.

The second material may include a powdered metallurgy material. The powdered material may include a metal powder. The powdered material may include a ceramic powder. The powdered material may be a sinterable material. The second material may include an infiltrable powder with at least one of a metallic infiltrant and a ceramic infiltrant. The binder system may include a single binder. The single binder may be removable from the object through a pure thermal debind. Fabricating the surface of the object may include applying the single binder in a binder jetting process. The binder system may include a first binder that is removed from the second material during a debind prior to sintering and a second binder that remains in the net shape at an onset of a thermal sintering cycle. The binder system may include a first binder that is removed from the second material during a debind prior to sintering and a second binder that remains in the net shape through sintering into the final part. The second binder may include submicron particles that facilitate sintering of the powdered material. The submicron particles may include an element selected for alloying with the powdered material. The submicron particles may have a composition substantially identical to the powdered material and a size distribution with a mean at least one order of magnitude smaller than the powdered material. The powdered material may have a distribution of particle sizes with a mean diameter of between two and fifty microns. The binder system may include a first binder and a second binder, the first binder resisting deformation of the net shape of the object during debinding of the object and the second binder resisting deformation of the net shape of the object during a beginning of a thermal sintering cycle for the object.

The method may include debinding the object to remove the first binder. Debinding the object may include at least one of chemical debinding, thermal debinding, catalytic debinding, supercritical debinding, and evaporation. Debinding the object may include microwaving the object. The method may include heating the object to remove the second binder. The binder system may include at least one polymer. The binder system may include a first binder and at least one other binder, the first binder forming about 20 percent to about 98 percent by volume of the binder system, the method further including debinding the first binder from the object to create open pore channels for a release of the at least one other binder. Fabricating at least one of the support structure, the object, and the interface layer may include additively manufacturing the support structure using at least one of fused filament fabrication, binder jetting, and optical curing of a powder-loaded resin. The interface layer may include a finishing material, wherein applying the interface layer includes applying the interface layer to one or more exterior surfaces of the object. The finishing material may include an alloying metal having an aesthetic finish. Fabricating the interface layer may include fully encapsulating the object. The interface layer may include titanium. At least one of the first material and the interface layer may be formed of a composition including microspheres that controllably collapse under pressure to reduce volume.

The method may include applying pressure to collapse the microspheres, the collapse of the microspheres separating the support structure from the object. The interface layer may be formed of the first material.

DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Figure 1:
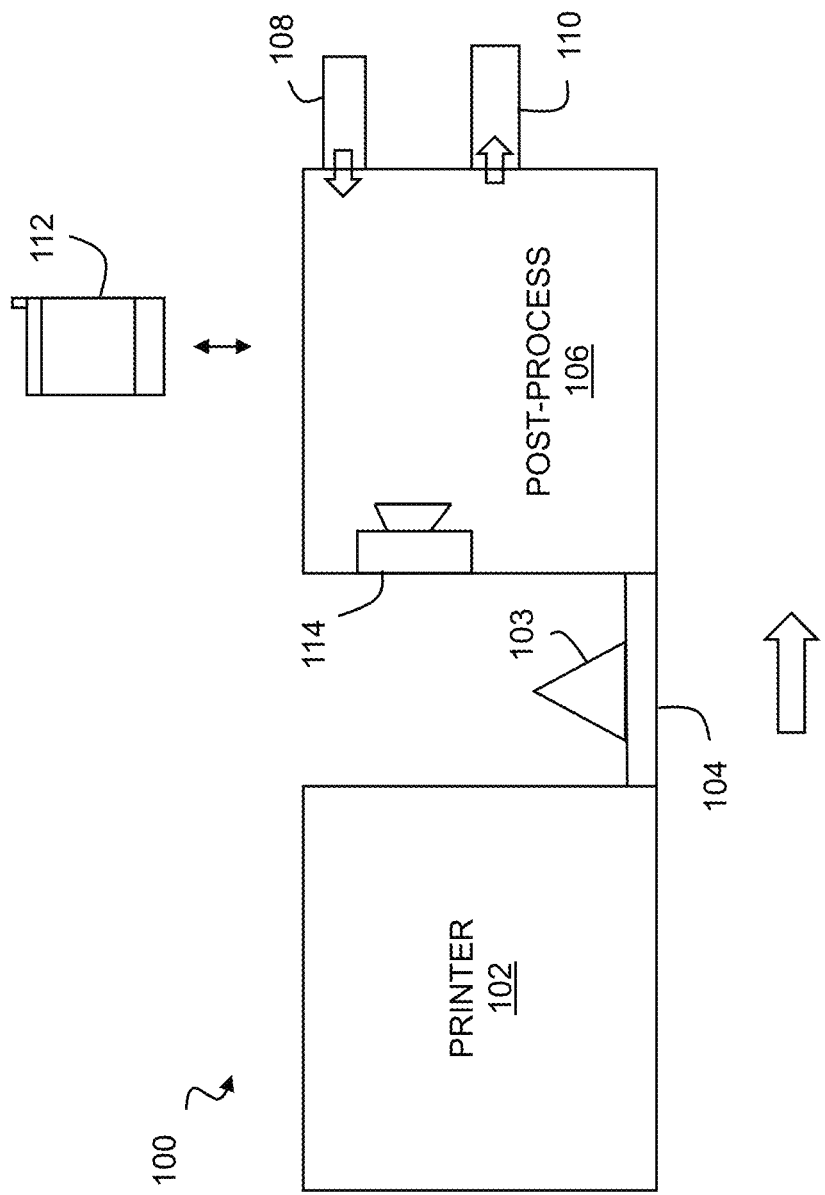
FIG. 1 shows an additive manufacturing system for use with sinterable build materials.

FIG. 1 shows an additive manufacturing system for use with sinterable build materials. The system 100 may include a printer 102, a conveyor 104, and a post-processing station 106.

In general, the printer 102 may be any of the printers described herein or any other three-dimensional printer suitable for adaptation to fabrication with sinterable build materials. By way of non-limiting example, the printer 102 may include a fused filament fabrication system, a binder jetting system, a stereolithography system, a selective laser sintering system, or any other system that can be usefully adapted to form a net shape object under computer control using the sinterable build materials contemplated herein.

The output of the printer 102 may be an object 103 that is a green body or the like formed of a build material including any suitable powder (e.g., metal, metal alloy, ceramic, and so forth, as well as combinations of the foregoing), along with a binder that retains the powder in a net shape produced by the printer 102. A wide range of compositions may be employed as the build material contemplated herein. For example, powdered metallurgy materials or the like may be adapted for use as a build material in a fused filament fabrication process or the like. Metal injection molding materials with suitable thermo-mechanical properties for extrusion in a fused filament fabrication process are described by way of non-limiting example in Heaney, Donald F., ed. "Handbook of Metal Injection Molding" (2012), the entire contents of which are hereby incorporated by reference.

The conveyor 104 may be used to transport the object 103 from the printer 102 to a post-processing station 106, which may include one or more separate processing stations, where debinding and sintering can be performed. The conveyor 104 may be any suitable mechanism or combination of devices suitable for physically transporting the object 103. This may, for example, include robotics and a machine vision system or the like on the printer side for detaching the object 103 from a build platform, as well as robotics and a machine vision system or the like on the post-processing side to accurately place the object 103 within the post-processing station 106. In another aspect, the post-processing station 106 may serve multiple printers so that a number of objects can be debound and sintered concurrently, and the conveyor 104 may interconnect the printers and post-processing station so that multiple print jobs can be coordinated and automatically completed in parallel. In another aspect, the object 103 may be manually transported between the two corresponding stations.

The post-processing station 106 may be any system or combination of systems useful for converting a green part formed into a desired net shape from a metal injection molding build material by the printer 102 into a final object. The post-processing station 106 may, for example, include a debinding station such as a chemical debinding station for dissolving binder materials in a solvent or the like, or more generally any debinding station configured to remove at least a portion of the binder system from the build material of the object 103. The post-processing station 106 may also or instead include a thermal sintering station for applying a thermal sintering cycle at a sintering temperature for the build material, or the powdered material in the build material, such as a sintering furnace configured to sinter the powdered material into a densified object. The components of the post-processing station 106 may be used in sequence to produce a final object. As another example, some contemporary injection molding materials are engineered for thermal debinding, which makes it possible to perform a combination of debinding and sintering steps with a single oven or similar device. In general, the thermal specifications of a sintering furnace will depend upon the powdered material, the binder system, the volume loading of the powdered material into the binder system, and other aspects of the green object and the materials used to manufacture same. Commercially available sintering furnaces for thermally debound and sintered metal injection molding (MIM) parts will typically operate with an accuracy of +/−5 degrees Celsius or better, and at temperatures of at least 600 degrees Celsius, or from about 200 degrees Celsius to about 1900 degrees Celsius for extended times. Any such furnace or similar heating device may be usefully employed as the post-processing station 106 as contemplated herein. Vacuum or pressure treatment may also or instead be used. In an aspect, after the object 103 is placed in the oven, beads of an identical or similar composition, with the addition of an unsinterable exterior coating, may be packed into the oven with the object to provide general mechanical support with a thermally matched shrinkage rate that will not form a bond to the object during sintering.

In the context of this description, it will be appreciated that sintering may usefully include different types of sintering. For example, sintering may include the application of heat to sinter an object to full density or nearly full density. In another aspect, sintering may include partial sintering, e.g., for a sintering and infiltration process in which pores of a partially sintered part are filled, e.g., through contact and capillary action, with some other material such as a low melting point metal to increase hardness, increase tensile strength, or otherwise alter or improve properties of a final part. Thus, any references herein to sintering should be understood to contemplate sintering and infiltration unless a different meaning is expressly stated or otherwise clear from the context. Similarly, references to a sinterable powder or sinterable build material should be understood to contemplate any sinterable material including powders that can be sintered and infiltrated to form a final part.

It should also be understood that, where an infiltrable build material is used, the corresponding interface layer should be engineered to resist any infiltration that might result in the formation of a mechanical bond across the barrier created by the interface layer. Thus, for example, when using infiltrable build materials, a powdered material such as a ceramic of the interface layer may usefully have a particle size and shape selected to be substantially resistant to infiltration by the infiltrant (e.g., an infiltrating liquid) used to densify the object. While the infiltration barrier may be created mechanically based on shape and size of particles, e.g., by creating particles that are very small to slow the wicking of a liquid infiltrant into the interface layer, the barrier may also or instead be created chemically by coating particles with, or forming the particles from, a substantially non-wetting material relative to the infiltrating liquid. These and any other techniques that would be apparent to one of ordinary skill in the art may be used to create an interface layer for use with infiltrable build materials as contemplated herein.

It will also be appreciated that a wide range of other debinding and sintering processes can be used. For example, the binder may be removed in a chemical debind, thermal debind, or some combination of these. Other debinding processes are also known in the art, such as supercritical debinding or catalytic debinding, any of which may also or instead be employed by the post-processing station 106. For example, in a common process, a green part is first debound using a chemical debind, which is following by a thermal debind at a moderately high temperature (in this context, around 700-800 Celsius) to remove organic binder and create enough necks among a powdered material to provide sufficient strength for handling. From this stage, the object may be moved to a sintering furnace to remove any remaining components of a binder system and densify the object into a final part. In another aspect, a pure thermal debind may be used to remove the organic binder. More generally, any technique or combination of techniques may be usefully employed to debind an object as contemplated herein.

Similarly, a wide range of sintering techniques may be usefully employed by the post-processing station 106. In one aspect, an object may be consolidated in a furnace to a high theoretical density using vacuum sintering. In another aspect, the furnace may use a combination of flowing gas (e.g., at below atmosphere, slightly above atmosphere, or some other suitable pressure) and vacuum sintering. More generally, any sintering or other process suitable for improving object density may be used, preferably where the process yields a near-theoretical density part with little or no porosity. Hot-isostatic pressing ("HIP") may also or instead be employed, e.g., by applying elevated temperatures and pressures of 10-50 ksi, or between about 15 and 30 ksi, as a post-sintering step to increase density of the final part. In another aspect, the object may be processed using any of the foregoing, followed by a moderate overpressure (greater than the sintering pressure, but lower than HIP pressures). In this latter process, gas may be pressurized at 100-1500 psi and maintained at elevated temperatures within the furnace or some other supplemental chamber. In another aspect, the object may be separately heated in one furnace, and then immersed in a hot granular media inside a die, with pressure applied to the media so that it can be transmitted to the object to drive more rapid consolidation to near full density. More generally, any technique or combination of techniques suitable for removing binder systems and driving a powdered material toward consolidation and densification may be used by the post-processing station 106 to process a fabricated green part as contemplated herein.

In one aspect, the post-processing station 106 may be incorporated into the printer 102, thus removing a need for a conveyor 104 to physically transport the object 103. The build volume of the printer 102 and components therein may be fabricated to withstand the elevated debinding/sintering temperatures. In another aspect, the printer 102 may provide movable walls, barriers, or other enclosure(s) within the build volume so that the debind and/or sinter can be performed while the object 103 is on a build platform within the printer 102, but thermally isolated from any thermally sensitive components or materials.

The post-processing station 106 may be optimized in a variety of ways for use in an office environment. In one aspect, the post-processing station 106 may include an inert gas source 108. The inert gas source 108 may, for example, include argon or other inert gas (or other gas that is inert to the sintered material), and may be housed in a removable and replaceable cartridge that can be coupled to the post-processing station 106 for discharge into the interior of the post-processing station 106, and then removed and replaced when the contents are exhausted. The post-processing station 106 may also or instead include a filter 110 such as a charcoal filter or the like for exhausting gasses that can be outgassed into an office environment in an unfiltered form. For other gasses, an exterior exhaust, or a gas container or the like may be provided to permit use in unventilated areas. For reclaimable materials, a closed system may also or instead be used, particularly where the environmental materials are expensive or dangerous.

In one aspect, the post-processing station 106 may be coupled to other system components. For example, the post-processing station 106 may include information from the printer 102, or from a controller for the printer, about the geometry, size, mass, and other physical characteristics of the object 103 in order to generate a suitable debinding and sintering profile. In another aspect, the profile may be independently created by the controller or other resource and transmitted to the post-processing station 106 when the object 103 is conveyed. In another aspect, the post-processing station 106 may monitor the debinding and sintering process and provide feedback, e.g., to a smart phone or other remote device 112, about a status of the object 103, a time to completion, and other processing metrics and information. The post-processing station 106 may include a camera 114 or other monitoring device to provide feedback to the remote device 112, and may provide time lapse animation or the like to graphically show sintering on a compressed time scale. Post-processing may also or instead include finishing with heat, a hot knife, tools, or similar. Post-processing may include applying a finish coat.

In another aspect, the post-processing station 106 may be remote from the printer 102, e.g., in a service bureau model or the like where the object 103 is fabricated and then sent to a service bureau for outsourced debinding, sintering and so forth. Thus, for any of the support structures, interface layers, and so forth described below, or more generally, for any fabricated items described below, this disclosure expressly contemplates a corresponding method of receiving an object or item containing any such features, e.g., any features or structures described below, and then performing one or more post-processing steps including but not limited to shaping, debinding, sintering, finishing, assembly, and so forth. This may, for example, include receiving a green part with a fully intact binder system, at a remote processing resource, where the part can be debound and sintered at the remote processing resource. This may also or instead include receiving a brown part where some or all of the binder system has been removed in a debinding process at another location and the part is only sintered at the remote processing resource. In this latter case, a portion of the binder system may usefully be retained in the part, either as a backbone binder to retain a shape of the object during sintering until a self-supporting sintering strength is achieved, or as a residual primary binder that is left in the part to improve structural integrity during shipping or other handling.

More generally, this disclosure contemplates any combination and distribution of steps suitable for centralized or distributed processing into a final part, as well as any intermediate forms of the materials, articles of manufacture, and assemblies that might be used therein.

For example, in one aspect, a method disclosed herein may include receiving an article from a creator at a remote processing resource such as a service bureau, sintering service, or the like. The article may include a support structure fabricated from a first material, an interface layer adjacent to the support structure, and an object supported by the support structure and fabricated from a second material, the object having a surface adjacent to the interface layer, where the second material includes a powdered material for forming a final part and a binder system including one or more binders, where the one or more binders retain a net shape of the object during processing of the object into the final part, where processing of the object into the final part includes debinding the net shape to remove at least a portion of the one or more binders and sintering the net shape to join and densify the powdered material, and where the interface layer resists bonding of the support structure to the object during sintering. The article may have been fabricated, for example, at another facility with an additive fabrication system but no sintering (and/or debinding) resources. The method may include processing the article at the remote processing resource into the final part, where processing the article includes at least one of debinding the article and sintering the article, and where processing the article further includes separating the object from the support structure at the interface layer. The resulting article may then be returned to the creator for any intended use.

Figure 2:
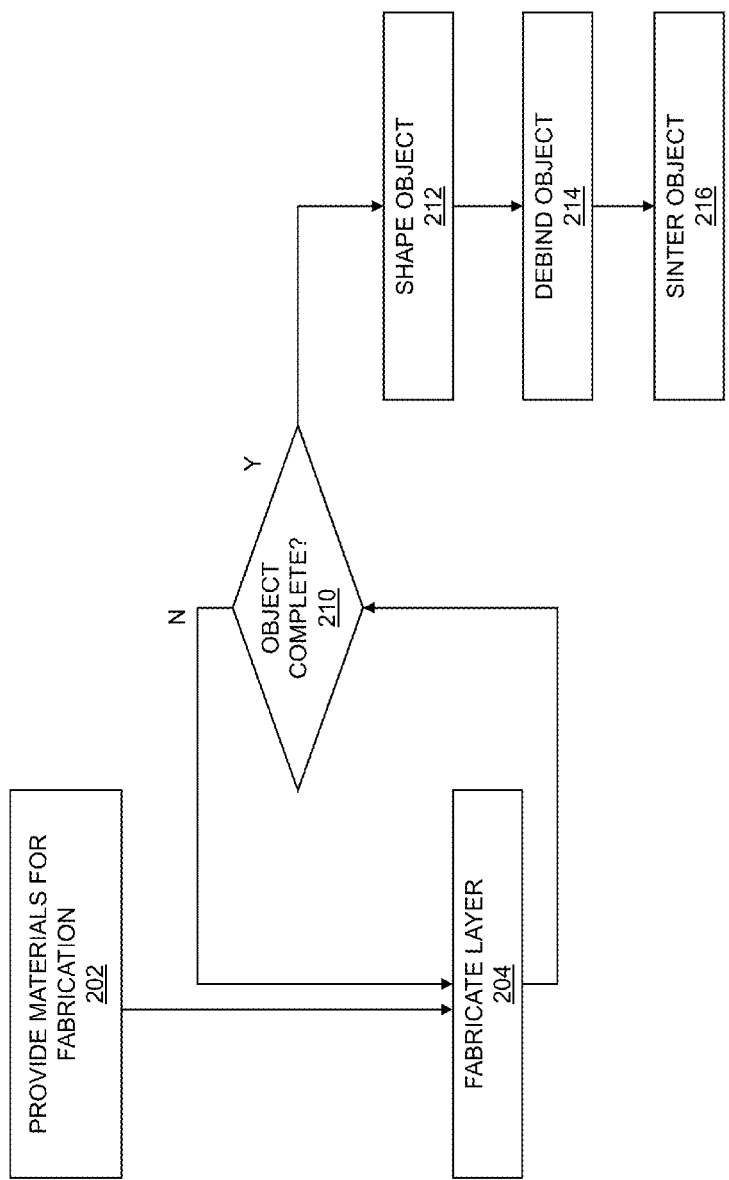
FIG. 2 shows a flow chart of a method for additive fabrication with sinterable build materials.

FIG. 2 shows a method for fabricating an object. The method 200 is more specifically a generalized method for layer-by-layer fabrication of an object using sinterable materials.

As shown in step 202, the method 200 may begin with providing a material for fabrication. This may include any of a variety of materials that can be usefully handled in a layer-based fabrication process such as fused filament fabrication, binder jetting, stereolithography, and so forth. A number of suitable materials are discussed in greater detail below. More generally, any material mentioned herein that is suitable for use in a layer-based fabrication system may be employed as the material in this method 200. It will further be appreciated that other techniques that are not layer based, including subtractive techniques such as milling or fluid jetting, may also or instead be used, and any correspondingly suitable materials may also or instead be employed as a build material for fabricating an object.

Furthermore, additional materials may be employed by a fabrication system, such as support materials, interface layers, finishing materials (for exterior surfaces of an object) and so forth, any of which may be used as a material for fabrication in the systems and methods contemplated herein.

As shown in step 204, the method may include fabricating a layer for an object. This may, for example, include a layer of the object itself or a layer of a support structure. For a particular layer (e.g., at a particular z-axis position of a fabrication system), an interface layer may also or instead be fabricated to provide a non-sinterable interface or similar release layer or structure between a support structure (or a substrate such as a raft, setter, or print bed) and an object. In another aspect, finishing materials for exterior surfaces may be used, such as materials that impart desired aesthetic, structural, or functional properties to surfaces of the object.

As shown in step 210, a determination may be made whether the object (and related supports, etc.) is complete. If the object is not complete, the method 200 may return to step 204 and another layer may be fabricated. If the object is complete, then the method 200 may proceed to step 212 where post-processing begins.

As shown in step 212, the method 200 may include shaping the object. Prior to debinding and sintering, an object is typically in a softer, more workable state. While this so-called green part is potentially fragile and subject to fracturing or the like, the more workable state affords a good opportunity for surface finishing, e.g., by sanding or otherwise smoothing away striations or other artifacts of the layer-based fabrication process, as well as spurs, burrs and other surface defects that deviate from a computerized model of an intended shape of the object. In this context, shaping may include manual shaping, or automated shaping using, e.g., a computerized milling machine, grinding tools, or a variety of brushes, abrasives and so forth or any other generally subtractive technique or tool(s). In one aspect, a fluid stream of a gas such as carbon dioxide may be used to carry dry ice particulates to smooth or otherwise shape a surface. In this latter approach, the abrasive (dry ice) can conveniently change phase directly to a gas under normal conditions, thus mitigating cleanup of abrasives after shaping the object.

As shown in step 214, the process 200 may include debinding the printed object. In general, debinding may remove some or all of a binder or binder system that retains a build material containing a metal (or ceramic or other) powder in a net shape that was imparted by the printer. Numerous debinding techniques, and corresponding binder systems, are known in the art and may be used as binders in the build materials contemplated herein. By way of non-limiting examples, the debinding techniques may include thermal debinding, chemical debinding, catalytic debinding, supercritical debinding, evaporation and so forth. In one aspect, injection molding materials may be used. For example, some injection molding materials with rheological properties suitable for use in a fused filament fabrication process are engineered for thermal debinding, which advantageously permits debinding and sintering to be performed in a single baking operation, or in two similar baking operations. In another aspect, many binder systems may be quickly and usefully removed in a debinding process by microwaving an object in a microwave oven or otherwise applying energy that selectively removes binder system from a green part. With a suitably adapted debinding process, the binder system may include a single binder, such as a binder that is removable through a pure thermal debind.

More generally, the debinding process removes a binder or binder system from a net shape green object, thus leaving a dense structure of metal (or ceramic or other) particles, generally referred to as a brown part, that can be sintered into the final form. Any materials and techniques suitable for such a process may also or instead be employed for debinding as contemplated herein.

As shown in step 216, the process 200 may include sintering the printed and debound object into a final form. In general, sintering may include any process of densifying and forming a solid mass of material by heating without liquefaction. During a sintering process, necks form between discrete particles of a material, and atoms can diffuse across particle boundaries to fuse into a solid piece. Because sintering can be performed at temperatures below the melting temperature, this advantageously permits fabrication with very high melting point materials such as tungsten and molybdenum.

Numerous sintering techniques are known in the art, and the selection of a particular technique may depend upon the build material used, the size and composition of particles in a material and the desired structural, functional or aesthetic result for the fabricated object. For example, in solid-state (non-activated) sintering, metal powder particles are heated to form connections (or "necks") where they are in contact. Over a thermal sintering cycle, these necks can thicken and create a dense part, leaving small, interstitial voids that can be closed, e.g., by hot isostatic pressing (HIP) or similar processes. Other techniques may also or instead be employed. For example, solid state activated sintering uses a film between powder particles to improve mobility of atoms between particles and accelerate the formation and thickening of necks. As another example, liquid phase sintering may be used, in which a liquid forms around metal particles. This can improve diffusion and joining between particles, but also may leave lower-melting phase within the sintered object that impairs structural integrity. Other advanced techniques such as nano-phase separation sintering may be used, for example to form a high-diffusivity solid at the necks to improve the transport of metal atoms at the contact point, as described for example in "Accelerated sintering in phase-separating nanostructured alloys," Park et al., Nat. Commun. 6:6858 (2015) (DOI: 10.1038/ncomms7858). Sintering may also or instead include partial sintering into a porous article that can be infiltrated with another material to form a final part.

It will be understood that debinding and sintering result in material loss and compaction, and the resulting object may be significantly smaller than the printed object. However, these effects are generally linear in the aggregate, and net shape objects can be usefully scaled up when printing to create a shape with predictable dimensions after debinding and sintering. Additionally, as noted above, it should be appreciated that the method 200 may include sending a fabricated object to a processing facility such as a service bureau or other remote or outsourced facility, and the method 200 may also or instead include receiving the fabricated object at the processing facility and performing any one or more of the post-fabrication steps described above such as the shaping of step 212, the debinding of step 214, or the sintering of step 216.

Figure 3:
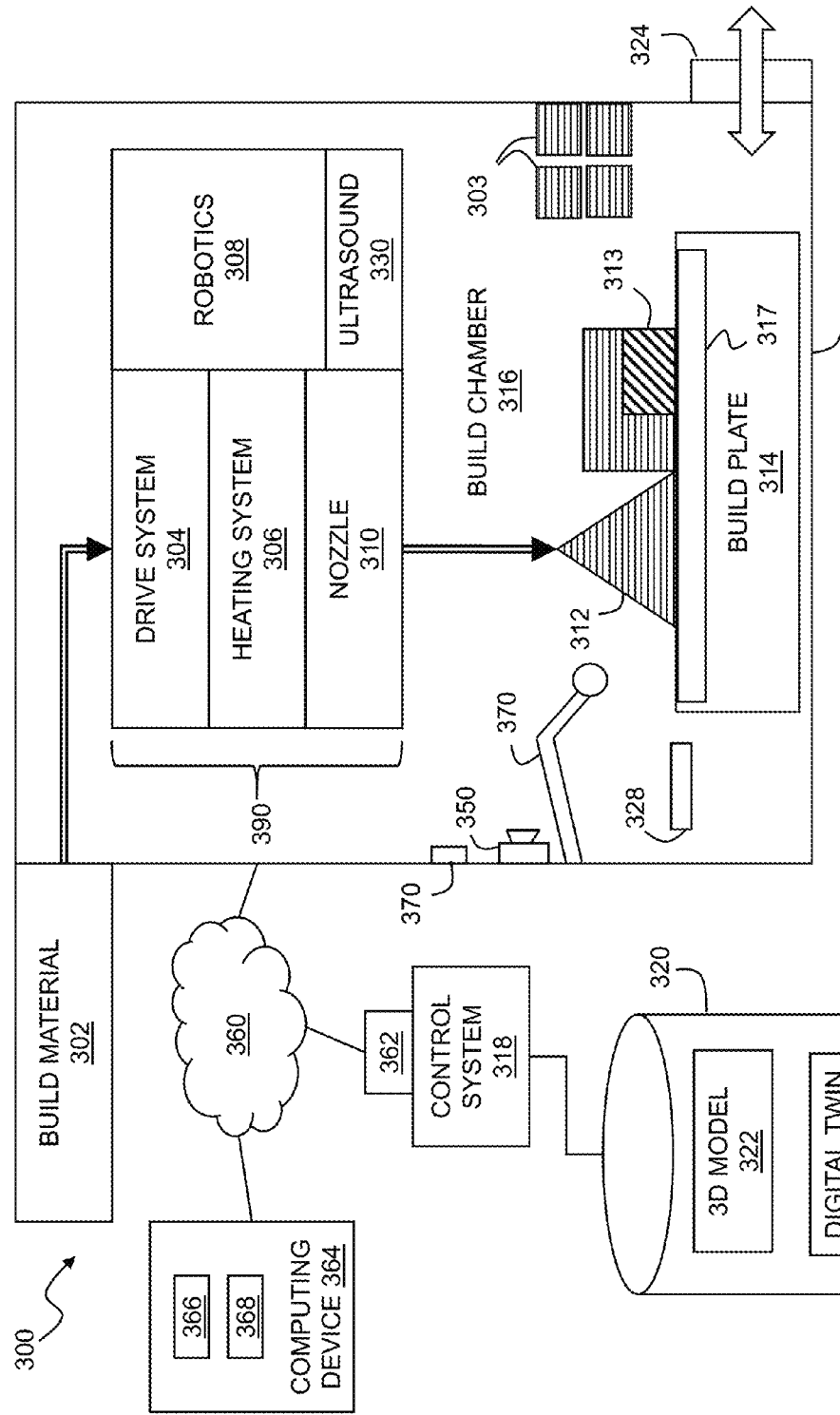
FIG. 3 shows an additive manufacturing system using fused filament fabrication.

FIG. 3 is a block diagram of an additive manufacturing system. The additive manufacturing system 300 shown in the figure may, for example, include a fused filament fabrication additive manufacturing system, or any other additive manufacturing system or combination of manufacturing systems including a printer 301 that deposits a build material 302 according to a computerized model to form an object, along with any related support structures, interface layers, and so forth. While the printer 301 is generally intended for use with sinterable build materials, the additive manufacturing system 300 may also or instead be used with other build materials including plastics, ceramics, and the like, as well as other materials such as interface layers, support structures and the like that do not sinter to form a final part.

In one aspect, the printer 301 may include a build material 302 that is propelled by a drive system 304 and heated to an extrudable state by a heating system 306, and then extruded through one or more nozzles 310. By concurrently controlling robotics 308 to position the nozzle(s) along an extrusion path relative to a build plate 314, an object 312 may be fabricated on the build plate 314 within a build chamber 316.

In general, a control system 318 may manage operation of the printer 301 to fabricate the object 312 according to a three-dimensional model using a fused filament fabrication process or the like.

A printer 301 disclosed herein may include a first nozzle for extruding a first material. The printer 301 may also include a second nozzle for extruding a second material, where the second material has a supplemental function (e.g., as a support material or structure) or provides a second build material with different mechanical, functional, or aesthetic properties useful for fabricating a multi-material object. The second material may be reinforced, for example, with an additive such that the second material has sufficient tensile strength or rigidity at an extrusion temperature to maintain a structural path between the second nozzle and a solidified portion of an object during an unsupported bridging operation. Other materials may also or instead be used as a second material. For example, this may include thermally matched polymers for fill, support, separation layers, or the like. In another aspect, this may include support materials such as water-soluble support materials with high melting temperatures at or near the window for extruding the first material. Useful dissolvable materials may include a salt or any other water soluble material(s) with suitable thermal and mechanical properties for extrusion as contemplated herein. In another aspect, a second (or third, or fourth . . . ) nozzle may be used to introduce an infiltrating material to modify properties of another deposited material, e.g., to strength a material, stabilize an exterior finish, etc. While a printer 301 may usefully include two nozzles, it will be understood that the printer 301 may more generally incorporate any practical number of nozzles, such as three or four nozzles, according to the number of materials necessary or useful for a particular fabrication process.

The build material 302 may be provided in a variety of form factors including, without limitation, any of the form factors described herein or in materials incorporated by reference herein. The build material 302 may be provided, for example, from a hermetically sealed container or the like (e.g., to mitigate passivation), as a continuous feed (e.g., a wire), or as discrete objects such as rods or rectangular prisms that can be fed into a chamber or the like as each prior discrete unit of build material 302 is heated and extruded. In one aspect, the build material 302 may include an additive such as fibers of carbon, glass, Kevlar, boron silica, graphite, quartz, or any other material that can enhance tensile strength of an extruded line of material. In one aspect, the additive(s) may be used to increase strength of a printed object. In another aspect, the additive(s) may be used to extend bridging capabilities by maintaining a structural path between the nozzle and a cooled, rigid portion of an object being fabricated. In one aspect, two build materials 302 may be used concurrently, e.g., through two different nozzles, where one nozzle is used for general fabrication and another nozzle is used for bridging, supports, or similar features.

In an aspect, the build material 302 may be fed (one by one) as billets or other discrete units into an intermediate chamber for delivery into the build chamber 316 and subsequent heating and deposition. Where fabrication is performed in a vacuum or other controlled environment, the build material 302 may also or instead be provided in a cartridge or the like with a vacuum environment (or other controlled environment) that can be directly or indirectly coupled to a corresponding controlled environment of the build chamber 316. In another aspect, a continuous feed of the build material 302, e.g., a wire or the like, may be fed through a vacuum gasket into the build chamber 316 in a continuous fashion, where the vacuum gasket (or any similar fluidic seal) permits entry of the build material 302 into the chamber 316 while maintaining a controlled build environment inside the chamber 316.

In another aspect, the build material 302 may be provided as a supply of preformed blocks 303, and the robotics 308 may include a second robotic system configured to position on or more of the preformed blocks to form an interior structure within the object 312. This may be useful, for example, to quickly build volumes of a relatively large object that do not require shaping of exterior surfaces.

The build material 302 may have any shape or size suitable for extrusion in a fused filament fabrication process. For example, the build material 302 may be in pellet or particulate form for heating and compression, or the build material 302 may be formed as a wire (e.g., on a spool), a billet, or the like for feeding into an extrusion process. More generally, any geometry that might be suitably employed for heating and extrusion might be used as a form factor for a build material 302 as contemplated herein. This may include loose bulk shapes such as spherical, ellipsoid, or flaked particles, as well as continuous feed shapes such as a rod, a wire, a filament, a spool, a block or a volume of pellets.

The build material 302 may include a sinterable build material such as a metal powder loaded into a binder system for heating and extruding using the techniques contemplated herein. The binder system renders the composition flowable for extrusion and is removed through any of a variety of debinding processes. The powdered material is densified into a final part through sintering. For example, the build material 302 may include a metal powder formed of aluminum, steel, stainless steel, titanium alloys, and so forth, and the binder system may be formed of a wax, a thermoplastic, a polymer, or any other suitable material, as well as combinations of the foregoing.

Where the build material 302 includes a particulate such as a powdered material for sintering, the particulate can have any size useful for heating and extrusion in a fused filament fabrication process and for subsequent sintering into a densified object. For example, particles may have an average diameter of between about 1 micron and about 100 microns, such as between about 5 microns and about 80 microns, between about 10 microns and about 60 microns, between about 15 microns and about 50 microns, between about 15 microns and about 45 microns, between about 20 microns and about 40 microns, or between about 25 microns and about 35 microns. For example, in one embodiment, the average diameter of the particulate is between about 25 microns and about 44 microns. In some embodiments, smaller particles, such as those in the nanometer range, or larger particle, such as those bigger than 100 microns, can also or instead be used.

It will be noted that particle sizes are regularly referred to in this disclosure. In practice, a single number rarely suffices to accurately and fully characterize the shapes, sizes, and size distributions of a mixture of particles. For example, a representative diameter may include an arithmetic mean, a volume or surface mean, or a mean diameter over volume. And relevant rheological properties may depend as much on the particle shape as the particle size. For non-symmetric distributions, the mean, median and mode may all be different values. Similarly, distribution widths may vary widely, so regardless of the metric that is used, the distribution may be reported as several values such as D10, D50 and D90, which represent the tenth percentile, fiftieth percentile, and ninetieth percentile respectively. In this description, where a specific metric is provided, then that is the intended metric for characterizing a particle size and/or distribution. Otherwise, and particularly where relative sizes of two or more distributions are given, any suitable method may be usefully employed and in general, the same technique (e.g., measurement instruments and calculations) will preferably be employed for both values where possible. Unless otherwise specifically stated, particles should be understood to have any shape or combination of dimensions, within the stated size range or distribution, suitable for use in the methods, systems, and articles of manufacture contemplated herein.

In one aspect, metal injection molding compositions may be usefully adapted for fused filament fabrication systems and other additive fabrication processes. Metal injection molding is a mature technology that has produced a variety of highly engineered materials with high metal loading (e.g., >50% by volume, and preferably >60% by volume or more (where greater metal loading can improve and accelerates sintering)) and good flow properties at elevated temperatures. A variety of commercially available MIM compositions may be usefully adapted as a build material for fused filament fabrication. While typical MIM particles sizes of 50 microns or more are not obviously suited for use with existing fused filament fabrication (FFF) parts (e.g., nozzles with an exit diameter of 300 microns or less), solid rods of MIM material with smaller particle sizes have been demonstrated to extrude well using a conventional FFF machine with an extrusion diameter of 300 microns and a build material temperature of about 200 degrees Celsius.

In general, the base powder for a build material may be formed of any powder metallurgy material or other metal or ceramic powder(s) suitable for sintering. While the particular process, e.g., fused filament fabrication or stereolithography, may impose dimensional constraints or preferences on the powdered material, it appears that smaller particles are generally preferable. Various techniques have been developed for mass producing fine metal powders for use in MIM processes. In general, powders may be prepared by crushing, grinding, atomization, chemical reactions, or electrolytic deposition. Any such powders from five to ten microns in size, or from one to twenty microns in size, or from about one to fifty microns in size may be used as the powdered base of a build material as contemplated herein. Smaller particles may also be used where they are available and not prohibitively expensive, and larger particles may be used provided that they are compatible with print resolution and physical hardware (e.g., an exit nozzle diameter) of a fabrication device. While not an absolute limit, particle sizes of at least one order of magnitude smaller than an exit orifice for an extruder appear to extrude well during FFF-type extrusion processes. In one embodiment with a 300 μm diameter extrusion, a MIM metal powder with about 1-22 μm mean diameter may be used, although nano-sized powders can also or instead be used.

While many suitable powder metallurgy materials are currently available, this type of material—that combines a powdered material for sintering and a binder for retaining shape net shape and providing a rheology suitable for FFF extrusion—may be further engineered in a number of ways to facilitate rapid prototyping of sinterable green bodies as contemplated herein. For example, as noted above a particle size of 100 microns or smaller may be usefully employed. In one aspect, these particles may be further mixed with smaller nanoparticles (generally at or below one micron in size) of the same material to improve the rate of sintering.

A wide range of metallic powders may usefully be employed. Powders using stainless steel, titanium, titanium alloys, high-nickel alloys, nickel copper alloys, magnetic alloys, and the like are commercially available in MINI materials and suitable for sintering. Powders of the elements titanium, vanadium, thorium, niobium, tantalum, calcium, and uranium have been produced by high-temperature reduction of the corresponding nitrides and carbides. Iron, nickel, uranium, and beryllium submicrometer powders have been demonstrated by reducing metallic oxalates and formates. Exceedingly fine particles also have been prepared by directing a stream of molten metal through a high-temperature plasma jet or flame in order to atomize the material. Various chemical and flame powdering processes may also or instead be used to prevent serious degradation of particle surfaces by atmospheric oxygen. More generally, any technique suitable for producing powdered metals or other materials suitable for sintering may be adapted for the fabrication of a powdered base material. As a significant advantage, these techniques permit the processing and use of relatively high melting temperature metals at the significantly lower temperatures required for sintering. Thus, for example, tungsten or steel alloys with melting temperatures over 1300 degrees Celsius can be usefully sintered at temperatures below 700 degrees Celsius.

Binders may generally be combined with a powdered build material to provide a structure matrix that is suitable for deposition (e.g., in a fused filament fabrication process), and that will support a fabricated net shape after initial fabrication through sintering. In contemporary MIM materials, the binding system may include multiple binders that can be generally classified as bulk binders and backbone binders (also referred to as primary and secondary binders). The bulk binders can flow at elevated temperatures, and retain the shape of an object after an initial build in normal atmospheric conditions. The backbone binder will provide binding later into the sintering process and helps retain the shape as the sintering begins but before substantial sintered strength has been achieved. The backbone binder(s) will be the last to gas off during a sintering process. The binder may vary according to the intended application. For example, the binder may be formed of polymers with a lower glass transition temperature or less viscosity for higher-resolution printing.

In general, the binder systems for commercially available MIM material are not engineered for use in fused fabrication filament processes, and appear to preferably employ polymer mixes that are brittle at room temperature. In one aspect, the polymer system of these commercially available feedstocks may be supplemented with or replaced by a polymer binder system that is flexible at room temperature so that the build material can be formed into a filament and wound onto a spool for extended, continuous feeding to a printer. Also, many different additives may be included in traditional MIM feedstocks, such as lubricants and release oils, to help injection molded parts through the molding process. However, these may not be desired, and a technique may involve removing them and adding components to the MIM binder that make the MIM feedstock more printable.

The binder systems described herein may also or instead be adapted for use with ceramic powders or other materials. The rheology of the extrudate is largely independent of the material that is loaded into the polymer binder system, and depends more on particle geometry than particle composition. As such, any reference to metal injection molding, MIM, or MIM materials should be understood to include ceramics, metal oxides and other powders in a MIM-style binder system, unless a different meaning is expressly stated or otherwise clear from the context.

Other additives may also or instead be included in an engineered material as contemplated herein. For example, the material may incorporate a getter for oxygen or other contaminants as described above, particularly when used as a support material. As another example, the material may include a liquid phase or other surface active additive to accelerate the sintering process.

Any of the foregoing, and similar compositions may be adapted for use as a build material in printing techniques such as fused filament fabrication. For example, MIM feedstock materials, when suitably shaped, can be extruded through nozzles typical of commercially available FFF machines, and are generally flowable or extrudable within typical operating temperatures (e.g., 160-250 degrees Celsius) of such machines. The working temperature range may depend on the binder—e.g., some binders achieve appropriate viscosities at about 205 degrees Celsius, while others achieve appropriate viscosities at lower temperatures such as about 160-180 degrees Celsius. One of ordinary skill will recognize that these ranges (and all ranges listed herein) are provided by way of example and not of limitation.

Any of the foregoing metal injection molding materials, or any other composition containing a base of powdered, sinterable material in a binder system may be used as a build material 302 for fused filament fabrication systems as contemplated herein. Other adaptations of this basic composition may be made to render a build material 302 suitable for stereolithography or other additive fabrication techniques. The term metal injection molding material, as used herein, is intended to include any such engineered materials, as well as other fine powder bases such as ceramics in a similar binder suitable for injection molding. Thus, where the term metal injection molding or the commonly used abbreviation, MIM, is used herein, this should be understood to include commercially available metal injection molding materials, as well as other powder and binder systems using powders other than, or in addition to, metals and, thus, should be understood to include ceramics, and all such materials are intended to fall within the scope of this disclosure unless a different meaning is explicitly provided or otherwise clear from the context. Also, any reference to "MIM materials," "powder metallurgy materials," "MIM feedstocks," or the like shall generally refer to any metal powder and/or ceramic powder mixed with one or more binding materials or binder systems as contemplated herein, unless a different meaning is explicitly provided or otherwise clear from the context.

More generally, any powder and binder system forming a sinterable build material with rheological properties suitable for fused filament fabrication may be used in an additive fabrication process as contemplated herein. Such a build material may generally include a powdered material such as a metallic or ceramic powder for forming a final part and a binder system. The binder system will typically include one or more binders that retain a net shape of the object 312 during processing into the final part. As discussed above, the processing may include, e.g., debinding the net shape to remove at least a portion of the one or more binders and sintering the net shape to join and densify the powdered material. While powdered metallurgy materials are discussed herein, other powder and binder systems may also or instead be employed in a fused filament fabrication process. Still more generally, it should also be appreciated that other sinterable material systems may be suitable for fabricating sinterable net shapes using fabrication techniques such as stereolithography or binder jetting, some of which are discussed in greater detail below.

A drive system 304 may include any suitable gears, compression pistons, or the like for continuous or indexed feeding of the build material 302 into the heating system 306. In another aspect, the drive system 304 may use bellows or any other collapsible or telescoping press to drive rods, billets, or similar units of build material into the heating system 306. Similarly, a piezoelectric or linear stepper drive may be used to advance a unit of build media in an indexed fashion using discrete mechanical increments of advancement in a non-continuous sequence of steps. For more brittle MIM materials or the like, a fine-toothed drive gear of a material such as a hard resin or plastic may be used to grip the material without excessive cutting or stress concentrations that might otherwise crack, strip, or otherwise compromise the build material.

The heating system 306 may employ a variety of techniques to heat a build material to a temperature within a working temperature range where the build material 302 has suitable rheological properties for extrusion in a fused filament fabrication process. This working temperature range may vary according to the type of build material 302, e.g., the constituent powdered material and binder system, being heated by the heating system 306. Any heating system 306 or combination of heating systems suitable for maintaining a corresponding working temperature range in the build material 302 where and as needed to drive the build material 302 to and through the nozzle 310 may be suitably employed as a heating system 306 as contemplated herein.

The robotics 308 may include any robotic components or systems suitable for moving the nozzles 310 in a three-dimensional path relative to the build plate 314 while extruding build material 302 in order to fabricate the object 312 from the build material 302 according to a computerized model of the object. A variety of robotics systems are known in the art and suitable for use as the robotics 308 contemplated herein. For example, the robotics 308 may include a Cartesian coordinate robot or x-y-z robotic system employing a number of linear controls to move independently in the x-axis, the y-axis, and the z-axis within the build chamber 316. Delta robots may also or instead be usefully employed, which can, if properly configured, provide significant advantages in terms of speed and stiffness, as well as offering the design convenience of fixed motors or drive elements. Other configurations such as double or triple delta robots can increase range of motion using multiple linkages. More generally, any robotics suitable for controlled positioning of a nozzle 310 relative to the build plate 314, especially within a vacuum or similar environment, may be usefully employed, including any mechanism or combination of mechanisms suitable for actuation, manipulation, locomotion, and the like within the build chamber 316.

The robotics 308 may position the nozzle 310 relative to the build plate 314 by controlling movement of one or more of the nozzle 310 and the build plate 314. For example, in an aspect, the nozzle 310 is operably coupled to the robotics 308 such that the robotics 308 position the nozzle 310 while the build plate 314 remains stationary. The build plate 314 may also or instead be operably coupled to the robotics 308 such that the robotics 308 position the build plate 314 while the nozzle remains stationary. Or some combination of these techniques may be employed, such as by moving the nozzle 310 up and down for z-axis control, and moving the build plate 314 within the x-y plane to provide x-axis and y-axis control. In some such implementations, the robotics 308 may translate the build plate 314 along one or more axes, and/or may rotate the build plate 314. More generally, the robotics 308 may form a robotic system operable to move the one or more nozzles 310 relative to the build plate 314.

It will be understood that a variety of arrangements and techniques are known in the art to achieve controlled linear movement along one or more axes, and/or controlled rotational motion about one or more axes. The robotics 308 may, for example, include a number of stepper motors to independently control a position of the nozzle 310 or build plate 314 within the build chamber 316 along each axis, e.g., an x-axis, a y-axis, and a z-axis. More generally, the robotics 308 may include without limitation various combinations of stepper motors, encoded DC motors, gears, belts, pulleys, worm gears, threads, and the like. Any such arrangement suitable for controllably positioning the nozzle 310 or build plate 314 may be adapted for use with the additive manufacturing system 300 described herein.

The nozzles 310 may include one or more nozzles for extruding the build material 302 that has been propelled with the drive system 304 and heated with the heating system 306. While a single nozzle 310 and build material 302 is illustrated, it will be understood that the nozzles 310 may include a number of nozzles that extrude different types of material so that, for example, a first nozzle 310 extrudes a sinterable build material while a second nozzle 310 extrudes a support material in order to support bridges, overhangs, and other structural features of the object 312 that would otherwise violate design rules for fabrication with the build material 302. In another aspect, one of the nozzles 310 may deposit an interface material for removable or breakaway support structures that can be removed after sintering.

In one aspect, the nozzle 310 may include one or more ultrasound transducers 330 as described herein. Ultrasound may be usefully applied for a variety of purposes in this context. In one aspect, the ultrasound energy may facilitate extrusion by mitigating adhesion of a build material 302 to interior surfaces of the nozzle 310, or improving layer-to-layer bonding by encouraging mechanical mixing of material between adjacent layers.

In another aspect, the nozzle 310 may include an inlet gas, e.g., an inert gas, to cool media at the moment it exits the nozzle 310. More generally, the nozzle 310 may include any cooling system for applying a cooling fluid to a build material 302 as it exits the nozzle 310. This gas jet may, for example, immediately stiffen extruded material to facilitate extended bridging, larger overhangs, or other structures that might otherwise require support structures during fabrication. The inlet gas may also or instead carry an abrasive such as dry ice particles for smoothing surfaces of the object 312.

In another aspect, the nozzle 310 may include one or more mechanisms to flatten a layer of deposited material and apply pressure to bond the layer to an underlying layer. For example, a heated nip roller, caster, or the like may follow the nozzle 310 in its path through an x-y plane of the build chamber 316 to flatten the deposited (and still pliable) layer. The nozzle 310 may also or instead integrate a forming wall, planar surface, or the like to additionally shape or constrain an extrudate as it is deposited by the nozzle 310. The nozzle 310 may usefully be coated with a non-stick material (which may vary according to the build material 302 being used) in order to facilitate more consistent shaping and smoothing by this tool.

In general, the nozzle 310 may include a reservoir, a heater (such as the heating system 306) configured to maintain a build material 302 within the reservoir in a liquid or otherwise extrudable form, and an outlet. Where the printer 301 includes multiple nozzles 310, a second nozzle may usefully provide any of a variety of additional build materials, support materials, interface materials, and so forth.

For example, the second nozzle 310 may supply a support material with debind and sintering shrinkage properties suitable for maintaining support of an object during processing into a final part. For example, this may include a material consisting of, e.g., the binder system for the sinterable build material without the powdered material that sinters into the final object. In another aspect, the support material may be formed of a wax, or some other thermoplastic or other polymer that can be removed during processing of a printed green body. This support material may, for example, be used for overhang supports, as well as for top or side supports, or any other suitable support structures to provide a physical support during printing and subsequent sintering. It will be understood that printing and sintering may impose different support requirements. As such, different support materials and or different support rules may be employed for each type of required support. Additionally, where a print support is not required during sintering, the print support may be removed after a print and before sintering, while sintering supports would be left attached to the green object until sintering is completed (or until the object achieves a sufficient sinter strength to eliminate the need for the sintering support structures).

In another aspect, the second nozzle (or a third nozzle) may be used to provide an interface material. In one aspect, e.g., where the support material is a ceramic/binder system that debinds and sinters into an unstructured powder, the support material may also usefully serve as the interface material and form an interface layer that does not sinter together with the build material 302 of the object. In another aspect, the second nozzle (or a third nozzle) may provide an interface material that is different from the support material. This may, for example, include the binder system of the build material 302 (or support material), along with a ceramic or some other material that will not sinter under the time and temperature conditions used to sinter the powdered material in the build material 302 that forms the object 312. This may also or instead include a material that forms a brittle interface with the sintered part so that it can break away from the final object easily after sintering. Where this interface material does not sinter, it may be used in combination with a sinterable support structure that can continue to provide structural support during a sintering process.

The support material(s) may usefully integrate other functional substances. For example, titanium may be added to the support material as an oxygen getter to improve the build environment without introducing any titanium into the fabricated object. More generally, the support material (or an interface material of a layer between the support material and the object 312) may include a constituent with a substantially greater chemical affinity for oxygen than the build material 302, in order to mitigate oxidation of the build material 302 during fabrication. Other types of additives may also or instead be used to remove contaminants. For example, a zirconium powder (or other strong carbide former) may be added to the support material in order to extract carbon contamination during sintering.

The object 312 may be any object suitable for fabrication using the techniques contemplated herein. This may include functional objects such as machine parts, aesthetic objects such as sculptures, or any other type of objects, as well as combinations of objects that can be fit within the physical constraints of the build chamber 316 and build plate 314. Some structures such as large bridges and overhangs cannot be fabricated directly using FFF because there is no underlying physical surface onto which a material can be deposited. In these instances, a support structure 313 may be fabricated, preferably of a soluble or otherwise readily removable material, in order to support a corresponding feature of the object 312. An interface layer may also be fabricated or otherwise formed between the support structure 313 and the object 312 to facilitate separation of the two structures after sintering or other processing.

The build plate 314 may be formed of any surface or substance suitable for receiving deposited metal or other materials from the nozzles 310. The surface of the build plate 314 may be rigid and substantially planar. In one aspect, the build plate 314 may be heated, e.g., resistively or inductively, to control a temperature of the build chamber 316 or a surface upon which the object 312 is being fabricated. This may, for example, improve adhesion, prevent thermally induced deformation or failure, and facilitate relaxation of stresses within the object 312. In another aspect, the build plate 314 may be a deformable structure or surface that can bend or otherwise physically deform in order to detach from a rigid object 312 formed thereon. The build plate 314 may be movable within the build chamber 316, e.g., by a positioning assembly (e.g., the same robotics 308 that position the nozzle 310 or different robotics). For example, the build plate 314 may be movable along a z-axis (e.g., up and down—toward and away from the nozzle 310), or along an x-y plane (e.g., side to side, for instance in a pattern that forms the tool path or that works in conjunction with movement of the nozzle 310 to form the tool path for fabricating the object 312), or some combination of these. In an aspect, the build plate 314 is rotatable.

The build plate 314 may include a temperature control system for maintaining or adjusting a temperature of at least a portion of the build plate 314. The temperature control system may be wholly or partially embedded within the build plate 314. The temperature control system may include without limitation one or more of a heater, coolant, a fan, a blower, or the like. In implementations, temperature may be controlled by induction heating of the metallic printed part. The build plate 314 may usefully incorporate a thermal control system 317 for controllably heating and/or cooling the build plate 314 during a printing process.

In general, the build chamber 316 houses the build plate 314 and the nozzle 310, and maintains a build environment suitable for fabricating the object 312 on the build plate 314 from the build material 302. Where appropriate for the build material 302, this may include a vacuum environment, an oxygen depleted environment, a heated environment, an inert gas environment, and so forth. The build chamber 316 may be any chamber suitable for containing the build plate 314, an object 312, and any other components of the printer 301 used within the build chamber 316 to fabricate the object 312.

The printer 301 may include a pump 324 coupled to the build chamber 316 and operable to create a vacuum within the build chamber 316 or otherwise filter or handle air during a printing process. While powdered metallurgy materials and other powder/binder systems contemplated herein will not typically require a vacuum environment, a vacuum may nonetheless be used to reduce contaminants or otherwise control the operating environment for a printing process. A number of suitable vacuum pumps are known in the art and may be adapted for use as the pump 324 contemplated herein. The build chamber 316 may form an environmentally sealed chamber so that it can be evacuated with the pump 324, or so that temperature and air flow through the build chamber 316 can be controlled. The environmental sealing may include thermal sealing, e.g., to prevent an excess of heat transfer from heated components within the build volume to an external environment, and vice-versa. The seal of the build chamber 316 may also or instead include a pressure seal to facilitate pressurization of the build chamber 316, e.g., to provide a positive pressure that resists infiltration by surrounding oxygen and other ambient gases or the like. To maintain the seal of the build chamber 316, any openings in an enclosure of the build chamber 316, e.g., for build material feeds, electronics, and so on, may include suitably corresponding vacuum seals or the like.

The build chamber 316 may include a temperature control system 328 for maintaining or adjusting a temperature of at least a portion of a volume of the build chamber 316 (e.g., the build volume). The temperature control system 328 may include without limitation one or more of a heater, a coolant, a fan, a blower, or the like. The temperature control system 328 may use a fluid or the like as a heat exchange medium for transferring heat as desired within the build chamber 316. The temperature control system 328 may also or instead move air (e.g., circulate air) within the build chamber 316 to control temperature, to provide a more uniform temperature, or to transfer heat within the build chamber 316.

The temperature control system 328, or any of the temperature control systems described herein (e.g., a temperature control system of the heating system 306 or a temperature control system of the build plate 314) may include one or more active devices such as resistive elements that convert electrical current into heat, Peltier effect devices that heat or cool in response to an applied current, or any other thermoelectric heating and/or cooling devices. Thus, the temperature control systems discussed herein may include a heater that provides active heating to the components of the printer 301, a cooling element that provides active cooling to the components of the printer 301, or a combination of these. The temperature control systems may be coupled in a communicating relationship with the control system 318 in order for the control system 318 to controllably impart heat to or remove heat from the components of the printer 301. It will be further understood that the temperature control system 328 for the build chamber 316, the temperature control system of the heating system 306, and the temperature control system of the build plate 314, may be included in a singular temperature control system (e.g., included as part of the control system 318 or otherwise in communication with the control system 318) or they may be separate and independent temperature control systems. Thus, for example, a heated build plate or a heated nozzle may contribute to heating of the build chamber 316 and form a component of a temperature control system 328 for the build chamber 316.

In general, a control system 318 may include a controller or the like configured by computer executable code to control operation of the printer 301. The control system 318 may be operable to control the components of the additive manufacturing system 300, such as the nozzle 310, the build plate 314, the robotics 308, the various temperature and pressure control systems, and any other components of the additive manufacturing system 300 described herein to fabricate the object 312 from the build material 302 based on a three-dimensional model 322 or any other computerized model describing the object 312. The control system 318 may include any combination of software and/or processing circuitry suitable for controlling the various components of the additive manufacturing system 300 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the control system 318 may include a microprocessor or other processing circuitry with sufficient computational power to provide related functions such as executing an operating system, providing a graphical user interface (e.g., to a display coupled to the control system 318 or printer 301), converting three-dimensional models 322 into tool instructions, and operating a web server or otherwise hosting remote users and/or activity through a network interface 362 for communication through a network 360.

The control system 318 may include a processor and memory, as well as any other co-processors, signal processors, inputs and outputs, digital-to-analog or analog-to-digital converters, and other processing circuitry useful for controlling and/or monitoring a fabrication process executing on the printer 301, e.g., by providing instructions to control operation of the printer 301. To this end, the control system 318 may be coupled in a communicating relationship with a supply of the build material 302, the drive system 304, the heating system 306, the nozzles 310, the build plate 314, the robotics 308, and any other instrumentation or control components associated with the build process such as temperature sensors, pressure sensors, oxygen sensors, vacuum pumps, and so forth.

The control system 318 may generate machine-ready code for execution by the printer 301 to fabricate the object 312 from the three-dimensional model 322. In another aspect, the machine-ready code may be generated by an independent computing device 364 based on the three-dimensional model 322 and communicated to the control system 318 through a network 360, which may include a local area network or an internetwork such as the Internet, and the control system 318 may interpret the machine-ready code and generate corresponding control signals to components of the printer 301. The control system 318 may deploy a number of strategies to improve the resulting physical object structurally or aesthetically. For example, the control system 318 may use plowing, ironing, planing, or similar techniques where the nozzle 310 is run over existing layers of deposited material, e.g., to level the material, remove passivation layers, or otherwise prepare the current layer for a next layer of material and/or shape and trim the material into a final form. The nozzle 310 may include a non-stick surface to facilitate this plowing process, and the nozzle 310 may be heated and/or vibrated (using the ultrasound transducer) to improve the smoothing effect. In one aspect, these surface preparation steps may be incorporated into the initially-generated machine ready code such as g-code derived from a three-dimensional model and used to operate the printer 301 during fabrication. In another aspect, the printer 301 may dynamically monitor deposited layers and determine, on a layer-by-layer basis, whether additional surface preparation is necessary or helpful for successful completion of the object 312. Thus, in one aspect, there is disclosed herein a printer 301 that monitors a metal FFF process and deploys a surface preparation step with a heated or vibrating non-stick nozzle when a prior layer of the metal material is unsuitable for receiving additional metal material.

In general, a three-dimensional model 322 or other computerized model of the object 312 may be stored in a database 320 such as a local memory of a computing device used as the control system 318, or a remote database accessible through a server or other remote resource, or in any other computer-readable medium accessible to the control system 318. The control system 318 may retrieve a particular three-dimensional model 322 in response to user input, and generate machine-ready instructions for execution by the printer 301 to fabricate the corresponding object 312. This may include the creation of intermediate models, such as where a CAD model is converted into an STL model, or other polygonal mesh or other intermediate representation, which can in turn be processed to generate machine instructions such as g-code for fabrication of the object 312 by the printer 301.

In operation, to prepare for the additive manufacturing of an object 312, a design for the object 312 may first be provided to a computing device 364. The design may be a three-dimensional model 322 included in a CAD file or the like. The computing device 364 may in general include any devices operated autonomously or by users to manage, monitor, communicate with, or otherwise interact with other components in the additive manufacturing system 300. This may include desktop computers, laptop computers, network computers, tablets, smart phones, smart watches, or any other computing device that can participate in the system as contemplated herein. In one aspect, the computing device 364 is integral with the printer 301.

The computing device 364 may include the control system 318 as described herein or a component of the control system 318. The computing device 364 may also or instead supplement or be provided in lieu of the control system 318. Thus, unless explicitly stated to the contrary or otherwise clear from the context, any of the functions of the computing device 364 may be performed by the control system 318 and vice-versa. In another aspect, the computing device 364 is in communication with or otherwise coupled to the control system 318, e.g., through a network 360, which may be a local area network that locally couples the computing device 364 to the control system 318 of the printer 301, or an internetwork such as the Internet that remotely couples the computing device 364 in a communicating relationship with the control system 318.

The computing device 364 (and the control system 318) may include a processor 366 and a memory 368 to perform the functions and processing tasks related to management of the additive manufacturing system 300 as described herein. In general, the memory 368 may contain computer code that can be executed by the processor 366 to perform the various steps described herein, and the memory may further store data such as sensor data and the like generated by other components of the additive manufacturing system 300.

In general, a fabrication process such as fused filament fabrication implies, or expressly includes, a set of design rules to accommodate physical limitations of a fabrication device and a build material. For example, an overhang cannot be fabricated without positioning a support structure underneath. While the design rules for a process such as fused filament fabrication (FFF) will apply to fabrication of a green body using FFF techniques as described herein, the green body will also be subject to various debinding and sintering rules. This may, for example, include a structure to prevent or minimize drag on a floor while a part shrinks during sintering (which may be 20% or more depending on the composition of the green body). Similarly, certain supports are required during sintering that are different than the supports required during fused filament fabrication. Where parts are nested, such as a pair of overlapping cantilevered beams, it may also be important for intervening support structures to shrink slightly more quickly than the supported structures in order to prevent capturing and potentially deforming the cantilevers. As another example, injection molding typically aims for uniform wall thickness to reduce variability in debinding and/or sintering behaviors, with thinner walls being preferred. The system contemplated herein will apply these disparate sets of design rules—those for the rapid prototyping system (e.g., fused filament fabrication), those for debinding, and those for sintering process—to a CAD model that is being prepared for fabrication so that an object may be fabricated from the CAD model and further processed while substantially retaining a desired or intended net shape.

These rules may also be combined under certain conditions. For example, the support structures required for an overhang during fabrication must resist the force of an extrusion/deposition process used to fabricate a bottom surface of the overhang, whereas the support structure during sintering only needs to resist the forces of gravity during the baking process. Thus, there may be two separate supports that are removed at different times during a fabrication process: the fabrication supports that are configured to resist the force of a fabrication process which may be configured to breakaway from a loose mechanical coupling to a green body, and sintering supports that may be less extensive, and only need to resist the gravitation forces on a body during sintering. These latter supports are preferably coupled to the object through a non-sinterable layer to permit easy removal from the densified final object. In another aspect, the fabrication supports may be fabricated from binder without a powder or other fill so that they completely disappear during a sintering process.

During fabrication, detailed data may be gathered for subsequent use and analysis. This may, for example, include data from a sensor and computer vision system that identifies errors, variations, or the like that occur in each layer of an object 312. Similarly, tomography or the like may be used to detect and measure layer-to-layer interfaces, aggregate part dimensions, and so forth. This data may be gathered and delivered with the object to an end user as a digital twin 340 of the object 312, e.g., so that the end user can evaluate how variations and defects might affect use of the object 312. In addition to spatial/geometric analysis, the digital twin 340 may log process parameters including, e.g., aggregate statistics such as weight of material used, time of print, variance of build chamber temperature, and so forth, as well as chronological logs of any process parameters of interest such as volumetric deposition rate, material temperature, environment temperature, and so forth.

The digital twin 340 may also usefully log a thermal history of the build material 302, e.g., on a voxel-by-voxel or other volumetric basis within the completed object 312. Thus, in one aspect, the digital twin 340 may store a spatial temporal map of thermal history for build material that is incorporated into the object 312, which may be used, e.g., to estimate an onset of early sintering, loss of binder system, or other possible thermal effects that might accumulate during a fabrication process. The control system 318 may use this information during fabrication, and may be configured to adjust a thermal parameter of a fused filament fabrication system or the like during fabrication according to the spatial temporal map of thermal history. For example, the control system 318 may usefully cool a build chamber or control an extrusion temperature to maintain a more uniform degree of thermal debind throughout the fabricated object 312.

The printer 301 may include a camera 350 or other optical device. In one aspect, the camera 350 may be used to create the digital twin 340 or provide spatial data for the digital twin 340. The camera 350 may more generally facilitate machine vision functions or facilitate remote monitoring of a fabrication process. Video or still images from the camera 350 may also or instead be used to dynamically correct a print process, or to visualize where and how automated or manual adjustments should be made, e.g., where an actual printer output is deviating from an expected output. The camera 350 can be used to verify a position of the nozzle 310 and/or build plate 314 prior to operation. In general, the camera 350 may be positioned within the build chamber 316, or positioned external to the build chamber 316, e.g., where the camera 350 is aligned with a viewing window formed within a chamber wall.

The additive manufacturing system 300 may include one or more sensors 370. The sensor 370 may communicate with the control system 318, e.g., through a wired or wireless connection (e.g., through a data network 360). The sensor 370 may be configured to detect progress of fabrication of the object 312, and to send a signal to the control system 318 where the signal includes data characterizing progress of fabrication of the object 312. The control system 318 may be configured to receive the signal, and to adjust at least one parameter of the additive manufacturing system 300 in response to the detected progress of fabrication of the object 312. The one or more sensors 370 may include without limitation one or more of a contact profilometer, a non-contact profilometer, an optical sensor, a laser, a temperature sensor, motion sensors, an imaging device, a camera, an encoder, an infrared detector, a volume flow rate sensor, a weight sensor, a sound sensor, a light sensor, a sensor to detect a presence (or absence) of an object, and so on.

As discussed herein, the control system 318 may adjust a parameter of the additive manufacturing system 300 in response to the sensor 370. The adjusted parameter may include a temperature of the build material 302, a temperature of the build chamber 316 (or a portion of a volume of the build chamber 316), and a temperature of the build plate 314. The parameter may also or instead include a pressure such as an atmospheric pressure within the build chamber 316. The parameter may also or instead include an amount or concentration of an additive for mixing with the build material such as a strengthening additive, a colorant, an embrittlement material, and so forth.

The nozzle 310 may be configured to transmit a signal to the control system 318 indicative of any sensed condition or state such as a conductivity of the build material 302, a type of the build material 302, a diameter of an outlet of the nozzle 310, a force exerted by the drive system 304 to extrude build material 302, a temperature of the heating system 306, or any other useful information. The control system 318 may receive any such signal and control an aspect of the build process in response.

In one aspect, the one or more sensors 370 may include a sensor system configured to volumetrically monitor a temperature of a build material 302, that is, to capture temperature at specific locations within a volume of the build material 302 before extrusion, during extrusion, after extrusion, or some combination of these. This may include surface measurements where available, based on any contact or non-contact temperature measurement technique. This may also or instead include an estimation of the temperature within an interior of the build material 302 at different points along the feed path and within the completed object. Using this accumulated information, a thermal history may be created that includes the temperature over time for each voxel of build material within the completed object 312, all of which may be stored in the digital twin 340 described below and used for in-process control of thermal parameters during printing, control of downstream processing such as debinding and sintering, or post-process review and analysis of the object 312.

The additive manufacturing system 300 may include, or be connected in a communicating relationship with, a network interface 362. The network interface 362 may include any combination of hardware and software suitable for coupling the control system 318 and other components of the additive manufacturing system 300 in a communicating relationship to a remote computer (e.g., the computing device 364) through a data network 360. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to a local area network or the like that is in turn coupled to a wide area data network such as the Internet. This may also or instead include hardware/software for a WiMAX connection or a cellular network connection (using, e.g., CDMA, GSM, LTE, or any other suitable protocol or combination of protocols). Consistently, the control system 318 may be configured to control participation by the additive manufacturing system 300 in any network 360 to which the network interface 362 is connected, such as by autonomously connecting to the network 360 to retrieve printable content, or responding to a remote request for status or availability of the printer 301.

Other useful features may be integrated into the printer 301 described above. For example, the printer 301 may include a solvent source and applicator, and the solvent (or other material) may be applied to a specific (e.g., controlled by the printer 301) surface of the object 312 during fabrication, such as to modify surface properties. The added material may, for example, intentionally oxidize or otherwise modify a surface of the object 312 at a particular location or over a particular area in order to provide a desired electrical, thermal, optical, mechanical, or aesthetic property. This capability may be used to provide aesthetic features such as text or graphics, or to provide functional features such as a window for admitting RF signals. This may also be used to apply a release layer or modify an existing support or object layer for breakaway support.

In some implementations, the computing device 364 or the control system 318 may identify or create a support structure 313 that supports a portion of the object 312 during fabrication. In general, the support structure 313 may be a sacrificial structure that is removed after fabrication has been completed. In some such implementations, the computing device 364 may identify a technique for manufacturing the support structure 313 based on factors such as the object 312 being manufactured, the materials being used to manufacture the object 312, and user input. The support structure 313 may be fabricated from a high-temperature polymer or other material that will form a weak bond to the build material 302. In another aspect, an interface between the support structure 313 and the object 312 may be manipulated to weaken the interlayer bond to facilitate the fabrication of breakaway support.

The printer 301 may also usefully integrate a supplemental tool 380 such as a subtractive fabrication tool (e.g., a drill, a milling tool, or other multi-axis controllable tool) for removing material from the object 312 that deviates from an expected physical output based on the three-dimensional model 322 used to fabricate the object 312. A milling tool, for example, may be configured for shaping the build material on the build plate 314 after extrusion from the extruder 390 and prior to sintering of the object 314. While combinations of additive and subtractive technologies have been contemplated, the use of MIM materials provides a unique advantage when subtractive shaping is performed on a green object after net shape forming but before sintering (or debinding), where the object 112 is relatively soft and workable. This permits quick and easy removal of physically observable defects and printing artifacts before the object 112 is sintered into a metal object. This may also include imposing certain features or structures onto the object, either according to the three-dimensional model 322 or some other manual specification or the like. For example, this may include tapping threads into the object, or creating through holes or other structures that can be readily imposed by a subtractive drilling, grinding, routing, or other subtractive process. This approach may be particularly advantageous where the feature of interest, e.g., a horizontal threaded through-hole, might be more difficult to accurately fabricate with additive manufacturing. Where subtractive fabrication is specified within the part, the additive model may also include adequate layer thicknesses and infill, e.g., in a fused filament fabrication process, to provide adequate material clearances around the subtracted feature.

In another aspect, the supplemental tool 380 may be a tool for fabricating overhead supports as described herein. For example, the supplemental tool 380 may include a supplemental additive fabrication system configured to form a support structure above a surface of an object, the surface being upwardly vertically exposed and the support structure including a superstructure coupled to the surface to support a downward vertical load on the object. Suitable overhead support structures are described by way of example with reference to FIGS. 9-10 below.

In one general aspect, the drive system 304, the heating system 306, the nozzle 310 and any other complementary components may form an extruder 390 for extruding one of the materials described herein, and the printer 300 may include any number of such extruders 390 according to the number and type of materials used in a fabrication process. Thus, there is generally disclosed herein a printer 300 for three-dimensional fabrication, the printer 400 including a build plate 314, a first extruder 390, a second extruder 390, a robotic system including robotics 308 operable to move the first extruder 390 and the second extruder 390 relative to the build plate 314, and a processor (e.g., the processor of the control system 318). The first extruder 390 may be coupled to a first source of a build material 302 for fabricating an object 312, where the build material 302 includes a powdered material for forming the object 312 and a binder system including one or more binders, where the one or more binders resist deformation of a net shape of the object 312 during processing of the object into a final part. The second extruder 390 may be coupled to a second source of an interface material for fabricating an interface layer between the object 312 and an adjacent surface of a support structure 313, where the interface material resists bonding of the object 312 to the support structure 313 during sintering. The processor may be configured by computer executable code to move the robotic system along a build path relative to the build plate 314 while extruding from at least one of the first extruder 390 and the second extruder 390 to fabricate the object 312 on the build plate 314 based on a computerized model (e.g., the three-dimensional model 322) of the object 314.

The first extruder 390 may be the second extruder 390, e.g., where the printer 300 uses material swapping to switch between a build material and an interface material for the single extruder. The printer 300 may also or instead include a third extruder 390 coupled to a third source of a support material for fabricating the support structure 313, or to a second build material for use in multi-material fabrication. In another aspect, the support structure 313 may be formed of the same material as the object 312, e.g., where the processor is configured to form the support structure 313 by extruding the build material 302 from the first extruder 390.

Figure 4:
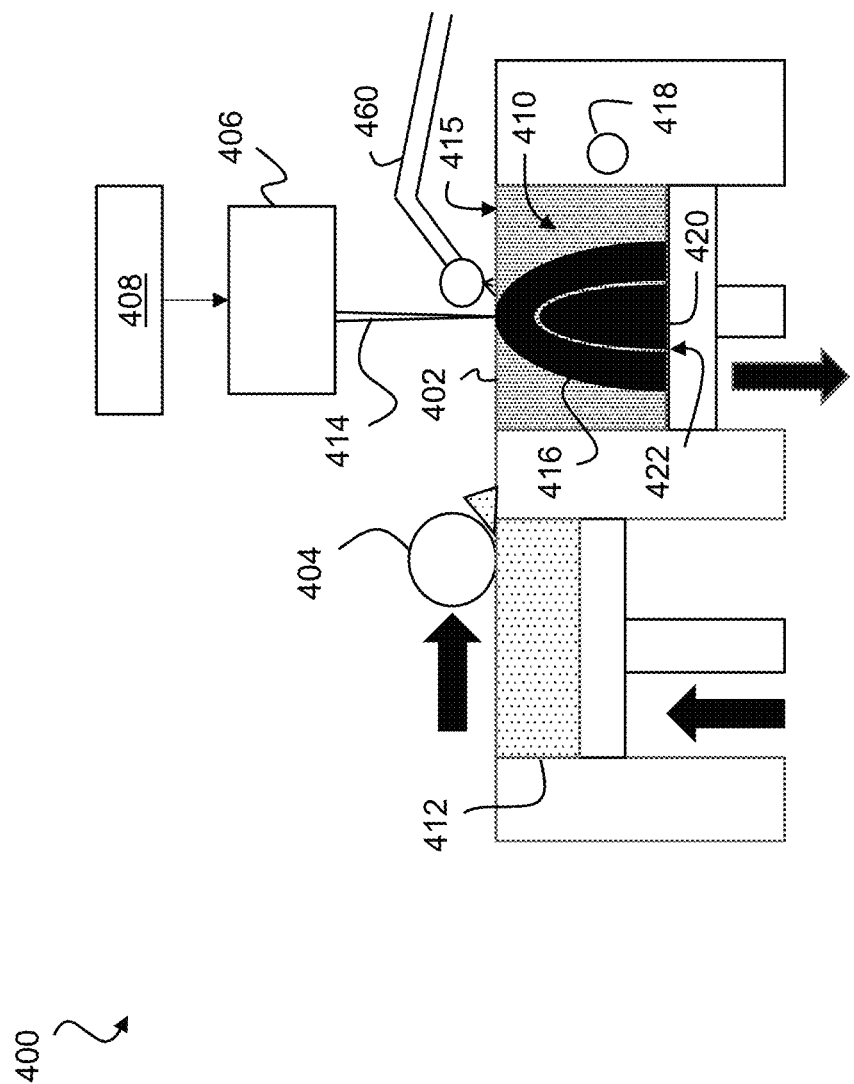
FIG. 4 shows an additive manufacturing system using binder jetting.

FIG. 4 shows an additive manufacturing system using binder jetting. As contemplated herein, binder jetting techniques can be used to deposit and bind metallic particles or the like in a net shape for debinding and sintering into a final part. Where support structures are required to mitigate deformation of the object during the debinding and/or sintering, an interface layer may be formed between the support structures and portions of the object in order to avoid bonding of the support structure to the object during sintering.

In general, a printer 400 for binder jetting may include a powder bed 402, a spreader 404 (e.g., a roller) movable across the powder bed 402, a print head 406 movable across the powder bed 402, and a controller 408 in electrical communication with the print head 406. The powder bed 402 can include, for example, a packed quantity of a powder 410 of microparticles of a first metal. The spreader 404 can be movable across the powder bed 402 to spread a layer of powder 410 from a supply 412 of a powdered material across the powder bed 402. In one aspect, the spreader 404 may be a bi-directional spreader configured to spread powder from the supply 412 in one direction, and from a second supply (not shown) on an opposing side of the powder bed 402 in a return direction in order to speed the processing time for individual layers.

The print head 406 can define a discharge orifice and, in certain implementations, can be actuated (e.g., through delivery of an electric current to a piezoelectric element in mechanical communication with the binder 414) to dispense a binder 414 through the discharge orifice to the layer of powder spread across the powder bed 402. The binder 414 can include a carrier and nanoparticles of a second metal dispersed in the carrier and, when dispersed onto the powder layer, can fill a substantial portion of void space of the powder 410 in the layer such that the nanoparticles of the binder 414 are dispersed among the nanoparticles of the powder 410 in the layer. The nanoparticles of the binder 414 can have a lower sinter temperature than the microparticles of the powder 410, and the distribution of nanoparticles throughout the microparticles in the powder bed 402 can facilitate formation of sinter necks in situ in a three-dimensional object 416 in the powder bed 402. As compared to a three-dimensional object without such sinter necks, the three-dimensional object 416 with sinter necks can have greater strength and, therefore, be less prone to sagging or other deformation as the three-dimensional object 416 is subject to subsequent processing to form a final part.

The supply 412 of the powdered material may provide any material suitable for use as a build material as contemplated herein, such as a sinterable powder of material selected for a final part to be formed from the object 416. The supply 412 and the spreader 404 may supply the powdered material to the powder bed 402, e.g., by lifting the powder 410 and displacing the powder to the powder bed 402 using the spreader 404, which may also spread the powdered material across the powder bed 402 in a substantially uniform layer for binding with the print head 406.

In use, the controller 408 can actuate the print head 406 to deliver the binder 414 from the print head 406 to each layer of the powder 410 in a controlled two-dimensional pattern as the print head 406 moves across the powder bed 402. It should be appreciated that the movement of the print head 406 and the actuation of the print head 406 to deliver the binder 414 can be done in coordination with movement of the spreader 404 across the print bed. For example, the spreader 404 can spread a layer of the powder 410 across the print bed, and the print head 406 can deliver the binder 414 in a controlled two-dimensional pattern to the layer of the powder 410 spread across the print bed to form a layer of a three-dimensional object 416. These steps can be repeated (e.g., with controlled two-dimensional pattern for each respective layer) in sequence to form subsequent layers until, ultimately, the three-dimensional object 416 is formed in the powder bed 402. Thus, the printer 400 may be configured to apply a binder 414 to a top surface 415 of the powdered material (e.g., the powder 410) in the powder bed 402 according to a computerized model of the object 416. The printer 400 may more specifically be configured to apply the binder 414 according to a two-dimensional cross section of the computerized model and to apply a second binder (which may be the binder 414 for the object) in a second pattern to bind other regions of the powdered material to form a support structure 420 adjacent to at least one surface of the object 416. This may, for example, be based on a second computerized model of a sinter support for the object, e.g., to support various features of the object 416 against collapse or other deformation during sintering. Where an interface layer 422 is used, the binder and the second binder may be a substantially similar or identical binder system deposited from a single print head.

In certain implementations, the additive manufacturing system can further include a heater 418 in thermal communication with the powder bed 402. For example, the heater 418 can be in conductive thermal communication with the powder bed 402. As a specific example, the heater 418 can be a resistance heater embedded in one or more walls defining a volume of the powder bed 402. Additionally, or alternatively, the heater 418 can be an induction heater.

The heater 418 can be controlled (e.g., through electrical communication with the controller 408) to heat the three-dimensional object 416 in the powder bed 402 to a target temperature (e.g., greater than about 100 degrees Celsius and less than about 600 degrees Celsius). For example, in instances in which the nanoparticles sinter at a lower temperature than the microparticles, the target temperature can be greater than a sintering temperature of the nanoparticles and less than a sintering temperature of the microparticles. It should be appreciated that, at such a target temperature, the nanoparticles of the binder 414 can sinter while the microparticles remain relatively unsintered. Because the nanoparticles are selectively distributed in the powder bed 402, through the controlled two-dimensional pattern of the binder 414 in each layer of the three-dimensional object 416, such preferential sintering of the nanoparticles in the powder bed 402 can produce sinter necks throughout the three-dimensional object 416. In general, the presence of these sinter necks throughout the three-dimensional object 416 strengthens the three-dimensional object 416. The strengthened three-dimensional object 416 can be removed from the powder bed 402 and subjected to one or more finishing process with a reduced likelihood of deformation or other defects, as compared to a three-dimensional object without sinter necks.

While the technique described above may facilitate improved sintering properties in a green part or other pre-sintered net shape object, structural support may nonetheless be required. In such instances, a support structure 420 may be fabricated under the three-dimensional object 416 to provide support against drooping or other deformation during sintering. In these instances, a deposition tool 460 may be configured to apply an interface material at an interface between the support structure 420 and the object 416 that resists bonding of the support structure 420 to the object 416 during sintering at sintering temperatures suitable for the powder 410. Thus, the deposition tool 460 may be used to form an interface layer 422 between the support structure 420 and the object 416, e.g., by inhibiting or preventing sintering of powder 410 from the powder bed 402 that remains between the support structure 420 and the object 416 when sintering begins. In general, the deposition tool 460 may be a jetting print head or any other tool or combination of tools suitable for depositing a corresponding layer of material in a controlled pattern to form the interface layer 422. The deposition tool 460 may, for example, deposit a colloidal suspension of small (relative to the powder 410) nano-particles of a high-temperature sintering material (also relative to the powder 410). For example, the powder 410 may be a metallic powder such as a sinterable metal powder with a mean particle size of at least fifteen microns, or mean particle size of about ten to thirty-five microns, and the deposition tool 460 may deposit a colloidal suspension of ceramic particles sized to infiltrate the sinterable powder in a surface of the support structure 420 adjacent to the object 416. The ceramic particles may, for example, have a mean particle size of one micron or less, or at least one order of magnitude smaller than a similarly measured mean particle size of the sinterable powder. These smaller particles may infiltrate the powder 410 in the interface layer 422 and form a barrier to formation of necks between the particles of the powder 410.

In another aspect, the interface material may include a layer of ceramic particles deposited at a surface of the support structure 420 adjacent to the object 416. These ceramic particles may be solidified, e.g., in a binder or the like to prevent displacement by subsequent layers of the sinterable powder, thus forming a sinter-resistant ceramic layer between the support structure 420 and the object 416. The ceramic particles may, for example, be deposited in a carrier that gels upon contact with the sinterable powder in the powder bed 402, or in a curable carrier, where a curing system such as a light source or heat source is configured to cure the curable carrier substantially concurrently with deposition on the sinterable powder, e.g., to prevent undesired infiltration into any adjacent regions of the support structure 420 or the object 416. In another aspect, the interface material may include a material that remains as an interface layer physically separating the support structure from the object after debind and into a thermal sintering cycle, e.g., where a ceramic powder layer is deposited and cured into position before another layer of powder 410 is spread over the powder bed 402. In one aspect, the interface material may be deposited in an intermittent pattern such as an array of non-touching hexagons between the support structure 420 and the object 416 to create a corresponding pattern of gaps between the support structure and the object after sintering. This latter structure may usefully weaken a mechanical coupling between the support structure 420 and the object 416 to facilitate removal of the support structure 420 after sintering.

Other suitable techniques for forming a sinter-resistant layer on a sinterable three-dimensional object are described by way of non-limiting examples, in Khoshnevis, et al., "Metallic part fabrication using selective inhibition sintering (SIS)," Rapid Prototyping Journal, Vol. 18:2, pp. 144-153 (2012) and U.S. Pat. No. 7,291,242 to Khoshnevis, each of which is hereby incorporated by reference in its entirety. By way of non-limiting example, suitable techniques for inhibiting sintering on a surface of an object include the use of a ceramic as a macroscopic mechanical inhibitor, an application of lithium chloride and aluminum sulfate as microscopic mechanical inhibitors, and an application of sulfuric acid and hydrogen peroxide as chemical inhibitors. More generally, any technique for mechanically, chemically or otherwise inhibiting sintering may be usefully employed to create an interface layer 422 within the powder bed 410 to facilitate post-sintering separation of the object 416 and the support structure 420.

A variety of useful material systems may be adapted for use in a printer 400 that uses binder jetting to fabricate an interface layer between a support structure and an object. For example, the interface material may usefully contain a soluble metal salt that transforms to a ceramic upon dehydration and heating, such as a salt containing at least one of a hydroxide, a chloride, a sulfate, a nitrate, an acetate, and a stearate. The interface material may also or instead include an aluminum, and the interface material may include at least one of zirconium, yttrium, silicon, titanium, iron, magnesium, and calcium. In another aspect, the binder may include a secondary infiltrant selected to modify properties of the final part, such as at least one of a carbon, a boron, and a metal salt.

Figure 5:
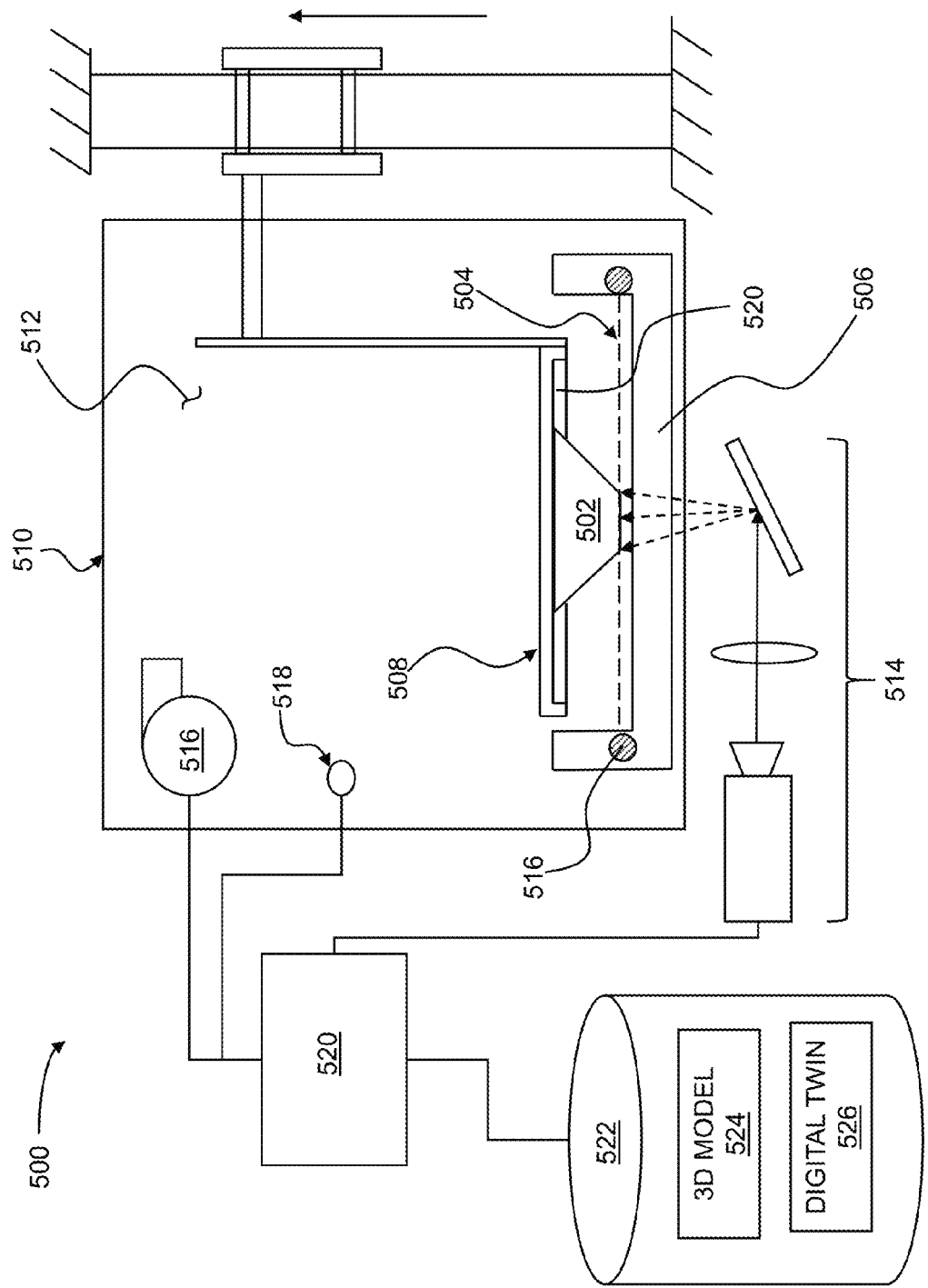
FIG. 5 shows a stereolithography system.

FIG. 5 shows a stereolithography system. The stereolithography system 500 can be used to form a three-dimensional object 502 from a resin 504 by selectively exposing the resin 504 to activation energy from an activation light source 506. The resin 504 can include particles suspended in a plurality of binders, which can include a first binder and a second binder different from the first binder and in a mixture with the first binder. For example, the first binder can be substantially non-reactive under exposure to wavelengths of light sufficient to crosslink or polymerize the second binder such that the second binder can undergo crosslinking and/or polymerization locally within the stereolithography system 500 to form a layer of an object and, through layer-by-layer exposure of the second binder to activation light, ultimately form a green part, such as the three-dimensional object 502. As also described in greater detail below, the first binder can have sufficient strength to support a green part formed from the resin 504 and, additionally or alternatively, can be extractable (e.g., through a first debinding process) from the three-dimensional object 502 to leave behind the crosslinked and/or polymerized second binder and the metal particles suspended in the second binder. The second binder, as further described below, can be removed from the particles though a second debinding process, and the particles can undergo subsequent processing (e.g., sintering) to form a finished part from the three-dimensional object 502. Additionally, or alternatively, the second binder can be removed from the first binder and/or from the particles through the second debinding process. Thus, more generally, the first debinding processes and the second debinding processes described herein should be understood to occur in any order, unless otherwise indicated or made clear from the context.

The stereolithography system 500 can be an inverted system including a media source 506 and a build plate 508. In use, the media source 506 can carry the resin 504, and the build plate 508 can move in a direction away from the media source 508 as the three-dimensional object 502 is built through layer-by-layer exposure of the second binder in the resin 504 to activation light. For example, the stereolithography system 500 can include a build chamber 510 defining a working volume 512, in which the media source 506 and the build plate 508 can be disposed, and the stereolithography system 500 can include an activation light source 514 positioned to direct activation light, as described in greater detail below, into the working volume 512 in a direction toward the media source 506 and the build plate 508. Continuing with this example, light from the activation light source 514 can be controlled to be incident on the resin 504 carried by the media source 506 to cross-link and/or polymerize the second binder in the resin 504 in a predetermined pattern to form a layer of the three-dimensional object 502 on a substrate (e.g., the build plate 508 or a previous layer of the three-dimensional object 502) while the inverted orientation of the stereolithography system 500 can facilitate draining excess resin 504 from the three-dimensional object 502 and back toward the media source 506.

The stereolithography system 500 can, additionally or alternatively, include one or more heaters 516 in thermal communication with the media source 506 and/or the working volume and operable to control the temperature of the resin 504, e.g., through conduction, forced convection, natural convection, radiation, and combinations thereof. The heaters 516 may, for example, include a resistance heater in thermal communication with the media source 506, the build plate 508, or any other suitable component of the system 500. The heaters 516 may also or instead include an ambient heater for the working volume 512 above the media source 506. The one or more heaters 516 may be generally operable to directly or indirectly control a temperature of the resin 504 during a fabrication process. The stereolithography system 500 can also include one or more temperature sensors 518 such as thermocouples or the like to facilitate controlling the heaters to achieve a desired thermal profile within the working volume 512, the resin 504, and so forth.

While the working volume 512 can be heated in various different ways to achieve any one or more of the various different advantages described herein for facilitating stereolithographic fabrication of metal parts, it should be appreciated that certain portions of the stereolithography system 500 can be advantageously thermally isolated from the working volume 512 and/or from the heaters 516. For example, the activation light source 514 can be thermally isolated from the working volume 512 and/or the heaters 516. Such thermal isolation of the activation light source 514 can be useful, for example, for prolonging the useful life of the activation light source 514. Additionally, or alternatively, the stereolithography system 500 can include a feedstock source, from which the resin 504 can be delivered to the media source 506. The feedstock source can be thermally isolated from the working volume 512 and/or the heaters 516 to facilitate handling the resin 504. That is, the resin 504 can be stored in a substantially solid form. Additionally, or alternatively, given that particles will tend to settle faster in a molten form of the resin 504, thermally isolating the feedstock from the work volume 512 and/or the heater(s) 516 can facilitate storing a usable form of the resin 504 for a longer period of time.

In general, the activation light source 514 can deliver light of a wavelength and exposure time suitable to crosslink and/or polymerize the second binder of the resin 504. The activation light source 514 can be an ultraviolet light source in implementations in which the second binder of the resin 504 undergoes crosslinking and/or polymerization upon sufficient exposure to ultraviolet light. As a more specific example, the activation light source 514 can be any one or more of various different ubiquitous light sources that produce light having a wavelength of about 300 nm to about 450 nm (e.g., about 405 nm, which corresponds to the Blu-ray disc standard). In certain implementations, the activation light source 514 has a wavelength greater than the average size of particles suspended in the resin 504, which can reduce the likelihood that the particles will interfere with crosslinking and/or polymerization of the second binder of the resin 504. Such reduced interference can, for example, advantageously reduce the amount of light exposure time required to crosslink and/or polymerize the second binder in the resin 504. Further, or instead, reduced interference can enhance resolution by reducing light scattering.

The activation light source 514 can be controllable to provide a pattern of light incident on the resin 504. For example, the activation light source 514 can include a laser controlled to rasterize an image on the resin 504. As another, non-exclusive example, the activation light source 514 can include a digital light processing (DLP) projector including a plurality of micromirrors controllable to create an image on the resin 504.

Light from the activation light source 514 can pass through a portion of the media source 506 that is optically transparent to the light from the activation light source 514 such that the presence of the media source 506 in the light path produces little to no interference with light directed from the activation light source 514 to the resin 504 carried by the media source 506. Thus, for example, in implementations in which the activation light source 514 is an ultraviolet light source, the portion of the media source 506 in the path of the activation light source 514 can be transparent to ultraviolet light. Further, or instead, in implementations in which the activation light source 514 is disposed outside of the working volume 512, light from the activation light source 514 can pass through a portion of the build chamber 510 that is optically transparent to the light from the activation source 514 such that the presence of the media source 506 in the light path produces little to no interference with light directed from the activation light source 514 to the resin 504 carried by the media source 506. While the media source 506 and/or the build chamber 510 can be optically transparent to light from the activation light source 514, it should be appreciated that it may be desirable to use the medial source 506 and/or the build chamber 510 to filter light from the activation light source 514.

The stereolithography system 500 can further include a controller 520 (e.g., one or more processors) and a non-transitory, computer readable storage medium 522 in communication with the controller 520 and having stored thereon computer executable instructions for causing the one or more processors of the controller 520 to carry out the various methods described herein. For example, the controller 520 can be in communication with one or more of the build plate 508, the activation light source 514, the heater(s) 516, and the temperature sensor 518 to control fabrication of the three-dimensional object 502 based on a three-dimensional model 524 stored on the storage medium 522. In certain instances, the stereolithography system 500 can further include a camera and vision system that can detect parameters (e.g., dimensions) of the three-dimensional object 502 as it is formed, and the storage medium 522 can store a digital twin 526 of the three-dimensional object 502 such that variations and defects of the three-dimensional object 502 can be evaluated.

In general, the resin 504 can be responsive to light, heat, or a combination thereof controlled by the controller 520 such that the second binder can be controllably crosslinked or polymerized. Thus, as compared to a material in which binders are initially crosslinked or polymerized, the ability to control crosslinking or polymerization of the second binder of the resin 504 can advantageously facilitate controlling a shape and, thus, forming a layer of the three-dimensional object 502 during a stereolithography process.

In general, the resin 504 can include particles suspended in a mixture of the first binder and the second binder. As used herein, a binder can be one or more constituent components removable from the particles at a point in the fabrication process. Thus, for example, the first binder can be removable from the particles through a first debinding process, and the second binder can be removable from the particles through a second debinding process, which can be different from the first debinding process and/or temporally separate from the first debinding process. Additionally, or alternatively, the first binder and the second binder can have different responses to incident light such that, for example, the first binder can be substantially non-reactive under exposure to wavelengths of light sufficient to crosslink or polymerize the second binder. Thus, for example, the physical properties of the second binder can be changed during a stereolithographic process without significantly changing the physical properties of the first binder. More generally, it should be appreciated that the physical properties of the first binder and the second binder in the resin 504 can be changed through the selective and controlled application of energy (e.g., light, heat, or a combination thereof) during a stereolithographic process to address different requirements associated with different stages of the stereolithographic process, such as handling (e.g., spreading) the resin 504, forming the three-dimensional object 502 layer-by-layer, and finishing the three-dimensional object 502 into a solid part formed primarily of the particles suspended in the mixture of the first binder and the second binder.

The suspension of particles may include a dispersion of particles in a solid or molten form of the mixture of the first binder and the second binder. It should be appreciated that such a dispersion of the particles can be uniform or substantially uniform (e.g., varying by less than about ±10 percent) within the mixture of the first binder and the second binder. More generally, however, it should be appreciated that the degree of uniformity of the particles can be a function of strength and/or design tolerances acceptable for the fabrication of the three-dimensional object 502 and, thus, can include any distribution of particles that are substantially spaced apart throughout the mixture of the first binder and the second binder.

The first binder and the second binder can be, for example, miscible with one another such that the mixture of the first binder and the second binder is homogenous. Additionally, or alternatively, the first binder and the second binder can be immiscible with one another. In such instances, the dispersion of the particles in the mixture of the first binder and the second binder can be formed by shaking or otherwise agitating a molten form of the resin 504 prior to or during a stereolithography process.

The second binder can be a low molecular weight material (e.g., a monomer or an oligomer), with the low molecular weight indicative of a low degree of crosslinking or polymerization. For example, the second binder can have a molecular weight of less than about 5000 g/mol. Continuing with this example, the molecular weight of the second binder can be increasable from less than about 5000 g/mol to greater than about 5000 g/mol (e.g., greater than about 2000 g/mol) under exposure to the wavelength of light sufficient to crosslink or polymerize the second binder. The resulting crosslinking or polymerization associated with such an increase in molecular weight of the second binder should be understood to correspond to curing of the second binder such that the resin 504 takes a relatively stable shape during fabrication of a layer of the three-dimensional object 502.

In certain implementations, the second binder undergoes crosslinking or polymerization upon exposure to light at a wavelength of about 300 nm to about 450 nm for a sufficient period of time. Thus, in such implementations, the second binder can undergo crosslinking or polymerization upon exposure to light at a wavelength of 405 nm, which corresponds to the Blu-ray disc standard and, thus, is produced using a light source that is ubiquitous.

The first binder and the second binder can have different melt temperatures such that heat can be applied to the resin 504 to facilitate, for example, handling the resin 504. For example, the first binder can have a first melt temperature and the second binder can have a second melt temperature less than or about equal to the first melt temperature. In such instances, the flow of the resin 504 can be controlled by controlling a temperature of the resin 504 relative to the melt temperature of the first binder. As a more specific example, the first binder can have a first melt temperature less than about 80 degrees Celsius, and the temperature of the media source 506, the build plate 508, and/or the working volume 512 can be controlled to be above about 80 degrees Celsius such that the resin 504 is molten prior to receiving incident light from the activation light source 514. Additionally, or alternatively, the first binder can have a melt temperature above about 25 degrees Celsius such that the resin 504 can be substantially solid (e.g., in the form of a paste) to facilitate storing the resin 504 in a stable form for a significant period of time (e.g., multiple weeks). In certain implementations, the concentration of the particles suspended in the mixture of the first binder and the second binder is such that the resin 504 is a non-Newtonian fluid at 25 degrees Celsius.

Additionally, or alternatively, the first binder and the second binder can have different decomposition temperatures. For example, the first binder can have a first decomposition temperature, and the second binder can have a second decomposition temperature greater than the first decomposition temperature such that the second binder can generally withstand heating to a greater temperature (e.g., after debinding the first binder from the three-dimensional object 502).

The first binder can be extractable from the binder system and the second binder following exposure of the second binder to a wavelength of light sufficient to crosslink or polymerize the second binder. For example, the resin 504 can be exposed to light from the activation light source 514 such that the second binder crosslinks or polymerizes sufficiently to at least partially harden to form a stable layer of the three-dimensional object 502 from which the first binder can ultimately be extracted. It should be appreciated that extracting the first binder from the three-dimensional object 502 leaves behind a brown part that can be subsequently processed (e.g., by debinding the second binder and sintering the remaining particles) to form a completed part.

In general, the first binder can be extractable from the second binder and/or the particles through any of various different processes suited to the composition of the first binder. For example, the first binder can include a wax extractable from the second binder by chemical solvation in a non-polar chemical following exposure of the second binder to wavelengths of light sufficient to crosslink or polymerize the second binder. As another, non-exclusive example, the first binder can include a plurality of low-molecular weight constituents (e.g., paraffin wax and steric acid), each constituent extractable from the second binder by the same chemical solution (e.g., hexane) following exposure of the second binder to wavelengths of light sufficient to crosslink or polymerize the second binder. Additionally, or alternatively, the first binder can include polyethylene glycol extractable from the second binder by dissolution by water or alcohols following exposure of the second binder to wavelengths of light sufficient to crosslink or polymerize the second binder. Still further in addition, or in the alternative, the first binder can include a wax extractable from the second binder by supercritical carbon dioxide fluid following exposure of the second binder to wavelengths of light sufficient to crosslink or polymerize the second binder. Yet further in addition, or yet further in the alternative, the first binder can include a low molecular weight polyoxymethylene extractable from the second binder by catalytic debinding in nitric oxide vapor. For example, the polyoxymethylene can melt at a temperature substantially similar to a temperature at which the second binder is photopolymerizable. In certain implementations, the first binder includes polyanhydride extractable from the second binder by hydrolysis and dissolution in aqueous solution following exposure of the second binder to wavelengths of light sufficient to crosslink or polymerize the second binder. In some implementations, the first binder includes a wax thermally extractable from the second binder following exposure of the second binder to wavelengths of light sufficient to crosslink or polymerize the second binder. The thermal extraction can include, for example, boiling the wax at a temperature at which the second binder remains substantially intact (e.g., substantially retaining its shape).

The second binder can be removable from the first binder and/or from the particles through any of various different debinding processes suitable for one or more constituent components of the second binder. For example, the second binder can be debindable by cleaving and/or un-polymerizing the second binder (e.g., through one or more of hydrolyzing or solvolyzing) following crosslinking or polymerization of the second binder. For example, the second binder can include acetal diacrylate, which can be extractable from the first binder by catalytic debinding in nitric oxide vapor following exposure of the second binder to a wavelength of light sufficient to crosslink or polymerize the second binder. As an additional or alternative example, the second binder can include anhydride diacrylate, which can be extractable from the first binder by hydrolysis and dissolution in one or more aqueous solutions following exposure of the second binder to the wavelength of light sufficient to crosslink or polymerize the second binder. Yet further in addition, or further in the alternative, the second binder can include a saccharide diacrylate (e.g., monosaccharide diacrylate, disaccharide diacrylate, or a combination thereof), each of which can be extractable from the first binder by hydrolysis in one or more aqueous solutions including a catalyst (e.g., a catalyst including one or more biological enzymes, such as amylase) for hydrolysis of the crosslinked or polymerized second binder following exposure of the second binder to the wavelength of light sufficient to crosslink or polymerize the second binder. Additionally, or alternatively, in instances in which the second binder is debindable by cleaving and/or un-polymerizing the second binder, the first binder can have a high molecular weight (e.g., greater than about 5000 g/mol) and exist in a small volume percentage (e.g., less than about 10 percent) in the resin 504.

The particles suspended in the mixture of the first binder and the second binder are solid particles that, in general, can be sintered to form a solid finished part. The particles can include, for example, any one or more of various different metals. Further, or instead, the particles can include any one or more of various different ceramics. To facilitate producing a solid part with substantially uniform strength characteristics along the part, the solid particles can have the same composition and can, additionally or alternatively, have a substantially uniform size. In certain instances, the particles can advantageously have an average size that is less than a wavelength of light sufficient to crosslink the second binder, which can have any of various different advantages described herein. For example, such a ratio of particle size to the wavelength of light can result in shorter times associated with crosslinking or polymerizing the second binder, given that the particles are less likely to interfere with incident light that has a longer wavelength than the average particle size.

In general, it is desirable to have a high concentration of the particles in the resin 504. Such a high concentration can be useful, for example, for reducing the amount of time and/or energy required to crosslink or polymerize the second binder. Additionally, or alternatively, such a high concentration can be useful for reducing the amount of time required for debinding the first binder and/or debinding the second binder. As a specific example of a high concentration, the concentration (by volume) of the particles in the resin 504 can be within ±15 percent of the tap density of the particles. As used herein, the tap density of particles is the bulk density of a powder of the particles after a compaction process and is specified in ASTM B527, entitled "Standard Test Method for Tap Density of Metal Powders and Compounds," the entirety of which is incorporated herein by reference.

The particles can include modified surfaces such that the particles exhibit physical or chemical characteristics that differ advantageously from the underlying material of the particles. For example, the particles can include chemically functionalized surfaces such as surfaces having a metal oxide coating, which can be useful for resisting corrosion or other undesired chemical reactions. Additionally, or alternatively, the particles can include functional groups such that the particles resist settling in the mixture of the first binder and the second binder through steric hindrance. In certain instances, under ambient conditions (e.g., in air at about 25 degrees Celsius at atmospheric pressure and with relative humidity of 20-80%), the particles suspended in the mixture of the first binder and the second binder can have a timescale of settling of greater than about two weeks, which can facilitate storing the resin 504 in a stable form for a useful period of time. In some instances, the settling time of the particles can be greater than the amount of time at which the first binder is molten during the stereolithography process.

The resin 504 can include a photo-absorber (e.g., a Sudan dye) suspended in the mixture of the first binder and the second binder. Such a photo-absorber can facilitate, for example, tuning the resin 504 to achieve a particular response (e.g., a curing time for the second binder) from activation light from the activation light source 514.

In general, the second binder can be about 10 percent to about 50 percent by volume of the total volume of the resin 504. It should be appreciated that the volumetric composition of the resin 504 can be a function of, among other things, the composition of the first binder and the second binder. The first binder can include, for example, one or more of the following: paraffin wax, carnauba wax, stearic acid, polyethylene glycol, polyoxymethylene, oleic acid, and dibutyl phthalate. The second binder can include, for example, one or more of the following: poly(methyl methacrylate), polyethylene glycol diacrylate, urethane oligomers functionalized to acrylate groups, epoxy oligomers functionalized to acrylate groups, 1,6-Hexanediol acrylates, or styrene. Additionally, or alternatively, the resin 504 can include ethylene vinyl acetate, a slip agent (e.g., stearic acid), and/or a compatibilizer (e.g., metal stearate (e.g., zinc stearate), stearic acid, or a combination thereof).

In an exemplary formulation, the first binder can include polyethylene glycol and the second binder can include poly(methyl methacrylate). For example, polyethylene glycol can be about 40-90 percent of the combined weight of the first binder and the second binder and poly(methyl methacrylate) can be about 10-60 percent of the combined weight of the first binder and the second binder.

In another exemplary formulation, the first binder can include paraffin wax and the second binder can include a waxy or hydrophobic diacrylate oligomer.

While binder jetting, fused filament fabrication, and stereolithography processes are shown and described above, it will be appreciated that the principles of the inventions disclosed herein may be usefully adapted to any other fabrication techniques suitable for depositing multiple materials for an object, support structure, and interface layer to form a sinterable object with breakaway support structures as contemplated herein.

Figure 6:
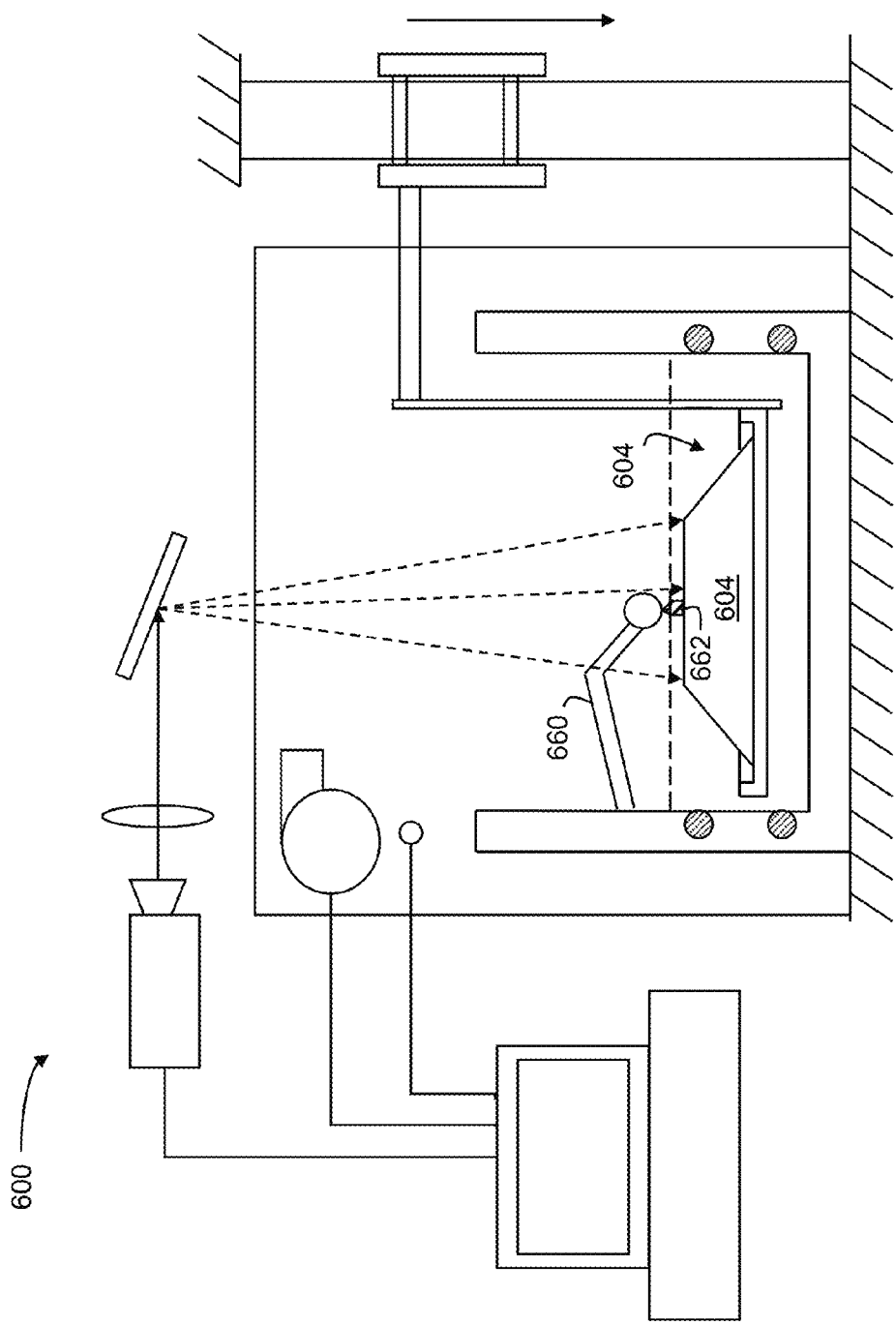
FIG. 6 shows a stereolithography system.

FIG. 6 shows a stereolithography system. The stereolithography system 600 is generally analogous to the stereolithography system described above, except that each layer is cured on a top surface, and the object 602 moves downward into a resin 604 while each layer is exposed from above to an activation source such as ultraviolet light. In one aspect, the stereolithography system 600 may be configured for multi-material stereolithography using, e.g. separate resin baths (and a robotic system for switching between same), different resins applied with brushes, tape casters or the like before curing, or any other suitable technique(s), along with any washing or other treatment as needed between individual curing steps. One suitable system is described by way of non-limiting example in U.S. Pat. No. 9,120,270 to Chen et al., incorporated by reference herein in its entirety. These or other techniques may be used to deposit a sinterable build material, an interface layer, and where appropriate, a support structure, e.g., for sintering support as generally contemplated herein.

Other techniques may also or instead be used to create an interface layer for breakaway supports on a sinterable object, such as by brushing, spraying, or otherwise depositing a layer of ceramic particles or other sinter-resistant material, e.g., in a colloidal suspension or the like, onto areas of a layer where an interface layer is desired. For example, a colloidal suspension of ceramic particles may be deposited onto a surface of the resin 604 before it is cured. In another aspect, a selective embrittlement material or other material that otherwise prevents or inhibits bonding between the object 602 and an adjacent support structure may be used. Suitable control systems, robotics, and the like may be included and will readily be appreciated by one of ordinary skill in the art, where the details of these systems are not repeated here. Accordingly, there is disclosed herein a stereolithography system 600 having an interface layer tool 660, which may include any of the mechanisms described above, or any other tool suitable for forming an interface layer 662 as contemplated herein for an object fabricated with a stereolithography process.

Figure 7:
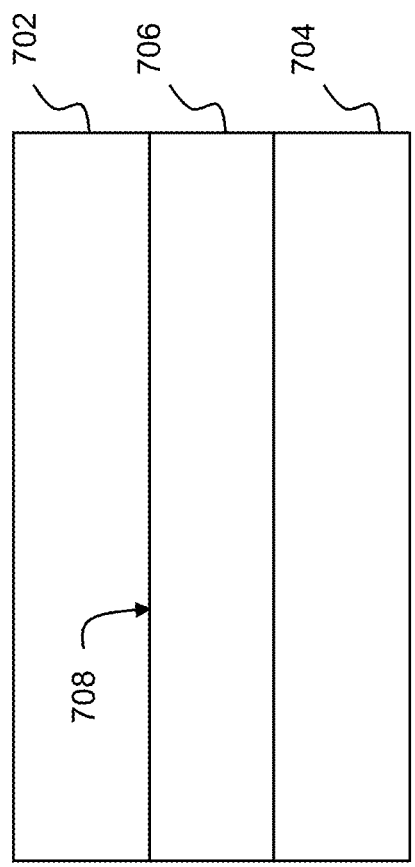
FIG. 7 shows an interface layer.

FIG. 7 shows an interface layer. Support structures are used in additive fabrication processes to permit fabrication of a greater range of object geometries, and may generally include print supports (for physical support of an overlying layer during fabrication), debind supports (to prevent deformation during debinding), and sinter supports (to prevent deformation during sintering). For the build materials contemplated herein—materials that are subsequently sintered into a final part—an interface layer may usefully be fabricated between an object and the support to inhibit bonding between adjacent surfaces of the support structure and the object during subsequent processing such as sintering. Thus, disclosed herein is an interface layer suitable for manufacture with an additive manufacturing system that resists the formation of bonds between a support structure and an object during subsequent sintering processes.

According to the foregoing, an article 700 of manufacture may include an object 702 formed of a build material, a support structure 704, and an interface layer 706, each of which may be deposited or otherwise fabricated using any of the additive fabrication techniques described herein, or otherwise fabricated or formed into sinterable and unsinterable layers or the like.

The build material of the object 702 may include any of the build materials described herein. By way of general example, the build material may include a metal injection molding material or a powdered metallurgy material. More generally, the build material may include a sinterable powdered material for forming a final part at a sintering temperature, along with a binder system containing one or more binders retaining the sinterable powdered material in a net shape of the object 702 prior to densifying the sinterable powdered material into the final part, e.g., after deposition or other shaping with an additive fabrication process. While the object 702 is depicted for simplicity as a single, horizontal layer of material, it will be understood that a surface 708 of the object 702 adjacent to the interface layer 706 may have any shape or three-dimensional topography (within the limits of the system that fabricated the object 702), including without limitation vertical surfaces, sloped surfaces, horizontal surfaces, shelves, ridges, curves, and so forth, with the interface layer 706 generally following the surface 708 of the object 702 wherever an unsinterable barrier between the object 702 and the support structure 704 is necessary or helpful.

The one or more binders of the build material may include any of a wide range of materials selected to retain the net shape of the object 702 during processing of the object 702 into the final part. For example, processing of the object 702 into the final part may include debinding the net shape to remove at least a portion of the one or more binders, sintering the net shape to join and densify the sinterable powdered material, or some combination of these. To support the net shape in this context, the one or more binders may generally retain the net shape until sufficient sintering strength is achieved through necking of particles of the sinterable powdered material.

The sinterable powder of the build material may include a metallic powder containing any metal(s), metal alloy(s), or combination of the foregoing suitable for sintering. A wide range of such powders are known in the powdered metallurgy field. Thus, the build material may include a powdered metallurgy material. The sinterable powdered material may, for example, have a distribution of particle sizes with a mean diameter of between two and fifty microns, such as about six microns, about ten microns, or any other suitable diameter. The build material may also or instead include submicron particles selected to facilitate sintering of the sinterable powdered material, such as smaller particles of the powdered material, particles of a low-temperature sintering material, and so forth. The submicron particles may also or instead include an element selected for alloying with the sinterable powdered material, or particles of a strengthening additive, and so forth. In another aspect, the submicron particles of the binder system have a composition substantially identical to the sinterable powdered material and a size distribution with a mean particle size at least one order of magnitude smaller than the sinterable powdered material.

The sinterable powdered material may also or instead include an alloy of at least one of aluminum, steel, and copper, where the selective embrittlement material includes at least one of antimony, arsenic, bismuth, lead, sulfur, phosphorous, tellurium, iodine, bromine, chlorine, and fluorine.

The support structure 704 may generally provide print support, debind support, sintering support, or some combination of these for the object 702. Print support will generally be positioned vertically below surfaces of the object 702, however where vertical support ends or has non-horizontal features, the interface layer 706 may also be positioned on the sides of the support structure 704 or otherwise positioned between the support structure 704 and the object 702. More generally, the support structure 704 may be positioned adjacent to the surface 708 of the object 702 to provide mechanical support during processing of the object 702 into a final part, where adjacent in this context means nearby but separated as appropriate by the interface layer 706.

The support structure 704 may be formed of a support material such as a second material having a shrinkage rate during processing (e.g., debinding, sintering, or some combination of these) matched to the build material of the object 702, so that the support material and the build material shrink at substantially similar rates during debind, during sintering, or both. For example, the second material may be the build material, where the use of the interface layer 706 prevents the build material from sintering across the interface layer. The second material of the support structure 704 may also or instead contain the ceramic powder of the interface layer, or some other ceramic powder or other powdered material or the like that resists sintering at the sintering temperatures used to sinter the build material of the object 702. For example, the second material of the support structure 704 may be formed of substantially the same (or exactly the same) composition as the interface layer 706, or may include the binder system used in the build material for the object 702. The second binder system of this interface layer 706 may, for example, provide a rheology suitable for use in a fused filament fabrication process or the like. Thus, the second binder system may facilitate suitable flowability, and may retain the shape of the interface layer 706 during a debind of the article 700. The second binder system may also or instead retain a shape of the interface layer 706 during an onset of a thermal sintering cycle at the sintering temperature used to sinter the build material of the object 702 into a final part.

In another aspect, the support material may shrink at a substantially similar rate to the build material during debind and the support material may shrink at a substantially greater rate than the build material during sintering. With this shrinkage profile, the support material can be more specifically configured to shrink at a rate that maintains the support structure 704 in contact with the object 702 (through the interface layer 706) during a thermal sintering cycle. The support material may also or instead be configured to shrink at a rate that maintains the support structure 704 in contact with the object 706 at least until the object 702 becomes self-supporting during a sintering process for the build material.

In general, the support structure 704 may include a non-planar support surface that varies according to the geometry of the object 702 that is being supported, and the support structure 704 may have varying z-axis heights below the bottom surface 708 of the object 702 (in a manufacturing coordinate system for planar fabrication of the article using, e.g., fused filament fabrication, binder jetting, stereolithography, or any other suitable fabrication systems. Where a bottom surface of an object 702 is flat and requires no structural support, an interface layer 706 may nonetheless be usefully employed, e.g., to facilitate separation of the object 702 from a shrink raft, sintering setter, or other substrate used to carry the object 702 during fabrication into a final part.

The interface layer 706 may generally be disposed between the support structure 704 and the surface 708 of the object 702. The interface layer 706 may contain a composition that resists bonding of the support structure 704 to the surface 708 of the object 702 through the interface layer 706 during sintering. For example, the composition of the interface layer 706 may include a ceramic powder having a sintering temperature higher than the build material, or substantially higher than the build material (such as a metallic build material). The interface layer 706 may also or instead include a preceramic polymer such as any of a range of organo-silicon compounds that convert into a ceramic upon heat treatment. More specifically, such a preceramic polymer that decomposes into a ceramic during sintering at the sintering temperature of the build material may usefully be employed to form a ceramic interface layer during sintering. The interface layer 706 may also include a thermoplastic binder or other suitable material to retain a position of the ceramic particles within the article. In one aspect, the interface layer 706 includes a dissolvable material suitable for removal with a solvent prior to sintering, e.g., in a chemical debind, and the interface layer 706 also includes a ceramic powder that maintains a physical separation layer between the first material and the second material after the dissolvable material is removed.

In one aspect, the interface layer 706 physically excludes the adjacent support structure 704 and object 702 forming a physically separate barrier between the two. For example, the interface layer 706 may be formed of a ceramic powder that has a substantially greater mean particle size than the sinterable powdered material of the object 702, and the ceramic powder may be disposed in a second binder system that retains a shape of the interface layer 706, e.g., to prevent mixing or physical contact between the object 702 and the support structure 704.

In another aspect, the interface layer 706 may be formed between and/or within a surface of the object 702, and adjacent surface of the support structure 704, or both. As with other interface layers contemplated herein, this interface layer 706 may generally resist bonding of the support structure 704 to the object 702 during a thermal sintering cycle at a sintering temperature for a sinterable powdered material of the build material. For example, the interface layer 706 may be formed with a sintering inhibitor that infiltrates the support structure 704 or the object 702 where they meet. Thus, while illustrated as a discrete layer, it will be understood that the interface layer 706 may overlap with the support structure 704 and/or the object 702 without departing from the scope of this description. This type of structure may result, for example, where a nanoscopic ceramic powder in a colloidal suspension or other suitable carrier is deposited onto the support structure 704 or the object 702 (or both) before they are placed in contact with one another.

For example, a colloidal suspension may be sprayed or jetted onto interface locations during a binder jetting or fused filament fabrication process between layers of support structure 704 and an object 702 to create an unsinterable composition therebetween. The ceramic powder may have a substantially smaller mean particle size than the sinterable powdered material of the build material used for forming the final part. By spraying or jetting the suspension onto the surface, the ceramic powder may be distributed interstitially between particles of the sinterable powdered material on an outer surface of the support structure 704 to resist necking between the support structure 704 and the sinterable powdered material of the object 702 around the outer surface during sintering at the sintering temperature, thereby providing the interface layer 706. A variety of suitable dimensions may be employed. For example, a ceramic powder of the interface layer 706 may contain ceramic particles having a mean particle size of less than one micron. The sinterable powdered material of the build material may have a mean particle size of about ten to thirty-five microns. More generally, the ceramic particles have a mean particle size about at least one order of magnitude smaller than a similarly measured mean particle size of the sinterable powdered material.

For extrusion-based processes such as fused filament fabrication, particle sizes may usefully be maintained at dimensions substantially smaller than an extrusion opening. Thus, for example, in another aspect a powdered metal of a build material may have a mean particle size at least one order of magnitude smaller than an interior diameter of an extruder of a fused filament fabrication system. Similarly, a powdered ceramic of an interface layer may have a mean particle size at least one order of magnitude smaller than an interior diameter of an extruder of a fused filament fabrication system.

In another aspect, the ceramic particles may have a mean particle size greater than a second mean particle size of the sinterable powdered material, e.g., where the interface layer 706 is deposited using a fused filament fabrication system having a nozzle that is suitably large for extruding a composition with the ceramic particles. This may include a mean particle size at least fifty percent greater than a second mean particle size of a powdered metal or other powdered material in the object 702. The ceramic particles may also or instead have a mean particle size of about five to fifty microns, about five to forty microns, or about twenty to thirty microns. The sinterable powdered material may have a mean particle size greater than about thirty-five microns. In another aspect, a powdered metal of the build material may have a mean particle size of about fifteen microns and the interface layer may include a powdered ceramic with a mean particle size of at least twenty-five microns.

Other techniques may also or instead be used to form the interface layer as contemplated herein. For example, the interface layer may include a selective embrittlement material selected to introduce crack defects into at least one of the support structure and the object at the interface layer during sintering into the final part. The particular material(s) for selective embrittlement will be system-dependent, however many suitable systems are known in the art. For example, the sinterable powder may include an alloy of at least one of at least one of aluminum, steel, and copper, and a suitable corresponding selective embrittlement material may include at least one of antimony, arsenic, bismuth, lead, sulfur, phosphorous, tellurium, iodine, bromine, chlorine, and fluorine.

In another aspect, the interface layer may include a material having a powdery macrostructure where the material retains the powdery macrostructure while microscopically densifying to match a shrinkage rate of the object during sintering. By way of non-limiting examples, suitable materials may include at least one of aluminum hydroxide and gamma alumina.

More generally, a wide range of materials and material systems may usefully be employed as the interface layer 706 contemplated herein. For example, the interface layer 706 may include at least one of an iron oxide and a ceramic-loaded polymer. The powdered material of the object 702 may include a metal powder, and the interface layer may be fabricated from a composition that includes a second phase material with a melting point below a sintering temperature of the metal powder to form a meltable interface that melts out of the interface layer as the metal powder achieves a sintering strength during sintering. In another aspect, the interface layer 706 may be formed of or include a preceramic polymer decomposable into a ceramic during sintering. In another aspect, the interface layer 706 may include a ceramic non-reactive with a second material of the object 702. For example, the second material may include titanium and the interface layer 706 may include at least one of yttria and zirconia.

While the interface layer 706 can usefully inhibit bonding of the support structure 704 to the object 702 during sintering or other processing, the interface layer 706 and the support structure 704 can also usefully shrink during processing in a manner that is matched to the object 702 in order to provide substantially continuous support as needed during processing. Thus, for example, the interface layer may be formed of a material with a debind shrinkage rate or a sintering shrinkage rate substantially matching at least one of the first material of the support structure and the second material of the object under debind and sintering conditions suitable for at least one of the first material and the second material. During debind, the primary pathway for shrinkage may be the removal of binder from the system, and the matching may include the selection of similar or identical binder systems. During sintering, the densification of the powdered material contributes substantially to shrinkage, and matching may be achieved through the use of similar materials and particle sizes among the different materials of the support 702, the interface layer 706, and the object 702.

In one aspect, a first material of the support structure 704 may be configured to shrink at a greater rate than a second material of the object 702, e.g., by using a lighter loading of powdered material, a material that sinters more quickly, or the addition of a material the decomposes or evaporates more quickly during a thermal sintering cycle. By properly configuring these material systems, a support structure 704 may be fabricated that self-separates from the object 702 during sintering, preferably at a time in the sintering process for the object 702 to have achieved a self-supporting sintered strength. Thus, the greater rate may be selected so that the support structure 704 pulls away from the object 702 concurrently with the second material of the object 702 sintering to a self-supporting density. In another aspect, the greater rate may be a rate selected to compensate for non-shrinkage in a ceramic material of the interface layer 706 during at least one of debind and sintering. That is, where the interface layer 706 does not reduce volume through sintering, the shrinkage rate of the support material may be increased to prevent mechanical encroachment of the interface layer 706 into the object 702 during sintering.

In another aspect, while the interface layer 706 is depicted as a uniform layer, it will be appreciated that in some instances, e.g., where an interface layer 706 is captured between two parallel cantilevered arms of an object 702, the use of non-sintering, and thus non-shrinking, ceramic particles may cause substantial stresses and deformation. To mitigate this, the interface layer 706 may contain gaps or the like to facilitate shifting or settling as shrinking occurs, provided that the gaps between regions of the interface layer 706 are not so large that object or support material can sag into the gap during printing, debinding, or sintering. Other techniques may be usefully employed for similarly captive support structures or the like. For example, an interstitial material may be deposited with a shrinkage rate tuned to maintain contact between the support and the object as needed through debinding and sintering, while contracting more quickly to pull away from adjacent surfaces after adequate sintering strength is achieved. In another aspect, a material may be used that degrades and boils off once the object becomes mechanically stable, but before reaching a full sintering temperature. Alternatively, a material may be added that melts at a temperature once a part becomes mechanically stable but before the full sintering temperature.

Figure 8:
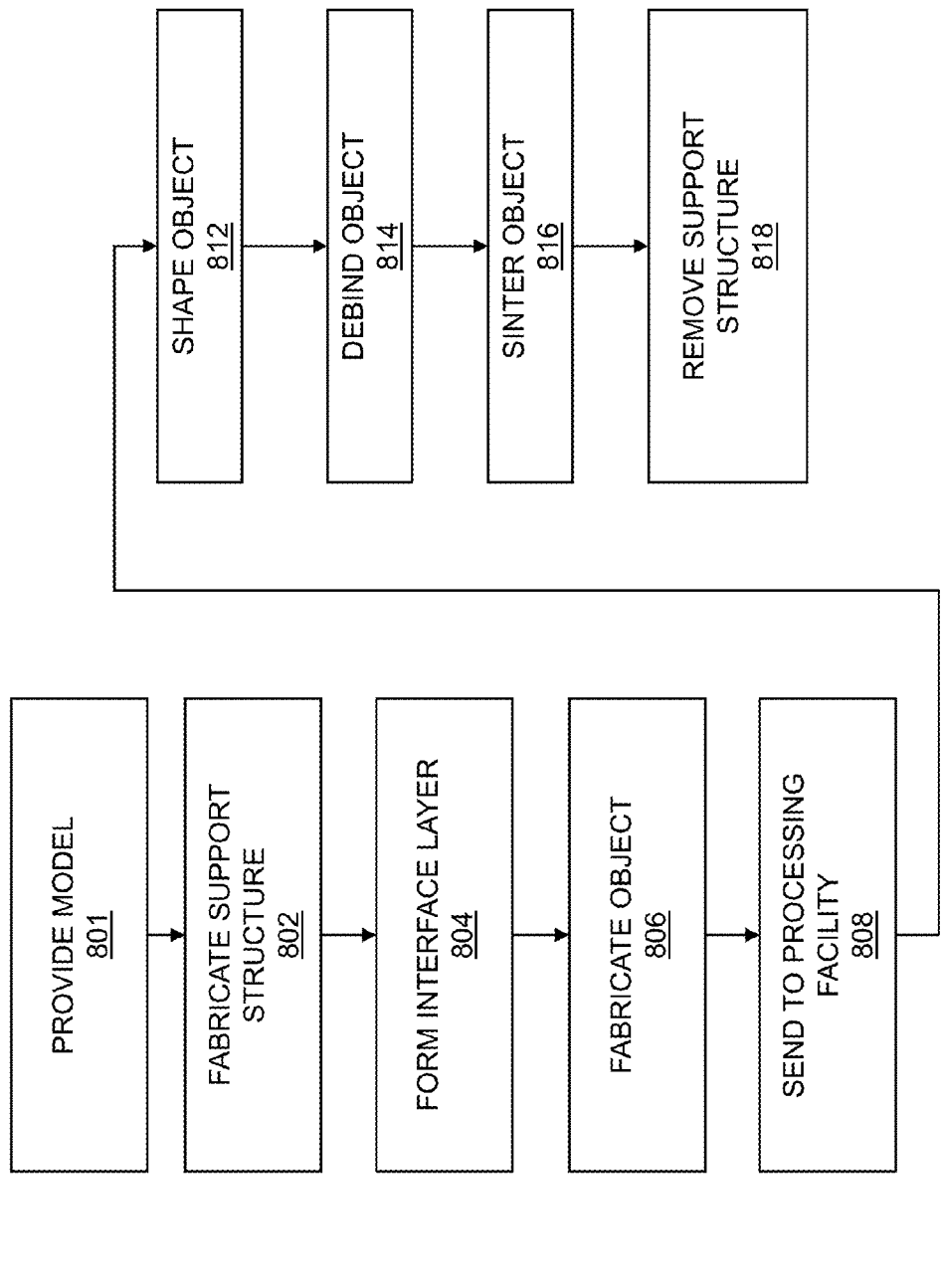
FIG. 8 shows a flow chart of a method for forming an interface layer for removable supports.

FIG. 8 shows a method for forming an interface layer for removable supports. Support structures are commonly used in additive fabrication processes to permit fabrication of a greater range of object geometries. For additive fabrication processes that use materials (such as those contemplated herein) that are subsequently sintered into a final part, an interface layer can usefully be fabricated between the object and support in order to inhibit bonding between adjacent surfaces of the support structure and the object during sintering.

As shown in step 801, the method 800 may include providing a model. This may include any computerized model of an object for execution by a printer, or any suitable representation of the object suitable for processing into a printer-ready or printer-executable representation. Thus, for example, while g-code is one common representation of machine instructions for execution by a printer, the g-code may be derived from some other model such as computer-aided design (CAD) model, or some other three-dimensional representation such as a three-dimensional polygonal mesh or the like. Various techniques for creating computerized models of objects, and for processing such models into printer-executable formats, are known in the art and the details are not repeated here.

In one aspect, the creation of a printer-executable format may include the identification of portions of an object that require structural support, such as to provide a surface for printing on, or to physically support a structure during debinding and/or sintering into a final part. The resulting support structures may be incorporated into the computerized model of the object that is generated for the printer, and may, where appropriate, specify support materials for fabricating the support structures that are different than the build material used by the printer to fabricate the object.

As shown in step 802, the method 800 may include fabricating a support structure for the object based on the computerized model using any of the printers described herein. This may, for example, include fabricating the support structure from a first material. By way of example, in a method for controlling a printer in a fused filament fabrication of an object, this may include extruding a support structure for a portion of the object using a support material.

As shown in step 804, the method 800 may include forming an interface layer on a surface of the support structure. This may, for example, include fabricating a discrete layer of material that provides the interface layer, or this may include modifying or augmenting the fabrication process to form an interface layer within or adjacent to the support structure, the object, or both. Thus, as used herein, references to "fabricating an interface layer" are intended to refer to a step of fabricating a discrete layer of material between a support structure and an object that provides a non-sintering barrier between the two in subsequent processing. For example, fabricating the interface layer (or the support structure or the object) may include additively manufacturing the interface layer (or the support structure or the object) using at least one of fused filament fabrication, binder jetting, and optical curing of a powder-loaded resin. The phrase "forming an interface layer," as used herein, is intended to refer more broadly to any technique for forming a material system that resists bonding of the support structure to the object through the interface layer during sintering. By forming an interface layer as contemplated herein, the interface layer may thus provide a non-sintering barrier that results in breakaway or otherwise removable supports after sintering.

Numerous examples of both techniques ("forming" and "fabricating") are provided below. By way of introductory, non-limiting examples, fabricating an interface layer may include depositing a layer of ceramic particles with an extruder of a fused filament fabrication system between an object and a support structure formed of sinterable, powdered metal in a binder system. On the other hand, forming an interface layer may include this technique, or other techniques that do not involve the fabrication of a discrete material layer such as inkjetting a colloidal suspension of fine ceramic particles or some other sintering inhibitor into a layer of a support structure (or an object) so that the inkjetted material penetrates into the structure to create a material system on the surface of the structure that resists sintering under sintering conditions for a sinterable, powdered metal of a support structure and/or object.

While the method 800 is shown as an ordered sequence of steps that include fabricating support, forming an interface, and then fabricating an object, it will be understood that the object, the support structure, and the interface layer may have complex, varying topologies with horizontal walls, vertical walls, angled walls, curved walls, and all forms of continuous and discontinuous features. Thus, during processing, any one of these steps may be performed first, second, or third, or in certain instances, several may be performed concurrently or in changing patterns. For example, for a vertical wall, an object may be fabricated, and then the interface layer, and then the support, and the order may then switch on a return pass of a printing tool so that the support is fabricated first and the object is fabricated last. Or for a nested support structure such as a cantilevered beam, the vertical process may include fabricating an object, then an interface layer, then support, then an interface layer, then the object.

In another aspect, the interface layer may include a finishing material for use on some or all of the exterior surfaces of the object. Accordingly, fabricating the interface layer may include fully encapsulating the object. The material of this interface layer may include a finishing material for the exposed surfaces of the object, e.g., to provide a desired color, texture, strength, toughness, pliability, or other characteristic. For example, the finishing material may include an alloying metal having an aesthetic finish, or the interface layer may include titanium or some other surface strengthener.

In another aspect, the first material of the support structure or the interface layer, or both, may be formed of a composition including microspheres that controllably collapse under pressure to reduce volume. The fabrication of suitable microspheres is known in the art, and may be used within the support structure and/or interface in a method that includes applying pressure to collapse the microspheres to shrink the material and separate the support structure from the object, e.g., during sintering.

In some embodiments, the interface layer may usefully be formed of the first material of the support structure so that the entire support and interface form an unsinterable mass that decomposes into a powder or the like during sintering.

As noted above, the interface layer may be fabricated using any of the additive manufacturing techniques described herein such as fused filament fabrication, binder jetting, and stereolithography, e.g., where the interface layer includes a ceramic medium or a composition with a ceramic additive to inhibit bonding between the support structure and the surface of the object during sintering. Specific techniques may be used with different fabrication processes to form a useful interface layer for breakaway supports. For example, in a fused filament fabrication system, a processor or other controller may be configured to underextrude at least one of the support structure, a surface of the object, and the interface layer to reduce a contact area with an adjacent layer, e.g., by using at least one of an increased tool speed and a decreased volumetric deposition rate. Such a printer may also or instead be configured to reduce a contact area between the interface layer and one of the object and the support structure by decreasing an extrusion bead size or increasing a spacing between roads of deposited material. A method for controlling a printer in a fused filament fabrication of the object may also or instead include extruding an interface layer adjacent to the support structure using an interface material.

Forming the interface layer may include other techniques. For example, forming the interface layer may include inkjetting a ceramic-loaded slurry onto the support structure (or the object, if the surfaces are inverted, or both) so that ceramic particles in the slurry can penetrate the support structure to inhibit sintering, or optionally so that the slurry can be cured on the surface of the support structure where it is deposited to create a physical barrier of ceramic particles over the support structure. Similarly, a suspension may be deposited onto the support structure (or the object), e.g., where the suspension includes a medium that is resistant to sintering at a sintering temperature of the powdered material. For example, the suspension may include a selective embrittlement material that selectively embrittles a bond between the support structure and the surface of the object. A variety of suitable selective embrittlement materials are known in the art, and the particular material(s) will be dependent on the corresponding materials of the interface layer. Any such materials suitable for the interface layer, such as a composition selected to introduce crack defects into the interface layer, may usefully be employed.

Forming the interface layer may include depositing an interface material onto the support structure (or the object) using any supplemental deposition techniques such as by inkjetting, spraying, micropipetting, and painting an interface material onto the support structure as the interface layer. Forming the interface layer may also or instead include depositing at least one of the support structure, the interface layer, and the object in a manner that inhibits bonding of the support structure to the object while sintering. Forming the interface layer may also or instead include depositing at least one of the support structure, the interface layer, and the object in a manner that inhibits mixing with the interface layer. For example, in a fused filament fabrication context, a small additional z-axis increment may be included between layers to reduce inter-layer fusion and prevent intermingling of particles in adjacent layers. In this manner, a film of binder may effectively be formed between adjacent layers that inhibits neck formation across the resulting physical barrier. While the binder system may eventually be removed initial necking may preferentially occur within each layer rather than across layers, so that the interface sinters to a weaker state to facilitate mechanical removal. In another aspect, forming the interface layer may include oxidizing the interface layer to inhibit bonding to the second material of the object, such as by selectively oxidizing a surface with a laser in areas where the interface layer belongs between a structure and a support.

As shown in step 806, the method 800 may include fabricating a layer of the object adjacent to the interface layer. In a fused filament fabrication context, this may include extruding a build material to form a surface of the object adjacent to the interface layer, on a side of the interface layer opposing the support structure. The build material may be any of the build materials contemplated herein, such as a powdered material for forming a final part and a binder system including one or more binders.

Fabricating the layer of the object may also or instead include fabricating a surface of the object from a second material adjacent to the interface layer. The second material may, for example, include a powdered material for forming a final part and a binder system including one or more binders. The one or more binders may include any of the binders or binder systems described herein. In general, the one or more binders may resist deformation of a net shape of the object during processing of the object into the final part, in particular where this processing includes debinding the net shape to remove at least a portion of the one or more binders and sintering the net shape to join and densify the powdered material. During these processes, the object may go through substantial shrinkage and mechanical stresses, and the binder(s) can usefully retain the net shape under these varying conditions. Subsequent sintering aims to yield a densified final part formed of the powdered material in the second material, e.g., the build material for the object, where the sintering causes necking between particles of the powdered material and subsequent fusion of the powdered material into a solid mass without melting to the point of liquefaction. A variety of suitable materials are known in the art for various fabrication processes as contemplated herein. In one aspect, the first material of the support structure may have a similar or substantially identical composition as the second material of the object.

For example, the second material may include a powdered metallurgy material. More generally, the powdered material of the second material may include a metal powder, a ceramic powder, or any other sinterable material or combination of materials. The powdered material may, for example, have any suitable dimensions for sintering. While this may vary according to the type of material, many useful sinterable powdered materials have a distribution of particle sizes with a mean diameter of between two and fifty microns. The powdered material may contain any of a variety of metals or metal alloys. For example, the powdered material may include an alloy of at least one of aluminum, steel, and copper, where the composition of the suspension includes at least one of antimony, arsenic, bismuth, lead, sulfur, phosphorous, tellurium, iodine, bromine, chlorine, and fluorine. In one aspect, the second material may include an infiltrable powder with at least one of a metallic infiltrant and a ceramic infiltrant.

In one aspect, the binder system may include a single binder, which may, for example, be removable from the object through a pure thermal debind. This may, for example, be useful, e.g., where fabricating the surface of the object includes applying the single binder in a binder jetting process or in any other context where a single binder system and/or thermal debinding might usefully be employed.

In another aspect, the binder system may include a first binder that is removed from the second material during a debind prior to sintering, where the binder system includes a second binder that remains in the net shape at an onset of a thermal sintering cycle. The binder system may also or instead include a first binder that is removed from the second material during a debind prior to sintering, where the binder system includes a second binder that remains in the net shape through sintering into the final part. In this latter case, the second binder may usefully include submicron particles that facilitate sintering of the powdered material. Still more specifically, the submicron particles may include an element or combination of elements selected for alloying with the powdered material. In another aspect, the submicron particles may have a composition substantially identical to the powdered material and a size distribution with a mean at least one order of magnitude smaller than the powdered material.

As shown in step 808, the method 800 may include sending the fabricated object to a processing facility. In one aspect, where the entire fabrication process is performed locally, this step may be omitted. In another aspect, a service bureau or the like may be maintained to service multiple printing locations, where objects are printed locally, and then shipped or otherwise transported to the processing facility for one or more of shaping, debinding, and sintering. This latter approach advantageously permits sharing of resources such as debinding systems that use hazardous materials or large, expensive sintering furnaces.

As shown in step 812, the method 800 may include shaping the object. This may, for example, include smoothing to remove printing artifacts, manual or automated comparison to computerized models, e.g., so that corrections can be made, or the addition of scoring, through holes, or the like along interfaces between support structures and an object to mechanically weaken the interface layer.

As shown in step 814, the method 800 may include debinding the object. The details of the debinding process will depend on the type of binder system in the materials used for fabrication. For example, the binder system may include a first binder and a second binder, where the first binder resists deformation of the net shape of the object during debinding of the object and a second binder resisting deformation of the net shape of the object during a beginning of a thermal sintering cycle for the object. Debinding may include debinding the object to remove the first binder using any corresponding debind process such as chemical debinding, catalytic debinding, supercritical debinding, thermal debinding, and so forth. The debinding may also or instead include heating the object to remove the second binder. In another aspect, the binder system may include a first binder and at least one other binder, where the first binder forms about 20 percent to about 98 percent by volume of the binder system, and where debinding includes debinding the first binder from the object to create open pore channels for a release of the at least one other binder.

As shown in step 816, the method 800 may include sintering the object. This may include any thermal sintering cycle suitable for a powdered material in the object, the support structure, the interface layer, or a combination of these.

As shown in step 818, the method 800 may include removing the support structure from the object, e.g., by physically separating the support structure and the object along the interface layer. Depending upon the structure and materials of the interface layer, this may be a simple manual process of picking up the object, and potentially rinsing or otherwise cleaning the object to remove any powder residue. In another aspect, this may require the application of substantial mechanical force to break the interface layer which, although weaker than the object and/or support, may nonetheless have substantial strength.

Figure 9:
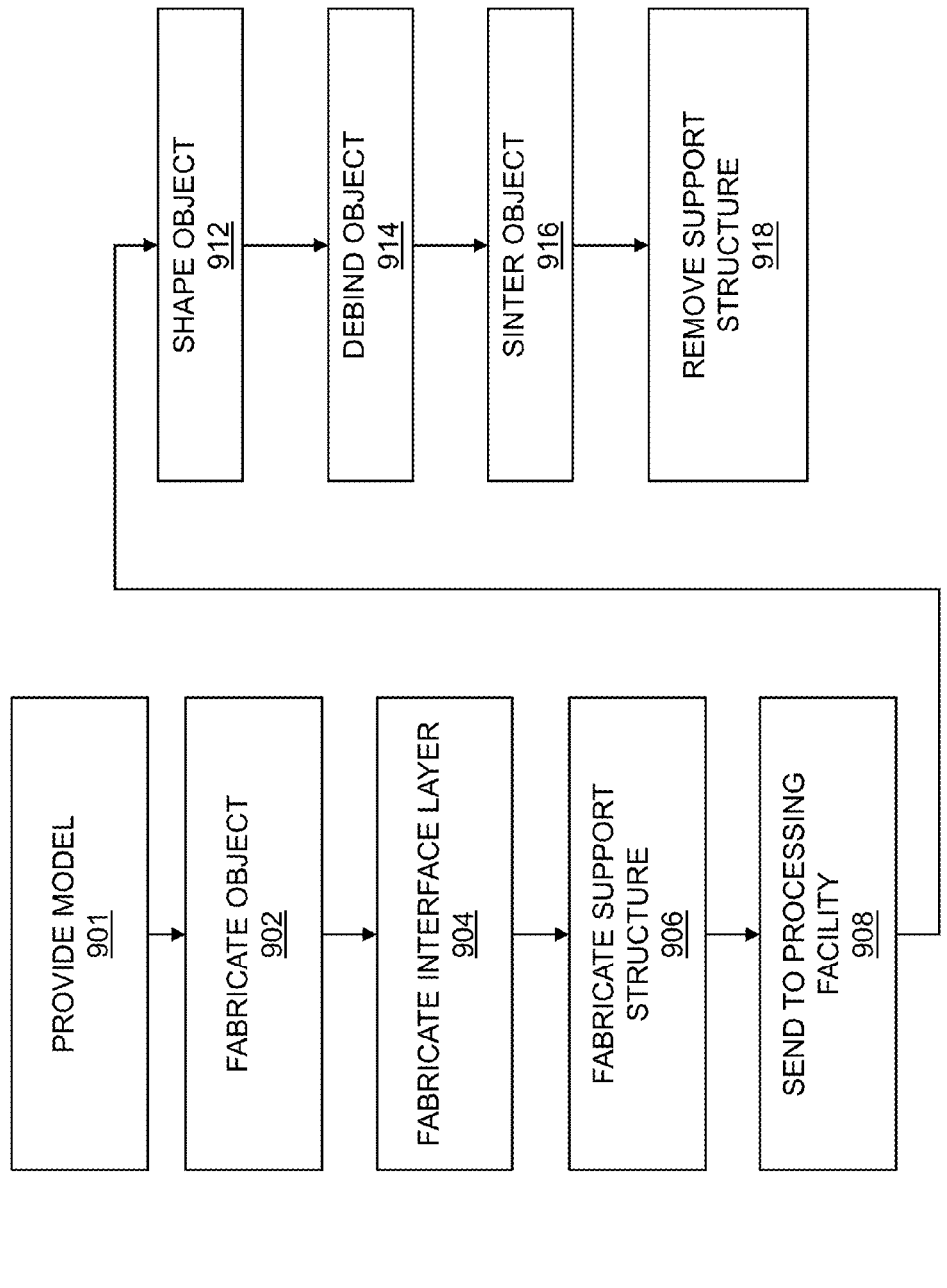
FIG. 9 shows a flow chart of a method for fabricating an object with overhead supports.

FIG. 9 shows a flow chart of a method for fabricating an object with overhead supports. As discussed herein, a variety of additive manufacturing techniques can be adapted to fabricate a substantially net shape object from a computerized model using materials that can be debound and sintered into a fully dense metallic part or the like. However, during a thermal sintering cycle, unsupported features such as bridges or overhangs may tend to slump and break, particularly where the supporting binder escapes the material before sintering has yielded significant strength gain. To address this issue, a variety of techniques are disclosed for supporting an additively manufactured shape during subsequent sintering, such as by providing overhead support to suspend vulnerable features.

As shown in step 901, the method 900 may begin with providing a computerized model, which may include providing a computerized model in any of the forms described herein.

As shown in step 902, the method 900 may include fabricating an object. In general, this may include fabricating an object having a net shape based on the computerized model from a build material. The build material may include a powdered material for forming a final part and a binder system including one or more binders, where the one or more binders resist deformation of the object during fabricating, debinding, and sintering of the object into the final part. This may, for example, include any of the powdered materials and binder systems described herein, such as metal injection molding material or the like. Fabricating may, for example, include using an additive manufacturing process to fabricate the object such as a fused filament fabrication process, a binder jetting process, or optical curing of a layer of powder-loaded resin, e.g. with stereolithography.

As shown in step 904, the method 900 may include fabricating an interface layer such as any of the interface layers described herein, and using any of the fabrication or forming techniques described herein. For example, this may include fabricating an interface layer between the object and a support structure (which may be an overhead support structure or an underlying support structure), where the interface layer is configured to retain a bond between the object and the support structure during a first portion of a sintering process, and to separate the object from the support structure during a second portion of the sintering process after the first portion.

As shown in step 906, the method 900 may include fabricating a support structure. In one aspect, this may include fabricating any of a variety of print or sintering supports such as those discussed herein. In another aspect, fabricating the support structure may include forming a support structure above a surface of the object, where the surface is upwardly vertically exposed so that the support structure can suspend the surface from above, and where the support structure includes a superstructure coupled to the surface to support a downward vertical load on the object.

Fabricating the support structure may, for example, include using an additive manufacturing process to fabricate the support structure such as a fused filament fabrication process, a binder jetting process, or optical curing of a layer of powder-loaded resin, e.g. with stereolithography. In another aspect, the support structure may be fabricated using other techniques, such as with a supplemental additive fabrication system configured to string filaments or other structures upwardly from a surface of the object to a superstructure. Thus, for example, the support structure may include a filament coupled to a top surface of the object at a location selected to prevent slumping of the object during at least one of debind and sintering. The filament may, for example, form a spring coupling the top surface of the object to the superstructure with a spring force that varies according to a length of the spring. The filament may couple to a frame of the superstructure. Using this general support strategy, generalized support structures may be formed that provide removable overhead support while permitting underlying support to be removed early in downstream processing, e.g., through a chemical debinding process.

Fabricating the support structure may also or instead include fabricating a second support structure below a location where the superstructure couples to the surface of the object. Fabricating the support structure may also or instead include fabricating a vertical retaining wall separated from a substantially vertical surface of the object by an interface layer that resists bonding of the vertical retaining wall to the substantially vertical surface of the object. The retaining wall may, for example, resist slumping of a thin wall of the object, provide an attachment for an overhead support, or otherwise support the object or related structures during subsequent processing.

As previously noted, it may be useful to match or otherwise coordinate shrinkage rates among materials. Thus, for example, the frame may be fabricated from a material selected to shrink at a predetermined rate during a debind and sintering of the object, e.g., so that the overhead supports continue to provide adequate (but not excessive) force on supported structures. Similarly, the filament may be fabricated from a material selected to shrink at a predetermined rate during a debind and sintering of the object.

As shown in step 908, the method 900 may include sending the fabricated object to a processing facility. In one aspect, where the entire fabrication process is performed locally, this step may be omitted. In another aspect, a service bureau or the like may be maintained to service multiple printing locations, where objects are printed locally, and then shipped or otherwise transported to the processing facility for one or more of shaping, debinding, and sintering. This latter approach advantageously permits sharing of resources such as debinding systems that use hazardous materials or large, expensive sintering furnaces.

As shown in step 912, the method 900 may include shaping the object. This may, for example, include smoothing to remove printing artifacts, manual or automated comparison to computerized models, e.g., so that corrections can be made, or the addition of scoring, through holes, or the like along interfaces between support structures and an object to mechanically weaken the interface layer.

As shown in step 914, the method 900 may include debinding the object to provide a brown part. The details of the debinding process will depend on the type of binder system in the materials used for fabrication. For example, the binder system may include a first binder and a second binder, where the first binder resists deformation of the net shape of the object during debinding of the object and a second binder resists deformation of the net shape of the object during a beginning of a thermal sintering cycle for the object. Debinding may include debinding the object to remove the first binder using any corresponding debind process such as chemical debinding, catalytic debinding, supercritical debinding, thermal debinding, and so forth. The debinding may also or instead include heating the object to remove the second binder. In another aspect, the binder system may include a first binder and at least one other binder, where the first binder forms about 20 percent to about 98 percent by volume of the binder system, and where debinding includes debinding the first binder from the object to create open pore channels for a release of the at least one other binder.

As shown in step 916, the method 900 may include sintering the object to provide a final part. This may include any thermal sintering cycle suitable for a powdered material in the object, the support structure, the interface layer, or a combination of these.

As shown in step 918, the method 900 may include removing the support structure from the object, e.g., by physically separating the support structure and the object along the interface layer. Depending upon the structure and materials of the interface layer, this may be a simple manual process of picking up the object, and potentially rinsing or otherwise cleaning the object to remove any powder residue. In another aspect, this may require the application of substantial mechanical force to break the interface layer which, although weaker than the object and/or support, may nonetheless have substantial strength. Where overhead supports are used, the support structure may usefully employ a combination of different interfaces that either fully or partially inhibit bonding within different regions of the interface, e.g., so that overhead supports can remain at least partially intact until sintering to full strength while print supports and the like completely detach during sintering.

Figure 10:
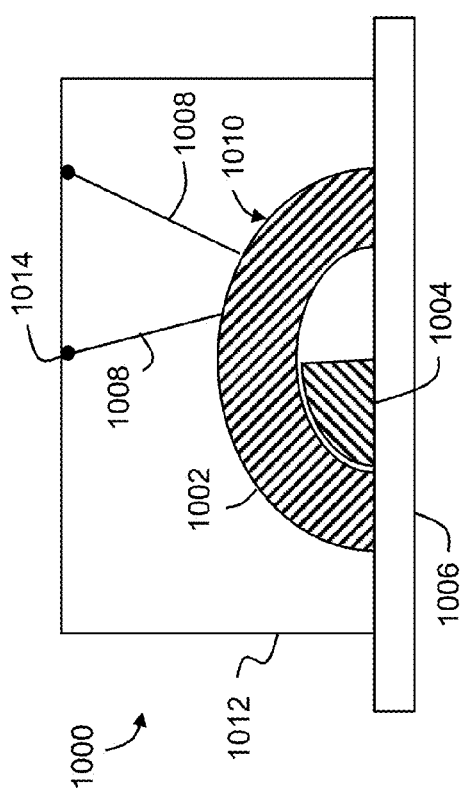
FIG. 10 shows an object with overhead support.

FIG. 10 shows an object with overhead support. In general, an article of manufacture described herein may include an object with overhead supports fabricated using the techniques described above. Thus, there is disclosed herein an article 1000 comprising an object 1002 formed of a build material such as any of the build materials described herein including a powdered material for forming a final part and a binder system including one or more binders, where the one or more binders resist deformation of the object during fabricating, debinding, and sintering of the object 1002 into the final part. The article 1000 may include a bottom support 1004 providing vertical support from a substrate 1006 below the build material during fabrication of the object 1002 in an additive fabrication process. An interface layer such as any of the interface layers described above may be formed between the object 1002 and the bottom support 1004. The article 1000 may also include a top support 1008 coupled to an upwardly vertically exposed surface 1010 of the object 1002, the top support 1008 providing vertical support against downward deformation of the object 1002 during at least one of debinding and sintering. The top support 1008 may, for example, include a number of filaments or the like coupled to a superstructure 1012 such as a frame, box, or other structure providing attachment points 1014 above the object 1002.

An interface layer may also or instead be formed between the object 1002 and the top support 1008, where the interface layer is configured to retain a bond between the object and the top support during a first portion of a sintering process, and where the interface layer is configured to separate the object from the top support during a second portion of the sintering process after the first portion, e.g., where the object 1002 has reached a self-supporting strength.

Figure 11:
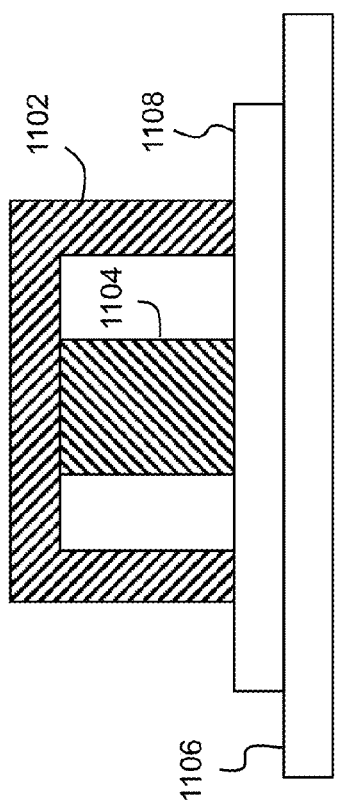
FIG. 11 shows a cross-section of an object on a shrinking substrate.

FIG. 11 shows a cross-section of an object on a shrinking substrate. As described above, a variety of additive manufacturing techniques can be adapted to fabricate a substantially net shape object from a computerized model using materials that can be debound and sintered into a fully dense metallic part or the like. However, during debinding and sintering, the net shape may shrink as binder escapes and a base material fuses into a dense final part. If the foundation beneath the object does not shrink in a corresponding fashion, the resulting stresses throughout the object can lead to fracturing or other physical damage to the object resulting in a failed fabrication. To address this issue, a variety of techniques are disclosed for substrates and build plates that contract in a manner complementary to the object during debinding and sintering.

An object 1102 fabricated from a sinterable build material will generally shrink as debinding and sintering occur. A support structure 1104 for the object 1102 may also usefully shrink at a similar or identical rate engineered to provide structural support to the object 1102 as needed during, e.g., debinding and sintering. Sintering setters 1106 or other prefabricated substrates may also be used when sintering to reduce deformation, e.g., as a result of physical displacement of surfaces of the shrinking object relative to an underlying surface as the part shrinks and various part surfaces drag along. While this may work for certain object shapes and sizes, the planar contraction within a sintering setter 1106 may not accommodate the range of parts that might be fabricated with an additive manufacturing system. As such, a shrinking substrate 1108 may be used, either on a sintering setter 1106 or some other surface, to ensure that a surface under the object 1102 shrinks in a manner consistent with the object 1102 to mitigate or avoid object deformation. In one aspect, the shrinking substrate 1108 may be fabricated with the build material used to fabricate the object 1102, or with another material having a matched shrinkage profile during debinding, sintering, or both. The object 1102 may be separated from the shrinking substrate 1108 and the support structure 1104 using an interface layer such as any of the interface layers described herein.

Figure 12:
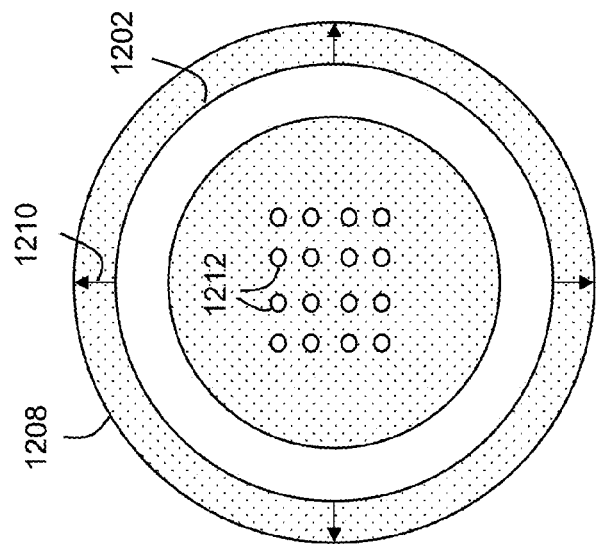
FIG. 12 shows a top view of an object on a shrinking substrate.

FIG. 12 shows a top view of an object on a shrinking substrate. While the shrinking substrate 1208 may nominally have a shrinkage rate matched to the object 1202, the surface of the object 1202 where it mates with the shrinking substrate 1208 may actually have varying shrinkage properties as a function of the three-dimensional shape of the object 1202. This may be addressed by creating a number of independent rafts or shrinking substrates 1208 for different contact surfaces of the object 1202, which may then be coupled to one another by tie bars, straps, or the like that are configured to shrink and that draw the rafts toward one another in a manner that matches the shrinkage of the object 1202 as debinding and sintering occurs. In one aspect, a convex hull of a projection of the object 1202 onto the shrinking substrate 1208 provides a shape that shrinks in a manner consistent with the object 1202. Thus, a shrinking substrate 1208 may usefully be fashioned by determining a convex hull of a projection of the object 1202 and offsetting this convex hull to provide a margin 1210 around the object 1202 for mechanical stability. The shrinking substrate 1208 may also usefully be provided with perforations 1212 in any suitable size, shape, and arrangement to permit drainage of a chemical solvent or the like from areas within the projection that are bounded on all sides the by object 1202 and bounded on the bottom by the shrinking substrate 1208.

Figure 13:
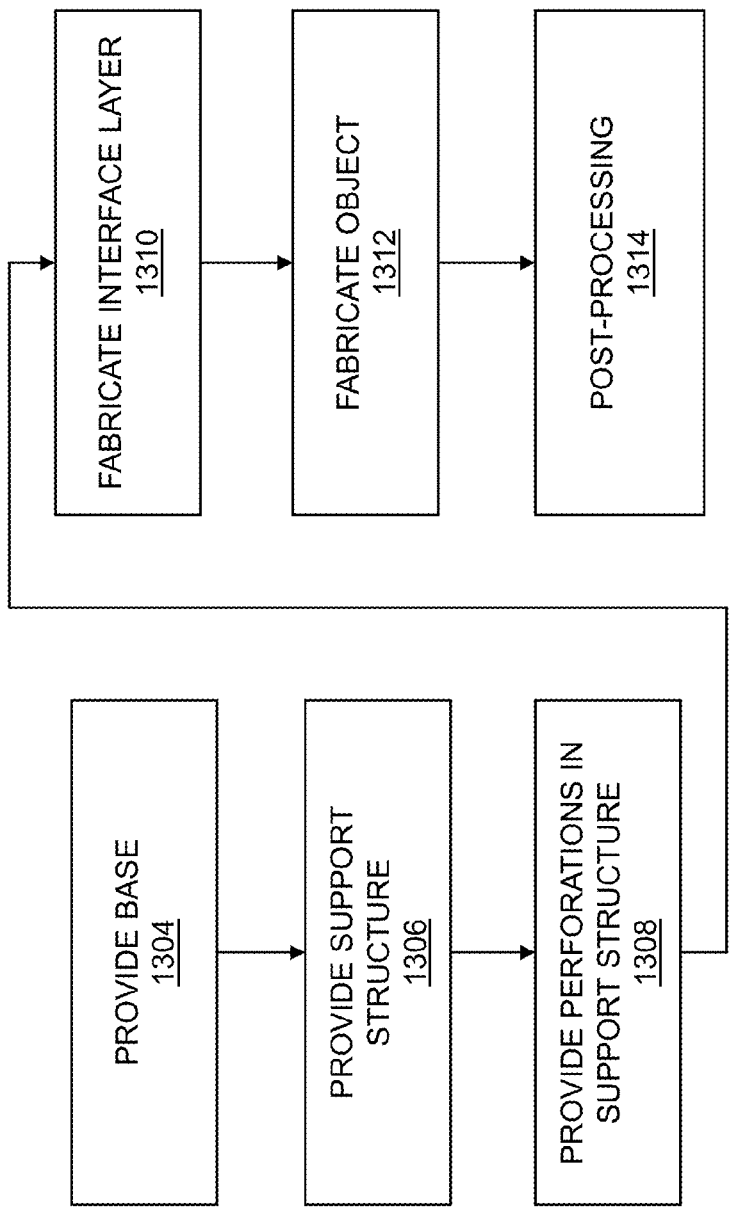
FIG. 13 is a flowchart of a method for fabricating shrinkable support structures.

FIG. 13 is a flowchart of a method for fabricating shrinkable support structures.

As shown in step 1304, the method 1300 may include providing a base for fabricating an object. The base may, for example, include a build plate, a sintering setter, or any other suitable support for an object to be fabricated using techniques contemplated herein. The base may optionally be a shrinking base that shrinks during debinding and/or sintering, or the base may be a reusable base that can be returned to a printer after post-processing.

As shown in step 1306, the method 1300 may include providing a support structure such as any of the shrinkable substrates contemplated herein. This may, for example, include fabricating the support structure on a build plate formed of a material that is itself debindable and sinterable, e.g., that shrinks with the object during sintering. Where the support structure is a build plate, the method 1300 may include fabricating a build plate for use as the support structure by injection molding the build plate with a second material having at least one of a debind shrinkage rate and a sintering shrinkage rate matching the build material used to fabricate the object. Where the substrate is fabricated locally, providing the support structure may include fabricating a substrate for the object from a second material having at least one of a debind shrinkage rate and a sintering shrinkage rate matching the build material.

As noted above, the substrate may include two or more independent substrate plates coupled by a number of tie bars that move the independent substrate plates together at a rate corresponding to a shrinkage of the object during at least one of debind and sintering. Where the object has two or more discrete and separate contact surfaces in a plane along a top surface of the substrate, the substrate may include two or more corresponding separate substrate regions formed about a projection of each of the two or more discrete and separate contact surfaces, and the substrate may include at least one tie bar, strap, or similar structure coupling the two or more discrete and separate contact surfaces to one another in order to facilitate a movement of the corresponding separate substrate regions in a manner geographically matched to a motion of the two or more discrete and separate contact surfaces during at least one of debind and shrinkage. In another aspect, a shape of the substrate may be based upon a convex hull of a projection of the object into a plane of a build plate that receives the object during fabrication. As described above, the shape may, for example, be a shell or outline uniformly displaced by a predetermined offset from the convex hull of the projection. An interior region, e.g., a region within the surface of the substrate enclosed by walls of the object fabricated thereon, may contain an opening to facilitate drainage of chemical solvents or the like during subsequent processing. Thus, the substrate may have an opening with a shape based on interior walls of the object, or derived from a predetermined inward offset from a boundary of the projection of the convex hull of the object.

In addition to providing shrinkable substrates, providing a support structure may include providing other support structures described herein. For example, providing a support structure may include fabricating a structural support for at least one of a bridge or an overhang in the object from a second material having at least one of a debind shrinkage rate and a sintering shrinkage rate matching the build material. For these support structures, interface layers as contemplated above may usefully be employed, and the support structure may be fabricated from a support material such as a ceramic powder that does not solidify during sintering, optionally along with a binder system that shrinks with the build material of the object.

As shown in step 1308, the method 1300 may include providing perforations in the support structure, such as prefabricated perforations in a prefabricated support structure, or a fixed or variable pattern of perforations where the support structure is fabricated specifically for an object. In general, the substrate may usefully incorporate a plurality of perforations or the like through the substrate and positioned to provide a drainage route through the substrate for a debind solvent. While straight, vertical through holes may conveniently be employed, other configurations are also possible. Thus, for example, the plurality of perforations may extend from a top surface of the substrate to a bottom surface of the substrate within regions of the substrate where an adjacent layer of the object does not vertically cover the substrate, or the perforations may extend from a top surface of the substrate to one or more side surfaces of the substrate, e.g., to provide a horizontal drainage path toward exterior edges of the projection of the substrate (or to any other useful location or combination of locations). The perforations may, for example, be positioned within a region of the substrate enclosed in an x-y plane of the substrate by a vertical wall of the object extending in a z-axis from the top surface of the substrate and surrounding the region of the substrate. In one aspect, the substrate may be fabricated with a regular pattern of perforations independent of a shape of an object fabricated thereupon. In another aspect, perforations may be omitted below the object (e.g., to avoid perforation-based surface artifacts on the object), such that the substrate forms a continuous, closed surface below a projection of the object into a plane of a build plate that receives the object during fabrication.

As shown in step 1310, the method 1300 may include fabricating an interface layer. In general, interface layers may usefully be incorporated between the shrinking substrate and the object, or between the object and other support structures, or between the shrinking substrate and a build plate, sintering setter, or other base that carries the object.

As shown in step 1312, the method 1300 may include fabricating an object on the shrinking substrate. As described above, this may for example include fabricating an object from a build material on the support structure (including the shrinking substrate), where the object has a net shape based on a computerized model, where the build material includes a powdered material for forming a final part and a binder system including one or more binders, where the one or more binders resist deformation of the object during a fabrication, a debinding, and a sintering of the object into the final part, and where the support structure is configured to match a shrinkage of the object during at least one of the debinding and the sintering.

As shown in step 1314, the method 1300 may include post-processing such as any of the shaping, debinding, sintering, or finishing steps described herein.

According to the foregoing, there is also disclosed herein an additive fabrication system for fabricating an object on a shrinking substrate. This system may, for example, include a build plate, a supply of build material, and an additive fabrication system. The build material may include any of the build materials described herein, such as a powdered material for forming a final part and a binder system including one or more binders, where the one or more binders resist deformation of the build material during fabricating, debinding, and sintering of the build material into the final part. The additive fabrication system may be any of the additive fabrication systems contemplated herein, and may be configured to fabricate an object on the build plate from the build material, where the additive fabrication system imparts a net shape to the build material based on a computerized model and the additive fabrication system is configured to provide a build surface such as a shrinking substrate having a shrinkage rate matching at least one of a debind shrinkage rate and a sintering shrinkage rate of the build material.

As discussed above, the build surface may include a preformed substrate, or the build surface may be a shrinking substrate fabricated for a specific object. For example, the build surface may include a shrinking substrate fabricated below a convex hull of a projection of the object into a plane of the build plate, and more specifically having a shape based on the convex hull of the projection of the object into the plane of the build plate. The system may also include a debinding station to remove at least one of the one or more binders from the build material in the object and a sintering oven to heat the object to form bonds between particles of the powdered material. The additive fabrication system may, for example, include at least one of a binder jet system or a fused filament fabrication system.

There is also disclosed herein an article of manufacture including a base plate with a shrinkable substrate and an object formed of a sinterable build material such as any of those described herein.

Figure 14:
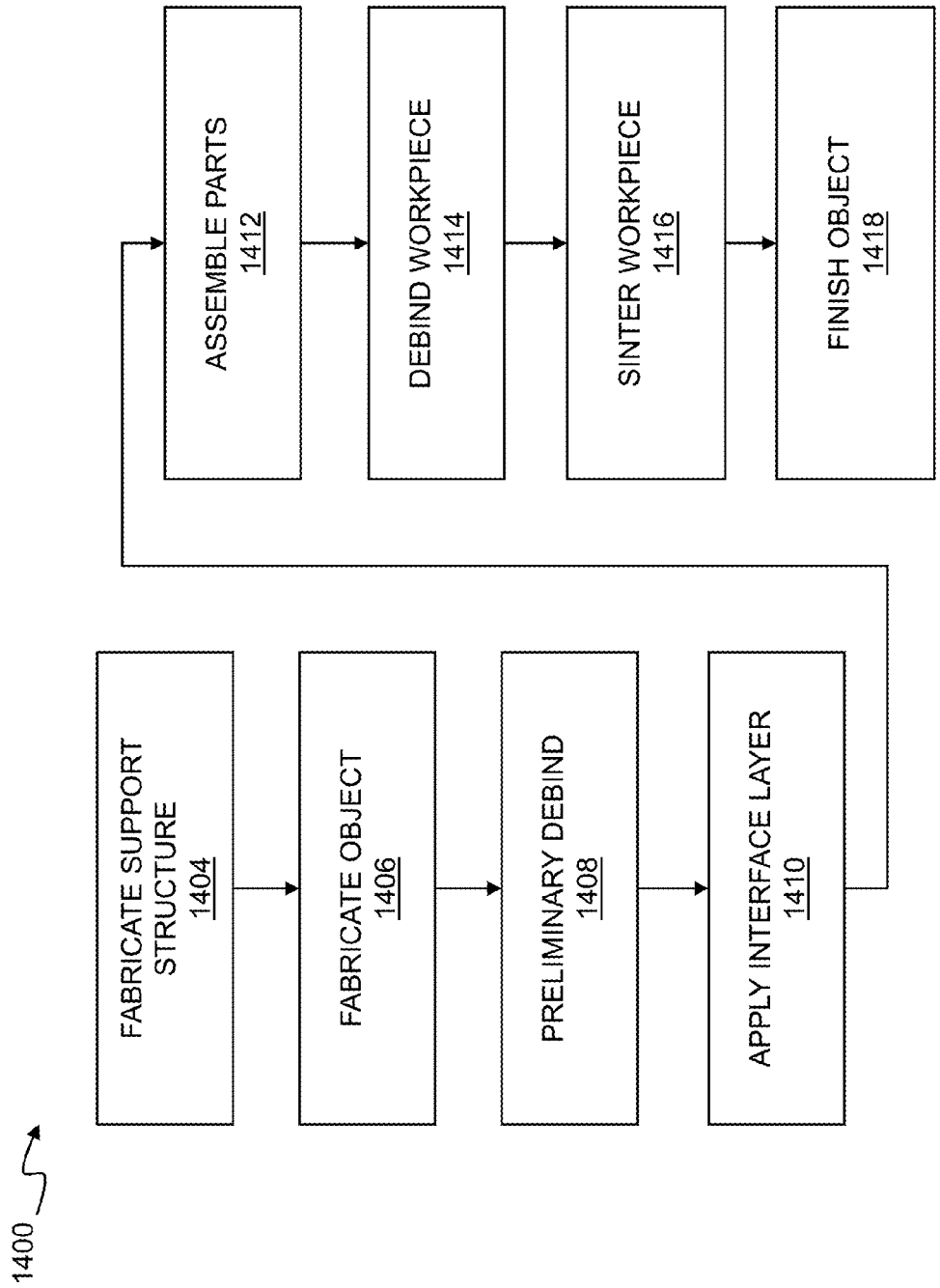
FIG. 14 shows a flow chart of a method for independently fabricating objects and object supports.

FIG. 14 shows a flow chart of a method for independently fabricating objects and object supports. Additive fabrication systems generally use support structures to expand the available range of features and geometries in fabricated objects. For example, when a vertical shelf or cantilever extends from an object, a supplemental support structure may be required to provide a surface that this feature can be fabricated upon. This process may become more difficult when, e.g., a part will be subjected to downstream processing steps such as debinding or sintering that impose different design rules. To address these challenges and provide a greater range of flexibility and processing speed, it may be useful in certain circumstances to independently fabricate the object and support structures, and then assemble these structures into a composite item for debinding and sintering. This approach also advantageously facilitates various techniques for spraying, dipping, or otherwise applying a release layer between the support structure and the part so that these separate items do not become fused together during sintering.

As shown in step 1404, the method 1400 may include fabricating a support structure for an object from a first material. Fabricating the support structure may, for example, include additively manufacturing the support structure using at least one of fused filament fabrication, binder jetting, and optical curing of a powder-loaded resin.

As shown in step 1406, the method 1400 may include fabricating the object. This may include fabricating the object from a second material, the object including a surface positionable adjacent to and supportable by the support structure, where the second material includes powdered material for forming a final part. A binder system may include a first binder that resists deformation of a net shape of the object during fabrication and a second binder that resists deformation of the net shape of the object during sintering of the object into the final part.

In one aspect, the first material of the support structure and the second material of the object may be substantially similar or include identical compositions. Thus, the first material and the second material may be deposited from a single source, such as by extruding a single build material for both from a single extruder of a fused filament fabrication system. The first material and the second material may also or instead have substantially matched shrinkage rates during debinding and sintering of the first material. The powdered material of the first material may include a metal powder, a ceramic powder, or any sinterable material. The binder system may include a first binder and a second binder, where the first binder is selected to resist deformation of the net shape of the object during debinding of the object and a second binder selected to resist deformation of the net shape of the object during a thermal sintering cycle used to sinter the object.

In general, fabricating the object may include additively manufacturing the object using at least one of fused filament fabrication, binder jetting, and optical curing of a powder-loaded resin.

As shown in step 1408, the method 1400 may optionally include removing the first binder of the object. By performing this step on the object, and possibly the support structure where similar binder systems are used, subsequent processing may be performed more quickly than if, for example, the object and support structure are assembled together and the surfaces through which debinding might otherwise occur become occluded.

As shown in step 1410, the method may include applying an interface layer to the object or the support structure (or both). Applying the interface layer may include applying the interface layer using at least one of fused filament fabrication, binder jetting, and optical curing of a powder-loaded resin. The interface layer may, for example, include any of the interface layers contemplated herein, and may generally resist bonding of the support structure to the object during sintering.

In one aspect, applying the interface layer may include applying an interface layer to a least one of the support structure and the object at a location corresponding to the surface of the object positionable adjacent to and supportable by the support structure. Applying the interface layer may also or instead include applying a ceramic-loaded slurry onto the support structure or applying a ceramic suspension onto the support structure. A variety of other techniques may also or instead be used to apply the interface layer. For example, applying the interface layer may include spraying the interface layer onto at least one of the support structure and the object. Applying the interface layer may include dipping at least one of the support structure and the object into an interface material. Applying the interface layer may include micropipetting the interface layer onto at least one of the support structure and the object.

As shown in step 1412, the method may include assembling the support structure and the object together into an assembled workpiece. This may include assembling the pieces so that the surface of the object is positioned adjacent to and supported by the support structure. This may also include positioning the assembled workpiece on a build plate configured to shrink at a substantially equal rate to the object during at least one of debinding and sintering.

As shown in step 1414, the method 1400 may include debinding the assembled workpiece, such as by using any of the debinding techniques contemplated herein.

As shown in step 1416, the method 1400 may include sintering the assembled workpiece, such as by using any of the sintering techniques contemplated herein.

As shown in step 1418, the method 1400 may include finishing the object, which may include disassembling the sintered workpiece to retrieve the final part, along with any other appropriate finishing or post-processing steps.

Figures 15, 16:
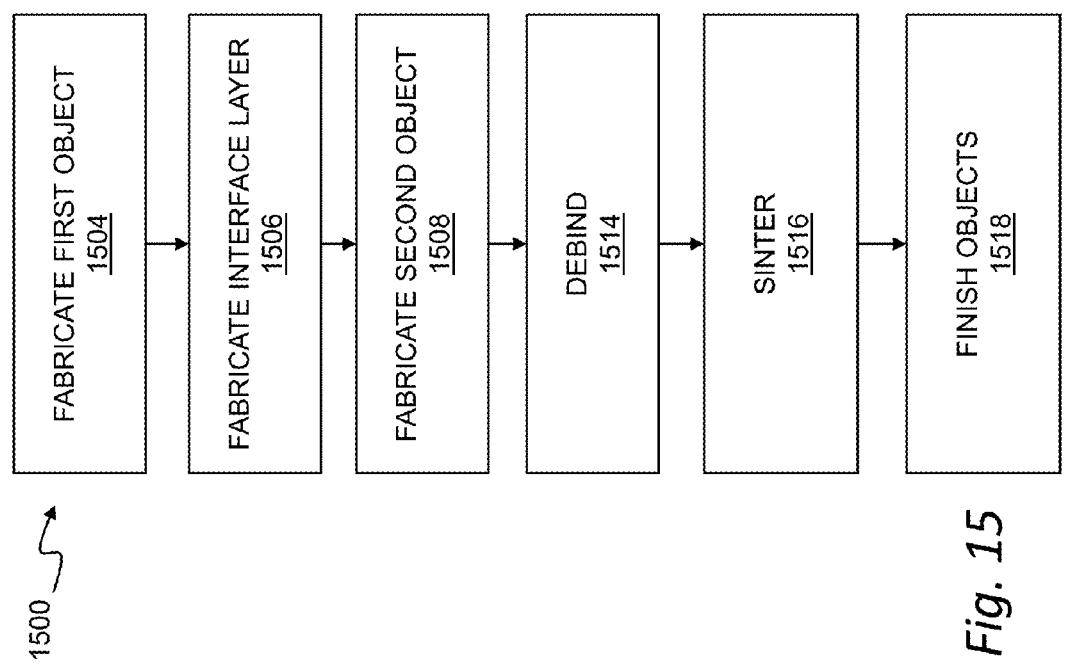
FIG. 15 shows a flow chart of a method for fabricating multi-part assemblies.
FIG. 16 illustrates a mechanical assembly in a casing.

FIG. 15 shows a flow chart of a method for fabricating multi-part assemblies. By forming release layers between features such as bearings or gear teeth, complex mechanical assemblies can be fabricated in a single additive manufacturing process. Furthermore, by using support structures that can be dissolved in a debinding step, or that otherwise decompose into a powder or other form, support material can usefully be removed from these assemblies after sintering.

In one aspect, a non-structural support at the interface, e.g. a pure binder that does not sinter into a structural object, may be used to facilitate the additive manufacture of nested parts. For example, a complete gear box or the like may be fabricated within an enclosure, with the surfaces between gear teeth fabricated with a non-sintering binder or other material. In one aspect, critical mechanical interfaces for such mechanical parts may be oriented to the fabrication process, e.g., by orienting mating surfaces vertically so that smaller resolutions can be used. More generally, the capability to print adjacent, non-coupled parts may be used to fabricate multiple physically related parts in a single print job. This may, for example, include hinges, gears, captive bearings, or other nested or interrelated parts. Non-sintering support material may be extracted, e.g., using an ultrasonicator, fluid cleaning, or other techniques after the object is sintered to a final form. In an aspect, the binder is loaded with a non-sintering additive such as ceramic or a dissimilar, higher sintering temp metal.

This general approach may also affect the design of the part. For example, axles may employ various anti-backlash techniques so that the sintered part is more securely retained during movement and use. Similarly, fluid paths may be provided for fluid cleaning, and removal paths may be created for interior support structures. This technique may also be used to address other printing challenges. For example, support structures within partially enclosed spaces may be fabricated for removal through some removal path after the object is completed. If the support structures are weakly connected, or unconnected, to the fabricated object, they can be physically manipulated for extraction through the removal path. In an aspect, parts may be "glued" together with an appropriate (e.g., the same) MIM material to make larger parts that essentially have no joints once sintered.

A method 1500 for fabricating multipart components is now described in greater detail.

As shown in step 1504, the method 1500 may include fabricating a first object from a first material. The first material may include any of the material systems described herein, such as a powdered material and a binder system, the binder system including a first binder that resists deformation of a net shape of the first material during fabrication and a second binder that resists deformation of the net shape of the first material during sintering of the first material into a final part. The powdered material may, for example, include a powdered metal.

Fabricating, as contemplated herein for this step and subsequent steps, may include fabricating using a fused filament fabrication process, a binder jetting process, or a stereolithography process, as well as combinations of these and other supplemental additive and subtractive fabrication processes described herein.

As shown in step 1506, the method 1500 may include applying an interface layer to a first surface of the first object. The interface layer may usefully reduce to a powder during sintering of the first material, e.g., so that the material can be removed after fabrication. The interface layer may, for example, include a powdered ceramic having a substantially higher sintering temperature than the powdered material used in the first object (and second object, below). In general, applying the interface layer may include fabricating the interface layer using the techniques noted above. Applying the interface layer may also or instead include one or more of inkjetting, micropipetting, and painting an interface material onto the first surface to form the interface layer. In this context, the interface material may, for example, include a ceramic-loaded polymer, a ceramic-loaded suspension, a ceramic-loaded slurry, or any other ceramic and carrier combination suitable for distribution onto one of the object surfaces to form an interface layer.

As shown in step 1508, the method may include fabricating a second object. This may include fabricating a second surface of the second object from a second material at a location adjacent to the interface layer and opposing the first surface of the first object, where the second object is structurally independent from and mechanically related to the first object, and where the interface layer resists bonding of the first surface to the second surface during sintering. It will be understood that fabricating the second object may be performed prior to, after, or concurrently with fabricating the first object. Thus, while the method 1500 described herein generally contemplates concurrent fabrication of interrelated mechanical assemblies, this may also or instead include separate manufacture and assembly of parts as described above with reference to FIG. 14. These techniques may thus be used alone or in any useful combination to facilitate the fabrication of complex mechanical assemblies based on computerized models using sinterable, metal-bearing build materials.

The materials of the first object and the second object, e.g., an object and a support for the object, or an object and a complementary mechanical part such as a mating gear, may have generally complementary properties. The first material (of the support) and the second material (of the object) may be supplied from a single source of build material, such as an extruder of a fused filament fabrication system or a container of stereolithography resin, and may have a substantially common composition. The first material and the second material may also or instead have substantially similar shrinkage rates during a thermal sintering cycle.

The first object and the second object may be mechanically or structurally related in a number of different ways. For example, the first object and the second object may form a multi-part mechanical assembly such as a hinge, a gear set, a bearing, a clamp, and so forth. For example, the first object and the second object may include complementary gears, or one of the first object and the second object may include an axel or a bearing. The multi-part assembly may also include one or more parts moving within a casing. Where the casing encloses the multi-part mechanical assembly, or otherwise requires internal print support, sinter support or the like, an exit path may be provided. Thus, the method 1500 may include providing a physical exit path from the casing for a third material of the interface layer, either by printing the casing with the physical exit path or by adding the physical exit path with a subtractive tool after the casing is printed. The method 1500 may also or instead include providing a physical exit path within the multi-part mechanical assembly for extraction of a support material. To facilitate removal in this manner, the support material may reduce to a powder during sintering of the first material. In another aspect, the support material may be a dissolvable material, and the method 1500 may include dissolving the support material in a solvent and removing the support material and solvent through the physical exit path. This may, for example, occur during a chemical debind, or as an independent step for support removal.

As shown in step 1514, the method 1500 may include debinding the first object and the second object using any of the debinding techniques contemplated herein.

As shown in step 1516, the method 1500 may include sintering the first object and the second object using any of the sintering techniques contemplated herein.

As shown in step 1518, the method 1500 may include finishing the first object and the second object using any of the techniques contemplated herein.

FIG. 16 illustrates a mechanical assembly in a casing. In general, the mechanical assembly 1600 may include any number of interrelated parts such as gears 1602, axels 1604, springs 1606, moving arms 1608, and so forth. The mechanical assembly 1600 may include a casing 1610 that is fabricated, e.g., concurrently with the mechanical assembly 1600 using an additive fabrication process, and that encloses some or all of the moving parts of the mechanical assembly 1600. The casing 1610 may also, where useful, incorporate passages to exterior surfaces for switches, buttons, or other controls, or for more generally coupling to moving parts outside the casing 1610 through the walls of the casing 1610. As described above, individual components of the mechanical assembly 1600 may be fabricated in place, e.g., in intimate mechanical engagement with one another. In order to maintain at least partial mechanical independence, individual components of the mechanical assembly 1600 may also by physically separated using an interface layer as described above. However, the material of the interface layer, as well as any support structures or the like used to fabricate objects inside the casing 1610, may require removal after fabrication in order for the components of the mechanical assembly to function as intended. Thus, the casing 1610 may usefully incorporate a physical exit path 1612 in order to facilitate the ingress of solvents or cleaning fluids, and the egress of such fluids along with materials of the interface layers and/or support structures within the casing 1610.

A second passageway 1614 may also be provided, which facilitates flushing of the interior of the casing 1610 by providing a solvent or other cleaning fluid or the like through one passageway, e.g., the physical exit path 1612 and out another passageway, e.g. the second passageway 1614.

In another aspect, modular support structures 1620 may be fabricated within the casing 1610, with individual elements of the modular support structures 1620 separated by an interface layer to permit disassembly and individual removal. Thus, the physical exit path 1612 may also provide a passageway for removal of modular support structures 1620, as discussed in greater detail below.

Figure 17:
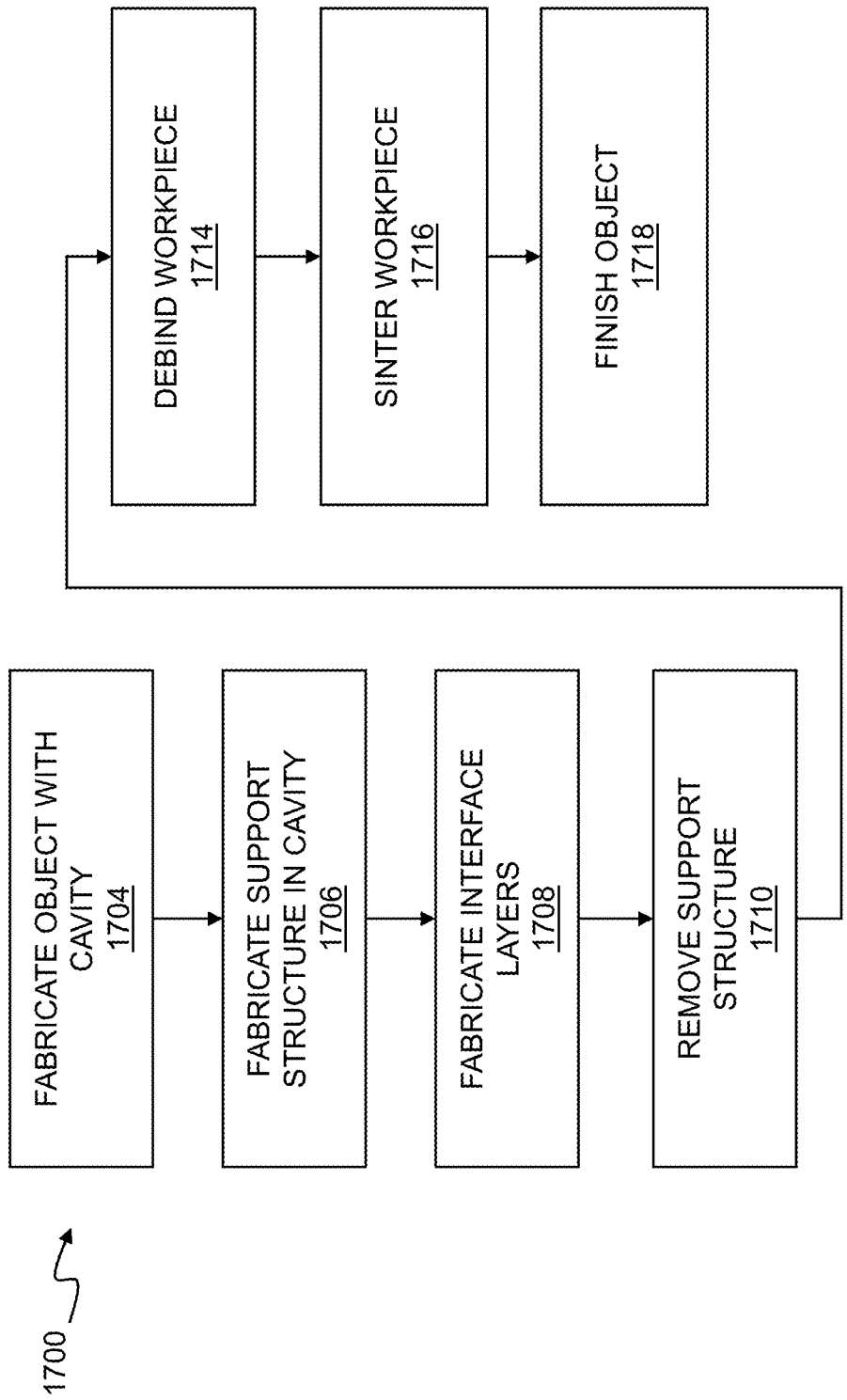
FIG. 17 shows a flow chart of a method for fabricating removable sinter supports.

FIG. 17 shows a flow chart of a method for fabricating removable sinter supports. Additive fabrication systems such as those described herein generally use support structures to expand the available range of features and geometries in fabricated objects. For example, when an overhang or cantilever extends from an object, a supplemental support structure may be required to provide a surface that this feature can be fabricated upon. This process may become more difficult when a surface requiring support is enclosed within a cavity inside an object being fabricated. Techniques are disclosed herein for fabricating supports that can be removed from within cavities in an object.

As shown in step 1704, the method 1700 may begin with fabricating an object with a cavity. For example, this may include fabricating an object from a build material using an additive fabrication process, where the object has a cavity and a passageway (such as the cavity and the physical exit path described above). The cavity may generally include an interior surface requiring support during fabrication, such as an interior wall of the cavity or a surface of an independent mechanical part within the cavity. The passageway may generally provide an open passage between the cavity and an exterior environment for the object. In another aspect, the cavity may be fabricated with a plurality of passageways arranged to facilitate flushing fluid in from a first one of the passageways through the cavity and out through a second one of the passageways.

In another aspect, fabricating the object may include fabricating an object from a build material using an additive fabrication process, where the build material includes a powdered build material and a binder system, the binder system including a first binder that resists deformation of a net shape of the object during fabrication and a second binder that resists deformation of the net shape of the object during sintering of the object into a final part, and where the object has a cavity and a passageway, the cavity including an interior surface requiring support during fabrication and the passageway providing an open passage between the cavity and an exterior environment for the object.

In general, the object may be fabricated using any of the techniques, and with any of the build materials, described herein. Thus, for example, the build material may include a powdered material (such as a metallic powder) and a binder system, the binder system including a first binder that resists deformation of a net shape of the object during fabrication and a second binder that resists deformation of the net shape of the object during sintering of the object into a final part.

As shown in step 1706, the method 1700 may include fabricating a support structure for the interior surface within the cavity. In one aspect, the support structure may include a composite support structure formed from a plurality of independent support structures such as the modular support structures described above, which may be configured to collectively provide support to the interior surface to satisfy a fabrication rule for the build material. Although the passageway may be smaller than the composite support structure, each of the independent support structures may be shaped and sized for individual removal from the cavity through the passageway, thus facilitating removal of large support structures through a small passageway in an enclosure such as the cavity. For example, the composite support structure may have a shape with dimensions collectively too large to pass through a smallest width of the passageway. Or, for example, where the passageway forms a tortuous path, the passageway may not provide a draw path for removal of the composite support structure as a rigid object, while independent support structures that make up the composite support structure may be removed one at a time through the passageway. Similarly, in this context, the term cavity is intended to include any partially enclosed or wholly enclosed space with an interior volume that contains, or might contain, a support structure that cannot, as a composite structure, be extracted through a passageway into the cavity from an exterior space.

In another aspect, the support structure may be fabricated from a powdered support material in a matrix such as any of the powdered materials and binders or the like described herein. This may facilitate a range of other removal techniques. For example, the method 1700 may include dissolving the matrix during a debind (as described below), or removing the matrix during sintering of the object. The method 1700 may also or instead include reducing the support structure to a powder by removing the matrix through any suitable means. Where the support structure can be reduced to a powder, the method 1700 may further include removing the powdered support material from the cavity, e.g., by flushing with a gas, a liquid, or any other suitable cleaning medium.

As shown in step 1708, the method may include fabricating an interface layer. This may, for example, include fabricating an interface layer between the support structure and a supported surface, or between the support structure and another surface such as an interior wall of the cavity that provides the support (through the support structure) for the supported surface, or between one of the plurality of independent support structures and an adjacent portion of the interior surface of the cavity. This may also usefully include fabricating an interface layer between each of the plurality of independent support structures to facilitate disassembly and removal of each of the plurality of independent support structures from the cavity through the passageway. It will be understood that while illustrated as occurring after fabricating the support structure, fabrication of the interface layer will occur in-between layers of the independent support structures, and as such, may be performed before, during, and/or after fabrication of the independent support structures as necessary to render a composite support structure that can be disassembled and removed.

In general, one or more interface layers may be fabricated from any of the interface materials contemplated herein. For example, the interface layer may be formed of an interface material including a ceramic powder, or any other interface material that resists bonding of the support structure to the interior surface of the object during sintering.

As shown in step 1710, the method 1700 may include removing the support structure, e.g., using any of the techniques described herein.

As shown in step 1714, the method 1700 may include debinding the object. In one embodiment, the support structure is a fabrication support structure (as distinguished, e.g., from a sintering support structure), and the interface layer is removable with the debind. In this arrangement, the method 1700 may include removing the support structure after debinding (e.g., after the interface layer has been removed) and before sintering.

As shown in step 1716, the method 1700 may include sintering the object, e.g., using any of the sintering techniques described herein.

As shown in step 1718, the method 1700 may include finishing the object, which may include cleaning, flushing, polishing, or otherwise finishing the object and preparing the object for an intended use.

While the foregoing discussion expressly contemplates the removal of multi-part supporting structures from interior cavities, it will be readily appreciated that the same or similar techniques may also or instead be used to fabricate multi-part support structures for exterior surfaces of an object. This may be useful in numerous fabrication contexts, such as where the support structures fully or partially enclose a fabricated object in a manner that creates mold lock—a condition where the object is mechanically locked or enclosed within an associated support structure. In this context, a multi-part support structure may usefully be fabricated with non-sinterable interface regions in between so that the support structure can be easily disassembled and removed after sintering (and infiltration where applicable) of the object into a densified part.

Thus, in one aspect, a method disclosed herein includes fabricating, from a first material, a support structure for an object, the support structure including two or more discrete support components; forming an interface layer including a first portion of the interface layer adjacent to the support structure and a second portion of the interface layer between the two or more discrete support components; and fabricating a surface of the object from a second material, the surface of the object adjacent to the first portion of the interface layer and the second material including a powdered material for forming a final part and a binder system including one or more binders, where the one or more binders resist deformation of a net shape of the object during processing of the object into the final part, where processing of the object into the final part includes debinding the net shape to remove at least a portion of the one or more binders and sintering the net shape to join and densify the powdered material, and where the interface layer resists bonding of the support structure to the object during sintering.

The two or more discrete support components may, for example, be the modular support structures described above, configured for removal from an interior cavity, or the two or more discrete support components may be exterior modular support structures that enclose the object, e.g., to form a locked mold about the object.

In another aspect, a method disclosed herein includes receiving such an article at a service bureau or the like for subsequent processing. Thus, the method may include receiving an article including a support structure fabricated from a first material, an object, and an interface layer, where the support structure includes two or more discrete support components for supporting an the object, where the interface layer includes a first portion of the interface layer adjacent to the support structure and a second portion of the interface layer between the two or more discrete support components, and where the object includes a surface fabricated from a second material including a powdered material for forming a final part and a binder system including one or more binders, where the one or more binders resist deformation of a net shape of the object during processing of the object into the final part, where processing of the object into the final part includes sintering the net shape to join and densify the powdered material, and where the interface layer resists bonding of the support structure to the object during sintering; and processing the article into the final part, where processing the article includes at least one of debinding the article and sintering the article, and where processing the article further includes separating the object from the support structure at the interface layer.

The support structure formed of the two or more discrete support components may, for example, include a print support for the object, e.g., that provides a surface for fabricated a layer of the object thereupon. The two or more discrete support components may also or instead include a debinding support for the object that resists deformation of the object during debinding. The support structure may also or instead include a sintering support for the object, e.g., that resists slumping, fracturing, or other deformation of the object during sintering into a final part.

Similarly, an article contemplated herein may include multiple, separate support structures separated by interface layers to facilitate disassembly after sintering. Thus, an article contemplated herein includes an object formed of a build material, the build material including a sinterable powdered material for forming a final part at a sintering temperature, where the build material includes a binder system containing one or more binders retaining the sinterable powdered material in a net shape of the object prior to densifying the sinterable powdered material into the final part; a support structure for the object, the support structure positioned adjacent to a surface of the object to provide mechanical support during at least one of printing the object, debinding the object, and sintering the object, the support structure formed of one or more other materials having a shrinkage rate during at least one of debinding and sintering coordinated with a second shrinkage rate of the build material, where the support structure includes two or more discrete components; and an interface layer disposed between the support structure and the surface of the object and between each of the two or more discrete components of the support structure, the interface layer containing a composition that resists bonding of the support structure to the surface of the object or other ones of the two or more discrete components through the interface layer during sintering.

The support structure may for example form a locked mold enclosing the object. In this context, the two or more discrete components may, when separated after sintering, disassemble to release the object from the locked mold. In another aspect, the support structure may form an interior support within a cavity of the object. In this interior context, the two or more discrete components may, when separated after sintering, disassemble for removal from the cavity.

Figure 18:
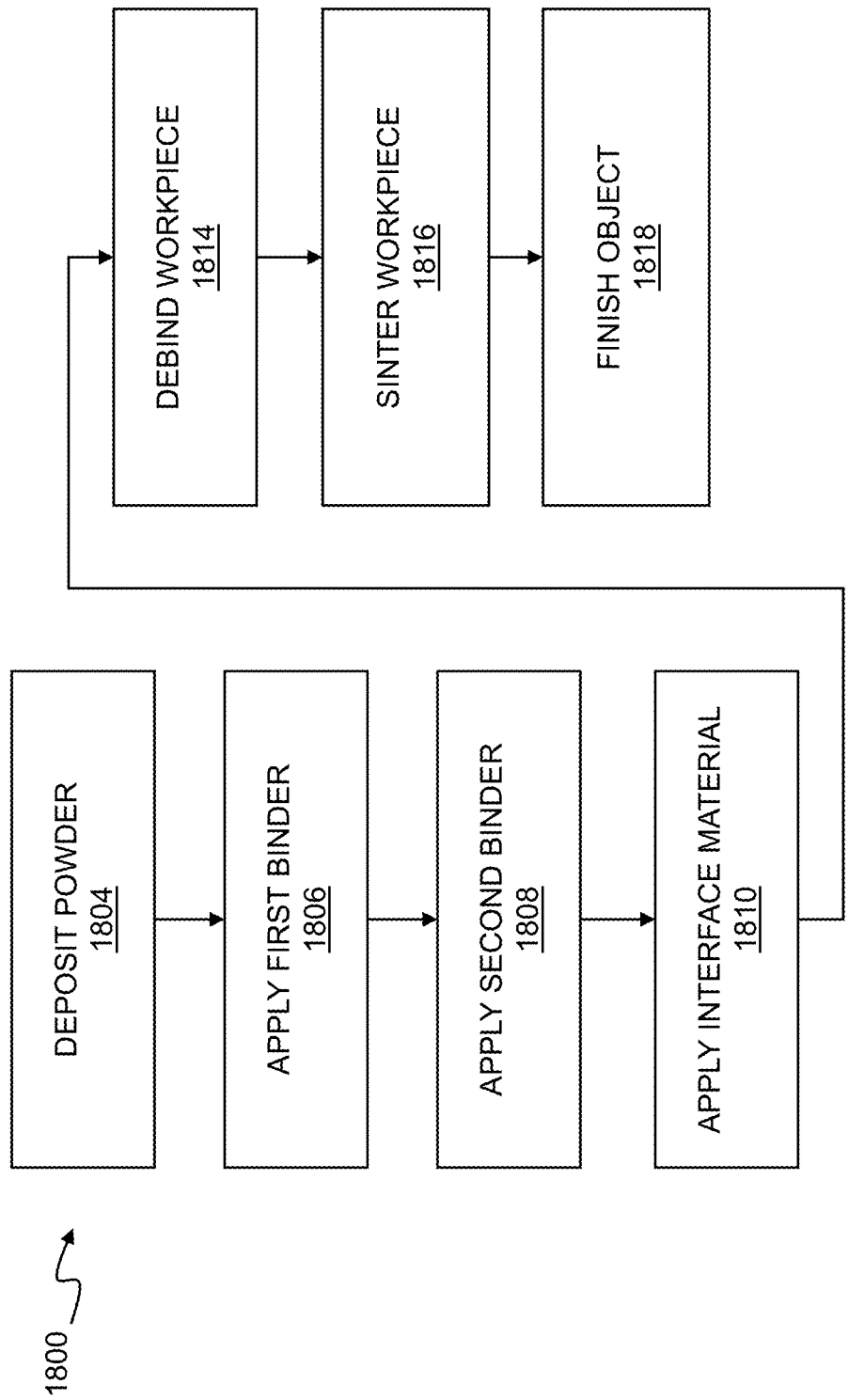
FIG. 18 shows a flow chart of a method for forming an interface layer in a binder jetting process.

FIG. 18 shows a flow chart of a method for forming an interface layer in a binder jetting process. Binder jetting techniques can be used to deposit and bind metallic particles or the like in a net shape for debinding and sintering into a final part. Where support structures are required to mitigate deformation of the object during the debinding and/or sintering, an interface layer may usefully be formed between the support structures and portions of the object in order to avoid bonding of the support structure to the object during sintering.

As shown in step 1804, the method 1800 may begin with depositing layers of powdered material. This may, for example, include depositing a number of layers of a powdered material in a bed such by spreading powdered material in a powder bed as described above. The powdered material may include a metallic powder or any other sinterable powder or the like formed of a material selected for sintering into a final part. In order to apply powder more quickly, depositing layers of powder may include applying successive layers of the powdered material in opposing directions with a bi-directional spreader.

As shown in step 1806, the method 1800 may include applying a first binder to form a support. This may include applying a first binder in a first pattern to the number of layers as they are deposited to form a support structure from the powdered material within the bed.

As shown in step 1808, the method 1800 may include applying a second binder to form an object. For example, this may include applying a second binder in a second pattern to the number of layers as they are deposited to form an object from the powdered material within the bed. It will be appreciated that the support structure may be formed beneath, above, or vertically adjacent to the object, or some combination of these, according to the geometry of the object and any needed support. The first binder (for the support) and the second binder (for the object) may be substantially similar or identical binder systems deposited from a single print head.

In one aspect, the second binder may usefully incorporate a secondary infiltrate selected to modify properties of a final part formed by sintering the object. For example, the secondary infiltrant may include at least one of a carbon, a boron, and a metal salt to increase strength of the object.

As shown in step 1810, the method 1800 may include applying an interface material at an interface between the support structure and the object, where the interface material resists bonding of the support structure to the object during sintering.

The interface material may, for example, include a colloidal suspension of ceramic particles sized to infiltrate the sinterable powder in a surface of the support structure adjacent to the object. For example, where the sinterable powder used to form the object has a mean particles size of about ten to thirty-five microns, the ceramic particles may usefully have a mean particle size of less than one micron, or more generally at least one order of magnitude smaller than a similarly measure mean particle size of the sinterable powder. The interface layer may, for example, be applied by jetting the interface material through a jetting print head such as a binder jetting print head or any other suitable print head or distribution mechanism.

The interface layer may also or instead include a layer of ceramic particles deposited at a surface of the support structure adjacent to the object. The layer of ceramic particles may be solidified to prevent displacement by subsequent layers of the sinterable powder, thereby forming a sinter-resistant ceramic layer between the support structure and the object. For example, the layer of ceramic particles may be deposited in a curable carrier, and the method 1800 may include curing the curable carrier substantially concurrently with deposition on the sinterable powder.

In one aspect, the interface material, may include a material that remains as an interface layer physically separating the support structure from the object after debind and into a thermal sintering cycle. For example, an interface material may be deposited in an intermittent pattern between the support structure and the object to create a corresponding pattern of gaps between the support structure and the object. If cured in these locations, a subsequent powder layer may be displaced from locations carrying the interface material, with a resulting intermittent structure mechanically coupling the support to the object. This configuration may effectively weaken a mechanical structure between the support structure and the object to facilitate removal of the support structure, e.g., after debinding or sintering as appropriate, while retaining enough structure to provide the required support for printing, debinding, and/or sintering. The size and shape of gaps between regions of interface material may depend, for example, on the nature of the build materials and the debinding and sintering process. But in general, any pattern may be used provided that the support and the object can retain their respective structure through subsequent processing.

Where the first binder used to form the support structure (or the second binder used to form the object) is debindable with a chemical solvent, the interface material may usefully be at least partially non-soluble in the chemical solvent so that the interface material remains wholly or partially intact through a chemical debind of the support structure (and/or the object).

In one aspect, the interface material may include a soluble metal salt that transforms to a ceramic upon dehydration and heating. For example, the interface material may include at least one of a hydroxide, a chloride, a sulfate, a nitrate, an acetate, and a stearate. The interface material may further include aluminum, and the interface material may include at least one of zirconium, yttrium, silicon, titanium, iron, magnesium, and calcium.

In another aspect, the interface layer may be formed by jetting or otherwise depositing a solution that precipitates a non-sintering material. For example, aqueous solutions of aluminum sulfate, aluminum nitrate, aluminum triacetate, or zirconium acetate may be used. Other salts of elements that form chemically resistant oxides upon decomposition may also or instead be used. Similarly, an interface layer may usefully be jetted as a polymer that decomposes into graphite (preferably where graphite is not strongly reactive with the build material of the object).

As shown in step 1814, the method may include debinding the object (and support structure, as appropriate) using any of the debinding techniques described herein.

As shown in step 1816, the method 1800 may include sintering the object (and support structure, as appropriate) in a thermal sintering cycle using any of the sintering techniques described herein.

As shown in step 1818, the method 1800 may include finishing the object (and support structure, as appropriate) using any of the techniques described herein.

The above systems, devices, methods, processes, and the like may be realized in hardware, software, or any combination of these suitable for a particular application. The hardware may include a general-purpose computer and/or dedicated computing device. This includes realization in one or more microprocessors, microcontroller 308s, embedded microcontroller 308s, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
   fabricating, from a first material, a support structure for an object;
   fabricating an interface layer adjacent to the support structure; and
   fabricating a surface of the object from a second material, the surface of the object adjacent to the interface layer and the second material including a powdered material for forming a final part and a binder system including one or more binders, wherein the one or more binders retain a net shape of the object during processing of the object into the final part, wherein processing of the object into the final part includes debinding the net shape to remove at least a portion of the one or more binders and sintering the net shape to join and densify the powdered material, and wherein the interface layer resists bonding of the support structure to the object during sintering.

2. The method of claim 1 wherein the second material includes a powdered metallurgy material.

3. The method of claim 1 wherein the powdered material includes a metal powder.

4. The method of claim 1 wherein the powdered material includes a ceramic powder.

5. The method of claim 1 wherein the powdered material is a sinterable material.

6. The method of claim 1 wherein the second material includes an infiltrable powder with at least one of a metallic infiltrant and a ceramic infiltrant.

7. The method of claim 1 wherein the binder system includes a single binder.

8. The method of claim 7 wherein the single binder is removable from the object through a pure thermal debind.

9. The method of claim 7 wherein fabricating the surface of the object includes applying the single binder in a binder jetting process.

10. The method of claim 1 wherein the binder system includes a first binder that is removed from the second material during a debind prior to sintering, and wherein the binder system includes a second binder that remains in the net shape at an onset of a thermal sintering cycle.

11. The method of claim 1 wherein the binder system includes a first binder that is removed from the second material during a debind prior to sintering, and wherein the binder system includes a second binder that remains in the net shape through sintering into the final part.

12. The method of claim 11 wherein the second binder includes submicron particles that facilitate sintering of the powdered material.

13. The method of claim 12 wherein the submicron particles include an element selected for alloying with the powdered material.

14. The method of claim 12 wherein the submicron particles have a composition substantially identical to the powdered material and a size distribution with a mean at least one order of magnitude smaller than the powdered material.

15. The method of claim 1 wherein the powdered material has a distribution of particle sizes with a mean diameter of between two and fifty microns.

16. The method of claim 1 wherein the binder system includes a first binder and a second binder, the first binder resisting deformation of the net shape of the object during debinding of the object and the second binder resisting deformation of the net shape of the object during a beginning of a thermal sintering cycle for the object.

17. The method of claim 16 further comprising debinding the object to remove the first binder.

18. The method of claim 17 wherein debinding the object includes at least one of chemical debinding, thermal debinding, catalytic debinding, supercritical debinding, and evaporation.

19. The method of claim 17 wherein debinding the object includes microwaving the object.

20. The method of claim 16 further comprising heating the object to remove the second binder.

21. The method of claim 1 wherein the binder system includes at least one polymer.

22. The method of claim 1 wherein the binder system includes a first binder and at least one other binder, the first binder forming about 20 percent to about 98 percent by volume of the binder system, the method further comprising debinding the first binder from the object to create open pore channels for a release of the at least one other binder.

23. The method of claim 1 wherein fabricating at least one of the support structure, the object, and the interface layer includes additively manufacturing the support structure using at least one of fused filament fabrication, binder jetting, and optical curing of a powder-loaded resin.

24. The method of claim 1 wherein the interface layer includes a finishing material, and further wherein applying the interface layer includes applying the interface layer to one or more exterior surfaces of the object.

25. The method of claim 24 wherein the finishing material includes an alloying metal having an aesthetic finish.

26. The method of claim 24 wherein fabricating the interface layer includes fully encapsulating the object.

27. The method of claim 24 wherein the interface layer includes titanium.

28. The method of claim 1 wherein at least one of the first material and the interface layer is formed of a composition including microspheres that controllably collapse under pressure to reduce volume.

29. The method of claim 28 further comprising applying pressure to collapse the microspheres, the collapse of the microspheres separating the support structure from the object.

30. The method of claim 1 wherein the interface layer is formed of the first material.

* * * * *